United States Patent
Kumar et al.

(10) Patent No.: US 7,725,934 B2
(45) Date of Patent: May 25, 2010

(54) NETWORK AND APPLICATION ATTACK PROTECTION BASED ON APPLICATION LAYER MESSAGE INSPECTION

(75) Inventors: Sandeep Kumar, Cupertino, CA (US); Yi Jin, San Jose, CA (US); Sunil Potti, Castro Valley, CA (US); Christopher R. Wiborg, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 716 days.

(21) Appl. No.: 11/007,152

(22) Filed: Dec. 7, 2004

(65) Prior Publication Data
US 2006/0123479 A1 Jun. 8, 2006

(51) Int. Cl.
G06F 11/00 (2006.01)
G06F 12/14 (2006.01)

(52) U.S. Cl. .............................. 726/22; 726/11; 726/6; 713/188

(58) Field of Classification Search ..................... 726/22
See application file for complete search history.

(56) References Cited

U.S. PATENT DOCUMENTS

| | | | |
|---|---|---|---|
| 5,790,542 | A | 8/1998 | Kim et al. |
| 6,021,135 | A | 2/2000 | Ishihara et al. |
| 6,115,378 | A | 9/2000 | Hendel et al. |
| 6,125,391 | A | 9/2000 | Meltzer et al. |
| 6,145,079 | A | 11/2000 | Mitty et al. |
| 6,226,675 | B1 | 5/2001 | Meltzer et al. |
| 6,321,264 | B1 | 11/2001 | Fletcher et al. |

(Continued)

FOREIGN PATENT DOCUMENTS

EP 1217804 2/2002

(Continued)

OTHER PUBLICATIONS

International Searching Authority, "Notification of Transmittal of the International Search Report and the Written Opinion of the International Searching Authority, or the Declaration," PCT/US05/45625, dated Oct. 20, 2006, 7 pages.

(Continued)

*Primary Examiner*—Christopher J Brown
(74) *Attorney, Agent, or Firm*—Hickman Palermo Truong & Becker LLP

(57) ABSTRACT

A method is disclosed for protecting a network against a denial-of-service attack by inspecting application layer messages at a network element. According to one aspect, when a network element intercepts data packets that contain an application layer message, the network element constructs the message from the payload portions of the packets. The network element determines whether the message satisfies specified criteria. The criteria may indicate characteristics of messages that are suspected to be involved in a denial-of-service attack, for example. If the message satisfies the specified criteria, then the network element prevents the data packets that contain the message from being received by the application for which the message was intended. The network element may accomplish this by dropping the packets, for example. As a result, the application's host does not waste processing resources on messages whose only purpose might be to deluge and overwhelm the application.

46 Claims, 28 Drawing Sheets

U.S. PATENT DOCUMENTS

| | | |
|---|---|---|
| 6,337,856 B1 | 1/2002 | Schanhals et al. |
| 6,341,130 B1 | 1/2002 | Lakshman et al. |
| 6,356,951 B1 | 3/2002 | Gentry |
| 6,363,477 B1 | 3/2002 | Fletcher et al. |
| 6,510,434 B1 | 1/2003 | Anderson et al. |
| 6,510,464 B1 | 1/2003 | Grantges et al. |
| 6,587,431 B1 | 7/2003 | Almulhem et al. |
| 6,597,918 B1 | 7/2003 | Kim |
| 6,611,526 B1 | 8/2003 | Chinnaswamy et al. |
| 6,678,827 B1 | 1/2004 | Rothermel et al. |
| 6,683,881 B1 | 1/2004 | Mijares et al. |
| 6,718,326 B2 | 4/2004 | Uga et al. |
| 6,745,041 B2 | 6/2004 | Allison et al. |
| 6,771,646 B1 | 8/2004 | Sarkissian et al. |
| 6,772,211 B2 | 8/2004 | Lu et al. |
| 6,772,223 B1 | 8/2004 | Corl, Jr. et al. |
| 6,785,732 B1 * | 8/2004 | Bates et al. ............... 709/232 |
| 6,792,002 B2 | 9/2004 | Tezuka et al. |
| 6,813,690 B1 | 11/2004 | Lango et al. |
| 6,816,455 B2 | 11/2004 | Goldberg et al. |
| 6,862,270 B1 | 3/2005 | Ho |
| 6,868,426 B1 | 3/2005 | Mankoff |
| 6,944,678 B2 | 9/2005 | Lu et al. |
| 6,950,822 B1 | 9/2005 | Idicula et al. |
| 6,965,599 B1 | 11/2005 | Sakurai et al. |
| 6,996,842 B2 | 2/2006 | Strahm et al. |
| 7,031,314 B2 | 4/2006 | Craig et al. |
| 7,058,973 B1 | 6/2006 | Sultan |
| 7,089,586 B2 * | 8/2006 | Kilgore ....................... 726/13 |
| 7,111,076 B2 | 9/2006 | Abjanic et al. |
| 7,111,163 B1 | 9/2006 | Haney |
| 7,126,907 B2 | 10/2006 | Carpini et al. |
| 7,134,075 B2 | 11/2006 | Hind et al. |
| 7,149,222 B2 | 12/2006 | Wiryaman et al. |
| 7,185,365 B2 | 2/2007 | Tang et al. |
| 7,215,637 B1 | 5/2007 | Ferguson et al. |
| 7,215,641 B1 | 5/2007 | Bechtolsheim et al. |
| 7,239,634 B1 | 7/2007 | Chakravorty |
| 7,245,620 B2 | 7/2007 | Shankar |
| 7,296,268 B2 | 11/2007 | Darling et al. |
| 7,299,361 B1 * | 11/2007 | Kim et al. .................. 713/188 |
| 7,321,556 B1 | 1/2008 | Parekh et al. |
| 7,362,763 B2 | 4/2008 | Wybenga et al. |
| 7,363,353 B2 | 4/2008 | Ganesan et al. |
| 7,376,755 B2 | 5/2008 | Pandya |
| 7,415,512 B1 | 8/2008 | Moon |
| 7,421,695 B2 | 9/2008 | Murray et al. |
| 7,437,451 B2 | 10/2008 | Tang et al. |
| 7,469,300 B2 | 12/2008 | De Bonet et al. |
| 7,475,108 B2 | 1/2009 | Di Giulio et al. |
| 7,483,421 B2 | 1/2009 | Compton |
| 2001/0047422 A1 | 11/2001 | McTernan et al. |
| 2001/0056504 A1 | 12/2001 | Kuznetsov |
| 2002/0015485 A1 | 2/2002 | Bhusri |
| 2002/0069279 A1 | 6/2002 | Romero et al. |
| 2002/0083817 A1 | 7/2002 | Hoshino |
| 2002/0105911 A1 | 8/2002 | Pruthi et al. |
| 2002/0114274 A1 | 8/2002 | Sturges et al. |
| 2002/0126672 A1 | 9/2002 | Chow et al. |
| 2002/0136403 A1 * | 9/2002 | Henson et al. ............... 380/44 |
| 2002/0143981 A1 | 10/2002 | DeLima et al. |
| 2002/0161907 A1 | 10/2002 | Moon |
| 2002/0163933 A1 | 11/2002 | Benveniste |
| 2002/0165957 A1 | 11/2002 | Devoe et al. |
| 2002/0191622 A1 | 12/2002 | Zdan |
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0009571 A1 | 1/2003 | Bavadekar |
| 2003/0014665 A1 | 1/2003 | Anderson et al. |
| 2003/0018726 A1 | 1/2003 | Low et al. |
| 2003/0028599 A1 | 2/2003 | Kolsky |
| 2003/0028616 A1 | 2/2003 | Aoki et al. |
| 2003/0055818 A1 | 3/2003 | Faybishenko et al. |
| 2003/0069975 A1 | 4/2003 | Abjanic et al. |
| 2003/0078031 A1 | 4/2003 | Masuda |
| 2003/0084279 A1 * | 5/2003 | Campagna ................... 713/153 |
| 2003/0093530 A1 | 5/2003 | Syed |
| 2003/0095569 A1 | 5/2003 | Wengrovitz et al. |
| 2003/0105903 A1 | 6/2003 | Garnett et al. |
| 2003/0112802 A1 | 6/2003 | Ono et al. |
| 2003/0112809 A1 | 6/2003 | Bharali et al. |
| 2003/0115448 A1 | 6/2003 | Bouchard |
| 2003/0140140 A1 | 7/2003 | Lahtinen |
| 2003/0163539 A1 | 8/2003 | Piccinelli |
| 2003/0163603 A1 | 8/2003 | Fry et al. |
| 2003/0177183 A1 | 9/2003 | Cabrera et al. |
| 2003/0188192 A1 | 10/2003 | Tang et al. |
| 2003/0189935 A1 | 10/2003 | Warden et al. |
| 2003/0202535 A1 | 10/2003 | Foster et al. |
| 2003/0204719 A1 | 10/2003 | Ben-Itzhak |
| 2003/0217176 A1 | 11/2003 | Beunings |
| 2003/0236883 A1 | 12/2003 | Takeshima et al. |
| 2004/0001444 A1 | 1/2004 | Sadot et al. |
| 2004/0006613 A1 | 1/2004 | Lemieux et al. |
| 2004/0022250 A1 | 2/2004 | Chen et al. |
| 2004/0022255 A1 | 2/2004 | Chen et al. |
| 2004/0024868 A1 | 2/2004 | Drummond |
| 2004/0024881 A1 | 2/2004 | Elving et al. |
| 2004/0032881 A1 | 2/2004 | Arai |
| 2004/0054886 A1 | 3/2004 | Dickinson et al. |
| 2004/0088585 A1 | 5/2004 | Kaler et al. |
| 2004/0121789 A1 | 6/2004 | Lindsey |
| 2004/0133775 A1 | 7/2004 | Callas et al. |
| 2004/0136371 A1 | 7/2004 | Muralidhar et al. |
| 2004/0167986 A1 | 8/2004 | Gilfix et al. |
| 2004/0170182 A1 | 9/2004 | Higashida et al. |
| 2004/0205336 A1 | 10/2004 | Kessler et al. |
| 2004/0221319 A1 | 11/2004 | Zenoni |
| 2004/0260760 A1 | 12/2004 | Curnyn |
| 2004/0264481 A1 | 12/2004 | Darling et al. |
| 2004/0267920 A1 | 12/2004 | Hydrie et al. |
| 2004/0267930 A1 | 12/2004 | Giulio et al. |
| 2004/0268357 A1 | 12/2004 | Joy et al. |
| 2005/0005031 A1 | 1/2005 | Gordy et al. |
| 2005/0015619 A1 | 1/2005 | Lee |
| 2005/0021836 A1 | 1/2005 | Reed et al. |
| 2005/0025091 A1 | 2/2005 | Patel et al. |
| 2005/0041670 A1 | 2/2005 | Lin et al. |
| 2005/0050362 A1 | 3/2005 | Peles |
| 2005/0054346 A1 | 3/2005 | Windham et al. |
| 2005/0063377 A1 * | 3/2005 | Bryant et al. ............... 370/389 |
| 2005/0071508 A1 | 3/2005 | Brown et al. |
| 2005/0076332 A1 | 4/2005 | Jawaharlal et al. |
| 2005/0080914 A1 | 4/2005 | Lerner et al. |
| 2005/0086342 A1 | 4/2005 | Burt et al. |
| 2005/0094611 A1 | 5/2005 | Cheong et al. |
| 2005/0102393 A1 | 5/2005 | Murray et al. |
| 2005/0114394 A1 | 5/2005 | Kaipa et al. |
| 2005/0117576 A1 | 6/2005 | McDysan et al. |
| 2005/0148314 A1 | 7/2005 | Taglienti et al. |
| 2005/0165828 A1 | 7/2005 | Lango et al. |
| 2005/0169171 A1 | 8/2005 | Cheng et al. |
| 2005/0188103 A1 | 8/2005 | Chen |
| 2005/0198351 A1 | 9/2005 | Nog et al. |
| 2005/0213591 A1 | 9/2005 | Nakazawa et al. |
| 2005/0216727 A1 | 9/2005 | Chattopadhyay et al. |
| 2005/0228893 A1 | 10/2005 | Devarapalli et al. |
| 2005/0229243 A1 | 10/2005 | Svendsen et al. |
| 2005/0252970 A1 | 11/2005 | Howarth et al. |
| 2005/0283539 A1 | 12/2005 | Betts et al. |
| 2005/0286461 A1 | 12/2005 | Zhang et al. |
| 2006/0015699 A1 | 1/2006 | Fujiwara et al. |
| 2006/0021010 A1 | 1/2006 | Atkins et al. |

| | | | |
|---|---|---|---|
| 2006/0031374 | A1 | 2/2006 | Lu et al. |
| 2006/0106941 | A1 | 5/2006 | Singhal et al. |
| 2006/0123226 | A1 | 6/2006 | Kumar et al. |
| 2006/0123467 | A1 | 6/2006 | Kumar et al. |
| 2006/0123477 | A1 | 6/2006 | Raghavan et al. |
| 2006/0129650 | A1 | 6/2006 | Ho et al. |
| 2006/0129689 | A1 | 6/2006 | Ho et al. |
| 2006/0146879 | A1 | 7/2006 | Anthias et al. |
| 2006/0155862 | A1 | 7/2006 | Kathi et al. |
| 2006/0155969 | A1 | 7/2006 | Yoda et al. |
| 2006/0167975 | A1 | 7/2006 | Chan et al. |
| 2006/0168334 | A1 | 7/2006 | Potti et al. |
| 2006/0248225 | A1 | 11/2006 | Batz et al. |
| 2006/0256768 | A1 | 11/2006 | Chan |
| 2007/0055864 | A1 | 3/2007 | Tock et al. |

FOREIGN PATENT DOCUMENTS

| | | |
|---|---|---|
| EP | 1217804 | 6/2002 |
| WO | WO 99/07116 | 2/1999 |
| WO | WO 02/27507 | 4/2002 |
| WO | WO 03/021465 A1 | 3/2003 |

OTHER PUBLICATIONS

Current Claims PCT/US05/45625, 9 pages.
International Searching Authority,-"Notification of Transmittal of the International Search Report and the Written Opinion of the International Searching Authority, or the Declaration," PCT/US05/40861, dated Nov. 17, 2006, 7 pages.
Current Claims PCT/US05/40861, 6 pages.
International Searching Authority, "Notification of Transmittal of the International Search Report and the Written Opinion of the International Searching Authority, or the Declaration," PCT/US2006/024375, dated Oct. 17, 2006, 10 pages.
Current Claims, PCT/US2006/024375, 6 pages.
Decasper, Dan et al., "Router Plugins: A Software Architecture for Next-Generation Routers," IEEE ACM Transactions on Networking, vol. 9, No. 1, Feb. 2000, XP011038838, 14 pages.
International Searching Authority, "Notification of Transmittal of the International Search Report and the Written Opinion of the International Searching Authority, or the Declaration," PCT/US05/44171, dated Nov. 30, 2006, 7 pages.
Current Claims, PCT/US05/44171, 9 pages.
International Searching Authority, "Notification of Transmittal of the International Search Report and the Written Opinion of the International Searching Authority, or the Declaration," PCT/US05/43599, dated Feb. 28, 2007, 8 pages.
Current Claims, PCT/US05/43599, 8 pages.
International Searching Authority, "Notification of Transmittal of the International Search Report and the Written Opinion of the International Searching Authority, or the Declaration," PCT/US05/41254, dated Mar. 28, 2007, 7 pages.
Current Claims, PCT/US05/41254, 11 pages.
International Searching Authority, "Notification of Transmittal of the International Search Report and the Written Opinion of the International Searching Authority, or the Declaration", International application No. PCT/US05/46149, dated Jul. 20, 2007, 9 pages.
Claims, International application No. PCT/US05/46149, 10 pages.
Marc Girardot and Neel Sundaresan. Millau: an encoding format for efficient representation and exchange for XMLover the web. [retrieved Jan. 31, 2005]. Retrieved from the internet: < URL: http://www9.org/w9cdrom/154/154.html>.
Fujitsu Limited, et al.. Web Services Reliability (WS-Reliability). Ver1.0. Jan. 8, 2003. pp. 1-45.
Ruslan Bilorusets et al.. Web Services Reliable Messaging Protocol (WS-ReliableMessaging). Mar. 2004.
Girardot, Marc, et al., "Millau: An Encoding Format for Efficient Representation and Exchange of XML Over the Web", Computer Networks, Netherlands, vol. 33, Jun. 2000, 22 pages.
Claims, International Application No. PCT/US05/44173, 5 pages.
International Searching Authority, "Patent Cooperation Treaty", International Application No. PCT/US05/44173, received Apr. 28, 2008, 10 pages.
Burns, Michael, et al., "Implementing Address Assurance in the Intel IXP Router", Western Network Processors Conference, Oct. 2002, 17 pages.
Chiu, Kenneth, et al., "Investigating the Limits of SOAP Performance for Scientific Computing", Nov. 7, 2002, IEEE Computer Society, 8 pages.
State Intellectual Property Office of the People's Republic of China, "The First Office Action", filing No. 200580031571.0, Dated Dec. 19, 2008, 9 pages.
Claims, filing No. 200580031571.0, 8 pages.
State Intellectual Property Office of the People's Republic of China, "The First Office Action", filing No. 200580045932.7, Dated Nov. 28, 2008, 8 pages.
Claims, filing No. 200580045932.7, 8 pages.
European Patent Office, "European Search Report", application No. EP 05820894, Feb. 6, 2009, 8 pages.
Claims, application No. EP 05820894, 6 pages.
Schramm, Cheryl, et al., "Application- Oriented Network Modeling with Mobile Agents", IEEE, 1998, 5 pages.
The Patent Office of the People's Republic of China, "The Second Office Action", Application No. 200580045932.7, dated May 8, 2009, 9 pages.
Pending Claims, Application No. 200580045932.7, 8 pages.
European Patent Office, "Communication pursuant to Article 94(3) EPC", Application No. 05820894.3-2211/1812870, dated May 28, 2009, 9 pages.
Amended Claims, Application No. 05820894.3-2211/1812870, 6 pages.
U.S. Appl. No. 11/398,983, filed Apr. 5, 2006, Office Action, Jan. 6, 2010 (mailing date).
U.S. Appl. No. 11/005,978, filed Dec. 6, 2004, Final Office Action, Dec. 28, 2009 (mailing date).
U.S. Appl. No. 11/472,807, filed Jun. 21, 2006, Office Action, Jan. 11, 2010 (mailing date).
U.S. Appl. No. 11/473,298, filed Jun. 21, 2006, Office Action, Feb. 4, 2010 (mailing date).

* cited by examiner

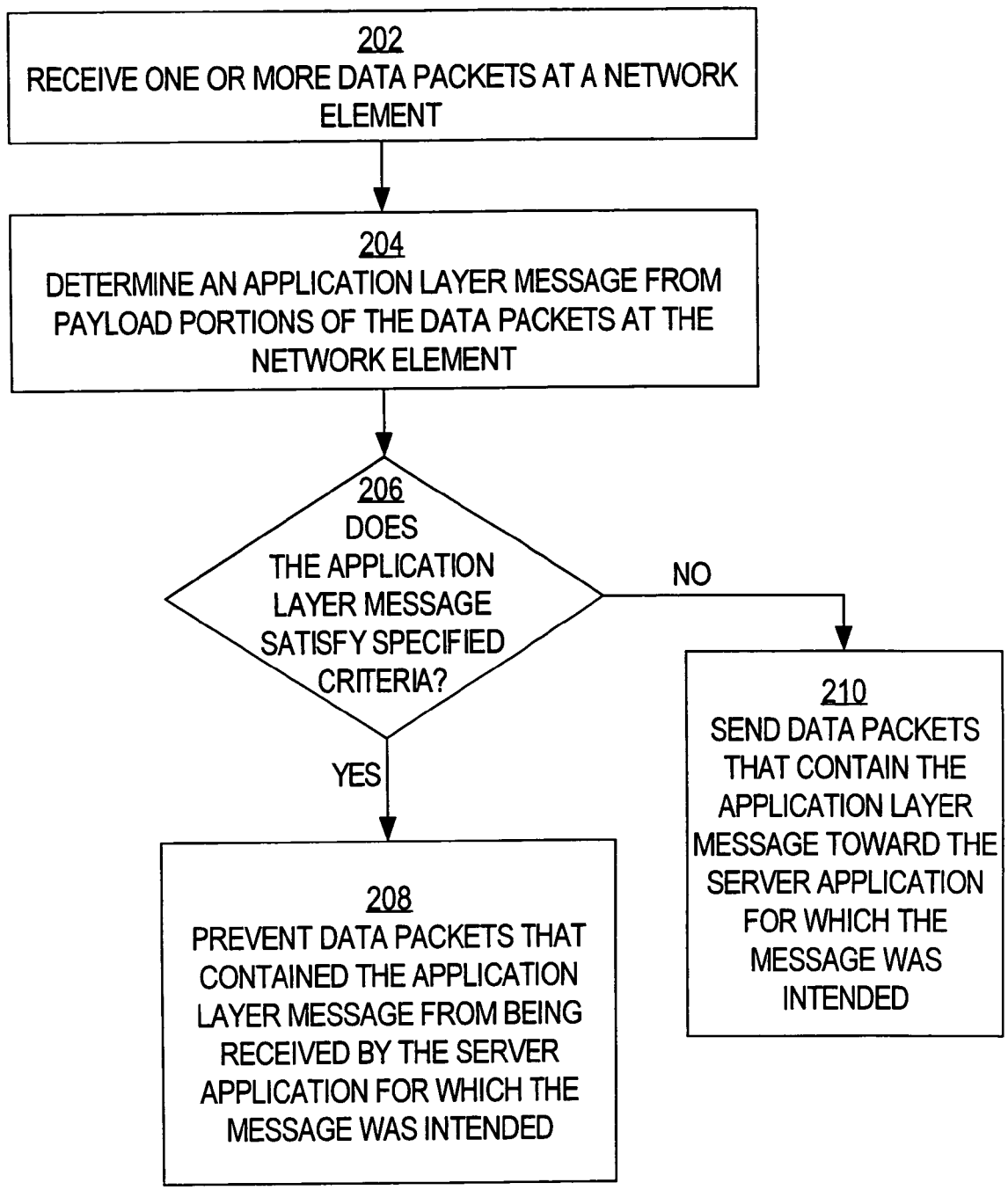

NETWORK AND APPLICATION ATTACK PROTECTION BASED ON APPLICATION LAYER MESSAGE INSPECTION

RELATED APPLICATIONS

This application is related to U.S. patent application Ser. No. 10/991,792, entitled "PERFORMING MESSAGE AND TRANSFORMATION ADAPTER FUNCTIONS IN A NETWORK ELEMENT ON BEHALF OF AN APPLICATION", by Pravin Singhal, Qingqing Li, Juzar Kothambalawa, Parley Van Oleson, Wai Yip Tung, and Sunil Potti, filed on Nov. 17, 2004; and U.S. patent application Ser. No. 10/997,616, entitled "CACHING CONTENT AND STATE DATA AT A NETWORK ELEMENT", by Alex Yiu-Man Chan, Snehal Haridas, and Raj De Datta, filed on Nov. 23, 2004; the contents of which are incorporated by reference in their entirety for all purposes as though fully disclosed herein.

FIELD OF THE INVENTION

The present invention generally relates to network elements, such as switches and routers, in computer networks. The invention relates more specifically to protecting a network and applications against a denial-of-service attack by inspecting application layer messages.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a business-to-business environment, applications executing on computers commonly communicate with other applications that execute on other computers. For example, an application "A" executing on a computer "X" might send, to an application "B" executing on a computer "Y," a message that indicates the substance of a purchase order.

Computer "X" might be remote from computer "Y." In order for computer "X" to send the message to computer "Y," computer "X" might send the message through a computer network such as a local area network (LAN), a wide-area network (WAN), or an inter-network such as the Internet. In order to transmit the message through such a network, computer "X" might use a suite of communication protocols. For example, computer "X" might use a network layer protocol such as Internet Protocol (IP) in conjunction with a transport layer protocol such as Transport Control Protocol (TCP) to transmit the message.

Assuming that the message is transmitted using TCP, the message is encapsulated into one or more data packets; separate portions of the same message may be sent in separate packets. Continuing the above example, computer "X" sends the data packets through the network toward computer "Y." One or more network elements intermediate to computer "X" and computer "Y" may receive the packets, determine a next "hop" for the packets, and send the packets towards computer "Y."

For example, a router "U" might receive the packets from computer "X" and determine, based on the packets being destined for computer "Y," that the packets should be forwarded to another router "V" (the next "hop" on the route). Router "V" might receive the packets from router "U" and send the packets on to computer "Y." At computer "Y," the contents of the packets may be extracted and reassembled to form the original message, which may be provided to application "B." Applications "A" and "B" may remain oblivious to the fact that the packets were routed through routers "U" and "V." Indeed, separate packets may take different routes through the network.

A message may be transmitted using any of several application layer protocols in conjunction with the network layer and transport layer protocols discussed above. For example, application "A" may specify that computer "X" is to send a message using Hypertext Transfer Protocol (HTTP). Accordingly, computer "X" may add HTTP-specific headers to the front of the message before encapsulating the message into TCP packets as described above. If application "B" is configured to receive messages according to HTTP, then computer "Y" may use the HTTP-specific headers to handle the message.

In addition to all of the above, a message may be structured according to any of several message formats. A message format generally indicates the structure of a message. For example, if a purchase order comprises an address and a delivery date, the address and delivery date may be distinguished from each other within the message using message format-specific mechanisms. For example, application "A" may indicate the structure of a purchase order using Extensible Markup Language (XML). Using XML as the message format, the address might be enclosed within "<address>" and "</address>" tags, and the delivery date might be enclosed within "<delivery-date>" and "</delivery-date>" tags. If application "B" is configured to interpret messages in XML, then application "B" may use the tags in order to determine which part of the message contains the address and which part of the message contains the delivery date.

Sometimes, malicious users attempt to disrupt the communications described above by mounting a "denial-of-service" attack on a server application—application "B" in the example above. Traditionally, denial-of-service attacks are conducted by continuously sending very large quantities of data packets toward a server application. The server application receives these data packets and attempts to process the messages contained therein, consuming a portion of the processing resources of the computer that hosts the server application in doing so. If the server application receives enough data packets from a malicious user, then all or nearly all of the server application's host's processing resources may become occupied with processing the bogus messages from the malicious user. Additionally or alternatively, a malicious user may deploy malicious software, or "malware," which may cause an application to crash or become unavailable, or may cause an application to perform large amounts of computations, or may cause an application to fetch unauthorized content or modify content that the application should not modify.

As a result, the server application's ability to process legitimate messages sent from legitimate users decreases immensely. Indeed, the server application might not be able to process a legitimate message until after an unacceptable amount of time passes after the legitimate message was sent. Legitimate client applications—such as application "A" in the example above—may assume, due to the lack of a timely response from the server application, that the server application is no longer operational.

In an attempt to thwart such traditional denial-of-service attacks, an automated sentry process is sometimes established between the server application and all other applications that might send packets toward the server application. For example, the sentry process might execute on the same computer as the server application, or on some intermediate network appliance that acts as a proxy for the computer that hosts the server application. In any case, the sentry process receives data packets before sending the data packets on to the server application.

Under this sentry approach, legitimate client applications need to be configured to send packets toward the sentry process rather than the server application itself, because the server application is configured to receive packets only from the sentry process. The configuration process can be a burden to users and/or programmers of the legitimate client applications, especially where a different customized configuration is required for each different sentry process toward which a client application might send packets.

When a sentry process receives a data packet, it inspects the protocol headers—such as the IP and TCP headers—of the data packet and stores state information concerning one or more characteristics of the protocol headers. For example, for each packet that a sentry process receives, the sentry process might record the source IP address indicated in the packet's IP header. If the sentry process determines that a significantly high number of data packets have been received from the same source IP address within a relatively short period of time, then the sentry process may conclude that an application associated with the source IP address is conducting a denial-of-service attack. In response to such a determination, the sentry process may take some protective action, such as alerting a network administrator or the server application.

Though burdensome, the sentry approach described above may be somewhat effective in deterring traditional denial-of-service attacks. However, being rather persistent, malicious users have innovated non-traditional denial-of-service attacks that effectively circumvent the protections provided by the sentry approach. Using a "distributed" denial-of-service attack, multiple separate computers, each having a different IP address, may cooperate to send, concurrently, a large quantity of data packets toward a target. The number of data packets that each individual attacker sends is not large enough to trigger the sentry process' protective countermeasures, but the combined mass of all of the attackers' data packets is enough to deluge the target and consume most of the target's processing resources.

Other non-traditional attacks are even more sophisticated and more easily conducted. A server application might have a published interface to which messages from client applications need to conform in order for the server application to process those messages. The server application might not be robust enough to handle messages that do not conform to the interface. For example, a server application's interface might expose a method that accepts an integer as a parameter. If the server application receives a message that invokes the method with a floating-point number parameter instead of the expected integer parameter, the server application might behave erratically; the server application might corrupt legitimate data, or the server application might even become non-responsive to further messages from legitimate client applications. Because the non-conforming elements usually are contained in a data packet's payload portion instead of the data packet's protocol headers, the sentry approach described above is powerless to defend against such an attack.

Although it might initially seem feasible to defend against such non-traditional attacks by adjusting the sentry process so that the sentry process would inspect the payload portions of data packets to ensure that the payload portions do not contain any non-conforming elements, such a defense would merely transfer the point of vulnerability from the server application to the sentry process. Because payload inspection is processing resource-intensive, malicious users could send data packets to the sentry process at a greater rate than the sentry process could inspect the payload portions of those data packets. When the processing resources of the sentry process' host computer became entirely or almost entirely consumed with inspecting data packet payloads, the denial-of-service attack would have achieved its goals, since the sentry process would not be able to send legitimate data packets to the server application in a timely manner. Whenever the server application only receives data packets from a single sentry process, the sentry process becomes a vulnerable bottleneck.

For security reasons, the payload portions of some legitimate data packets may be encrypted before being sent toward a server application over encrypted sessions. Even if a sentry process were designed to inspect data packet payloads, the sentry process would not be able to detect offensive content contained in a data packet payload if that content was encrypted in such a way that only the server application could decrypt the content.

The form of denial-of-service attacks continuously changes. Almost as soon as a sentry process is developed to counter one form of attack, another form of attack, against which the sentry process cannot defend, emerges. By the time that sentry process developers have shipped the next revision of a sentry process to counter new forms of attack, significant damage from those new forms of attack might already have been done.

Thus, previous approaches for negating denial-of-service attacks in a network are only partially effective, inherently vulnerable, and limited in longevity. A more effective, adaptive, and invulnerable technique for preventing denial-of-service attacks in a network is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts a flow diagram that illustrates an overview of one embodiment of a method of protecting against denial-of-service attacks by inspecting application layer messages at a network element;

DETAILED DESCRIPTION

Figure 1:
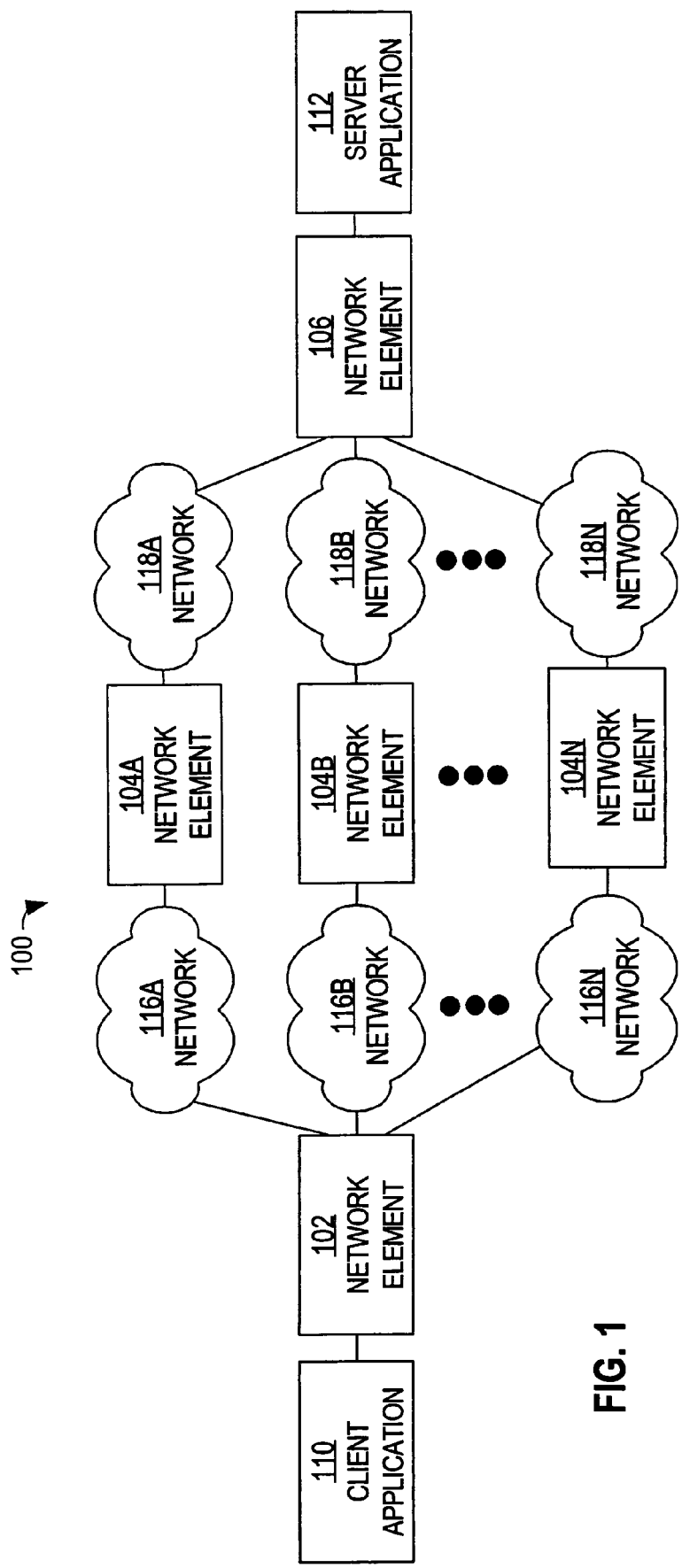
FIG. 1 is a block diagram that illustrates an overview of one embodiment of a system in which network elements protect against denial-of-service attacks by inspecting application layer messages.

A method and apparatus for protecting a network against a denial-of-service attack by inspecting application layer messages is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
   3.1 Multi-Blade Architecture
   3.2 Protecting a Network Against a Denial-of-Service Attack By Inspecting Application Layer Messages
   3.3 Action Flows
   3.4 AONS Examples
      3.4.1 AONS General Overview
      3.4.2 AONS Terminology
      3.4.3 AONS Functional Overview
      3.4.4 AONS System Overview
      3.4.5 AONS System Elements
      3.4.6 AONS Example Features
      3.4.7 AONS Functional Modules
      3.4.8 AONS Modes of Operation
      3.4.9 AONS Message Routing
      3.4.10 Flows, Bladelets™, and Scriptlets™
      3.4.11 AONS Services
      3.4.12 AONS Configuration and Management
      3.4.13 AONS Monitoring
      3.4.14 AONS Tools
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for protecting a network against a denial-of-service attack by inspecting application layer messages at a network element. According to one embodiment, when a network element, such as a router, switch, network appliance, or other device that is attached or connected to a switch or router and that performs OSI Layer 2 and above processing, intercepts one or more data packets that collectively contain an application layer message, the network element constructs the application layer message from the contents of the payload portions of the data packets. The network element determines whether the application layer message satisfies one or more specified criteria. The criteria may indicate characteristics of messages that are suspected to be involved in a denial-of-service attack, for example. If the message satisfies the specified criteria, then the network element prevents the data packets that contain the message from being received by the server application for which the application layer message was intended. The network element may accomplish this by dropping the data packets, for example. As a result, the server application's host does not waste processing resources on messages whose only purpose might be to deluge and overwhelm the server application.

In one embodiment, different criteria may be specified relative to different data packet origins and/or destinations, so that, for example, the network element may evaluate data packets from and/or to some applications more strictly or leniently than packets from and/or to from other applications. Such origins and destinations may be identified by IP addresses and other similar criteria such as custom rules, content, XPath, headers, URLs, etc., for example.

In one embodiment, the network element is programmable such that the specified criteria discussed above can be modified or augmented by a user, such as a network administrator, even after the network element has already started receiving data packets. At any time, the network element may receive specified criteria from a user and store the specified criteria at the network element. Thereafter, the network element evaluates application layer messages as discussed above, but in light of the received criteria as well as any previously existing criteria stored at the network element. As a result, a network administrator can adapt the network element's behavior dynamically, or "on the fly," in order to prevent new and different forms of attacks that the network element was not previously configured to detect shortly after the network administrator becomes aware of those new and different forms. The network administrator does not need to wait for a new version of the network element or the network element's software to be released to deal with such new threats.

According to one embodiment, a network element processes an application layer message by conceptually separating the contents of the application layer message from the remainder of the one or more data packets and inspecting and interpreting the contents in a manner that is based on semantics associated with the contents. This kind of inspection, which is more fine-grained than packet-level inspection, may be referred to as "deep content inspection." For example, each part of a multi-part (MIME) message may be separately interpreted, inspected, and handled based on the semantics associated with that part. For example, if a part of a multi-part message is a JPEG image, then that part is inspected based on JPEG semantics; if a part of a multi-part message is an XML document, then that part is inspected based on XML semantics; other parts may be inspected based on different semantics. The distinct components of a message are understood by the semantics associated with that message. Each distinct component of a message may be handled in a different manner based on that component's type. For example, a JPEG image part might be evaluated against one set of specified criteria, but an XML document part might be evaluated against another, different set of specified criteria. For another example, logging might be performed for JPEG image parts that satisfy a set of specified criteria, but not for XML documents parts that satisfy a set of specified criteria.

Different components of a multi-part MIME message may be inspected using different inspection mechanisms (such as pattern-matching mechanisms) that are associated with the components' types. For example, a JPEG image part might be inspected, and information might be extracted therefrom, using a regular expression pattern-matching mechanism, while an XML document part might be inspected, and information might be extracted therefrom, using an XPath technology-based mechanism.

According to one embodiment, a network element determines an application layer protocol according to which the application layer message was sent, and/or a message format to which the application layer message conforms. From among a plurality of firewall mechanisms, the network element selects a particular firewall mechanism that is mapped to the application layer protocol or message format. The network element applies the particular firewall mechanism to the application layer message. Each different firewall mechanism may inspect a different aspect of an application layer message's contents in order to determine what actions to take relative to the application layer message. For example, an SMTP firewall mechanism might inspect the SMTP header associated with an application layer message, and, based on the contents thereof (e.g., a source e-mail address), take SMTP firewall mechanism-specified actions relative to the application layer message.

According to one embodiment, a network element can interface with a trusted store to allow fine-grained control of access/deny decisions. According to one embodiment, a network element can define actions upon detecting an attack. For example, a network element can discard a message, re-route a message, quarantine a message, or log a message upon detecting an attack.

In one embodiment, in response to detecting that a particular class of messages is being used to mount an attack, a network element configures a traditional firewall (e.g., a firewall that allows/denies messages based on TCP/IP header attributes) to deny data packets that satisfy specified criteria. As a result, the traditional firewall may prevent the detection mechanism of the network element from being overwhelmed by those data packets; the traditional firewall may block a portion of network traffic from ever reaching the detection mechanism of the network element (e.g., the "AONS blade" described in greater detail below). Such a traditional firewall may be located externally to the network element.

Because the network element detects forbidden characteristics of application layer messages that are embedded "deeper" than the protocol headers of a data packet, the network element can prevent forms of denial-of-service attacks that previous approaches, which only inspected protocol headers of data packets, could not detect or prevent.

Because attack detection and prevention is performed at a network element, such as a switch or router, attack detection and prevention capability may be distributed among multiple separate network elements. Consequently, applications do not need to be customized to direct legitimate data packets explicitly to any particular intermediary device. As a result, the bottleneck-related problems of previous detection and prevention approaches are avoided. Individual network elements are less vulnerable to denial-of-service attacks because each network element may deal with a mere fraction of the data packets involved in a denial-of-service attack. If a particular network element is becoming overwhelmed with data packets, then routing algorithms already used in many networks may route data packets to alternative, less resource-stressed network elements that sit between the packets' source and destination. Each such network element may detect and prevent denial-of-service attacks. In one embodiment, the particular network element re-routes data packets to a different network element if the particular network element is receiving data packets at greater than a specified threshold rate, or if the particular network element's buffers are filled to a specified extent.

In other aspects, the invention encompasses a computer apparatus and a computer-readable medium configured to carry out the foregoing steps.

2.0 Structural and Functional Overview

FIG. 1 is a block diagram that illustrates an overview of one embodiment of a system 100 in which one or more of network elements 102, 104A-N, and 106 protect against denial-of-service attacks by inspecting application layer messages. Network elements 102, 104A-N, and 106 may be proxy devices and/or network switches and/or routers, such as router 600 depicted in FIG. 6 below, for example. Although traditional firewalls are deployed in a "gateway" or "transparent" mode, network elements 102, 104A-N, and 106 may be deployed in "explicit," "proxy," and/or "implicit" modes, as is described in greater detail below with reference to section 3.4.8, "AONS MODES OF OPERATION."

A client application 110 is coupled communicatively with network element 102. A server application 112 is coupled communicatively with network element 106. Client application 110 and server application 112 may be separate processes executing on separate computers.

Network element 102 is coupled communicatively with networks 116A-N. Network element 106 is coupled communicatively with networks 118A-N. Network elements 104A-N, respectively, are coupled communicatively with networks 116A-N, respectively, and networks 118A-N, respectively. Each of networks 116A-N and 118A-N is a computer network, such as, for example, a local area network (LAN), wide area network (WAN), or internetwork such as the Internet. Networks 116A-N and 118A-N may contain additional network elements such as routers.

Client application 110 addresses messages to server application 112. Network elements 102, 104A-N, and 106 intercept the data packets that contain the messages. Each of network elements 102, 104A-N, and 106 stores a set of defined message classifications, which may be user-specified. Network elements 102, 104A-N, and 106 assemble one or more of the data packets to determine application layer messages contained in the payload portions thereof. Based on the contents of the messages, network elements 102, 104A-N, and 106 determine to which of the message classifications the messages belong.

As used herein, an "application layer message" is a message that one application generates and sends toward another application. The application layer message may be formatted and structured according to OSI layer 4-and-above protocols. After the application layer message has been generated, the application layer message may be encapsulated according to one or more protocols such as HTTP, TCP, and IP. For example, an HTTP header, indicating a URL, may be added to the front of the application layer message. The application layer message may be an XML document, for example.

For each particular message classification, each of network elements 102, 104A-N, and 106 stores a separate association or mapping between that message classification and one or more separates set of attack detection criteria. For each particular message, in response to determining that the particular message belongs to a particular message classification, each of network elements 102, 104A-N, and 106 determines whether the particular message satisfies all of the attack detection criteria in any of the attack detection criteria sets that are associated with the particular message classification.

If the particular message satisfies any of the attack detection criteria in any of the attack detection criteria sets that are associated with the particular message classification, then the network element that made the determination takes a specified protective action, such as dropping all of the data packets that contain a portion of the message so that the packets do not reach the packets' destination (e.g., server application 112). Alternatively, if the particular message does not satisfy any of the attack detection criteria in at least one of the attack detection criteria sets that are associated with the particular message classification, then the network element that made the determination may safely forward the packets on toward the packets' destination.

Because application layer message inspection can be a resource-intensive task, a particular network element might become very busy with inspecting application layer messages. For example, network element 104A might become busy. As a result, the response time for messages sent via network element 104A may increase. Other network elements, such as network element 102, may detect this increase in response time using routing algorithms, and responsively divert messages toward other network elements in alternative paths to the messages' destinations. For example, since network element 104B is also contained in a path between network element 102 and server application 112, in response to detecting that the response time of network element 104A has increased beyond a certain threshold, network element 102 may route packets containing messages destined for server application 112 toward network element 104B instead of network element 104A.

Because it is less likely that all of network elements 104A-N will be overwhelmed by packets that contain bogus messages, each of network elements 104A-N is less vulnerable to denial-of-service attacks.

According to one embodiment, network elements 104A-N ensure that there are perfect trust points established. Applications' and users' public keys may be published to and maintained in key stores at the network element. A link to a key in a key store may be send within a message. If a hacker tries to confuse an application or user by inserting a random key into a message, the attempt to confuse will be foiled because the random key was never published to the key store at the network element. It becomes immediately ascertainable that something is wrong, and that the message cannot be trusted.

Applications sometimes have vulnerabilities. For example, an application might not be designed to receive more than one database record at a time; receipt of more than one database record at a time might cause the application to fail or behave erroneously. A man-in-the-middle attacker might intercept and modify a query on a response path before query results are delivered to a client application, so that too many database records will be delivered to the client application. According to one embodiment, policies are maintained at network elements 104A-N. For example, a policy may state that the number of database records requested within a message cannot exceed ten records. If a message that requests more than ten database records is received at one or network elements 104A-N (perhaps because a hacker modified an otherwise legitimate message to increase the number of requested records), then that network element will determine that the message violates the policy, and will take action to protect the application from which the message originated and/or the application for which the message is destined (e.g., by dropping the message). Thus, network elements 104A-N can protect against applications' vulnerabilities.

Separate network elements may be provisioned with attack prevention mechanisms of varying strictness. For example, a network element that is positioned closer to a database might allow a relatively narrow set of messages to pass through that network element, while a network element that is positioned near the edge of a network might allow a relatively broad set of messages to pass through that network element. The policies applied by each network element may differ.

FIG. 2 depicts a flow diagram 200 that illustrates an overview of one embodiment of a method of protecting against network attacks by inspecting application layer messages at a network element. Such a method may be performed, for example, by any of network elements 102, 104A-N, and 106. The method is effective in protecting against denial-of-service attacks and other attacks.

Referring to FIG. 2, in block 202, one or more data packets are received or intercepted at a network element. The data packets collectively contain an application layer message. For example, network element 104A may intercept multiple TCP/IP data packets, each of which contains a separate portion of an application layer message, such as a message structured according to a protocol implemented at OSI layer 4 and above. Each data packet may be addressed to server application 112 by the data packet's source. Thus, each data packet may be intended for server application 112. As is seen in FIG. 1, server application 112 is hosted on a device separate from network element 104A. Network element 104A is capable of determining application layer message boundaries, so, in one embodiment, network element 104A may perform operations (as described below) on an application layer message contained in a stream, or portions thereof, even if network element 104A has not yet received all of the data packets that contain all of the portions of the application layer message.

In block 204, the application layer message is determined from payload portions of the data packets at the network element. For example, network element 104A may assemble the contents of the payload portions of two or more of the data packets to construct a complete application layer message. The application layer message may be an XML document, for example, that follows an HTTP header in the collective payload portions. Thus, the message may be distinct and separate from any application layer protocol headers that are also contained in the collective payload portions.

In one embodiment, the application layer message is an encrypted message, and the network element decrypts the encrypted message in order to analyze the message's contents. For example, after assembling the encrypted contents of multiple payload portions, network element 104A may decrypt the resulting encrypted message using a specified cryptographic key that is stored at network element 104A, thereby producing a decrypted application layer message.

An application layer message may be a multi-part (MIME) message. In this case, each part of the multi-part message may be handled as though that part were a separate message.

In block 206, it is determined whether the application layer message satisfies one or more specified criteria. For example, network element 104A may determine whether the application layer message satisfies all of the attack detection criteria in any attack detection criteria set that is mapped to the message's classification. In one embodiment, network element 104A determines the message's classification by inspecting the source and destination IP addresses that are indicated in the IP headers of the data packets that contain the message, and then determining which message classification is mapped to those IP addresses. If the message satisfies the specified criteria, then control passes to block 208. Otherwise, control passes to block 210.

In one embodiment, the specified criteria are previously received and stored at the network element after the network element has already received one or more other data packets. Thus, the network element may be re-programmable. For example, after receiving and routing some data packets, network element 104A may receive user input that indicates a mapping between a message classification and a set of attack detection criteria. The user input may additionally indicate a mapping between the message classification and a set of IP addresses. In response to receiving the input, network element 104A may establish a mapping between the message classification, the IP addresses, and the set of attack detection criteria. Thereafter, network element 104A may evaluate messages based on the set of attack detection criteria. This feature allows users who are aware that a new form of attack is being perpetrated against their network to re-program and update network elements to protect against the new form of attack in "real time."

Various different attack detection criteria may be specified. For example, some attack detection criteria might be satisfied only if a message is larger or smaller than a specified size. Thus, determining whether a message satisfies a set of attack detection criteria might involve determining whether the message is larger or smaller than a specified size. For another example, some attack detection criteria might be satisfied only if the message is an XML document that fails to conform to a specified schema, such as an XML schema or Document Type Definition (DTD). Such an XML schema or DTD may be stored at the network element and mapped to a message classification. Thus, determining whether an XML document message satisfies a set of attack detection criteria might involve determining whether the XML document message conforms to an XML schema. In this manner, the network element may ascertain whether the elements of a particular class of XML document message conform to a specified interface used by a server application.

In one embodiment, messages that contain a specified keyword or set of keywords are prevented from being forwarded on through the network. For example, a network element may determine whether a message contains the keyword "confidential," and, if the message does, then the network element may prevent the message from being forwarded onward. Alternatively, the network element may erase or obfuscate a portion of the message that contains the keyword before forwarding the message onward. The network element may forward a copy of the message to another destination so that the message can be analyzed.

In block 208, the data packets that contained the application layer message are prevented from being received by the server application for which the message was intended. For example, in response to determining that the application layer message satisfies all or any of the attack detection criteria in at least one attack detection criteria set that is mapped to the message's classification, network element 104A may drop the data packets that contained the message, so that the packets are not received by server application 112.

Alternatively, in block 210, data packets that contain the application layer message are sent toward the server application for which the message was intended. For example, in response to determining that the application layer message does not satisfy all of the attack detection criteria in any attack detection criteria set that is mapped to the message's classification, network element 104A may route, toward server application 112, data packets that collectively contain the message.

As a result, denial-of-service attacks may be thwarted at a network element, such as a switch or router, even if those attacks involve tactics more sophisticated than merely sending a large quantity of data packets toward a target.

3.0 Implementation Examples 3.1 Multi-Blade Architecture

Figure 6:
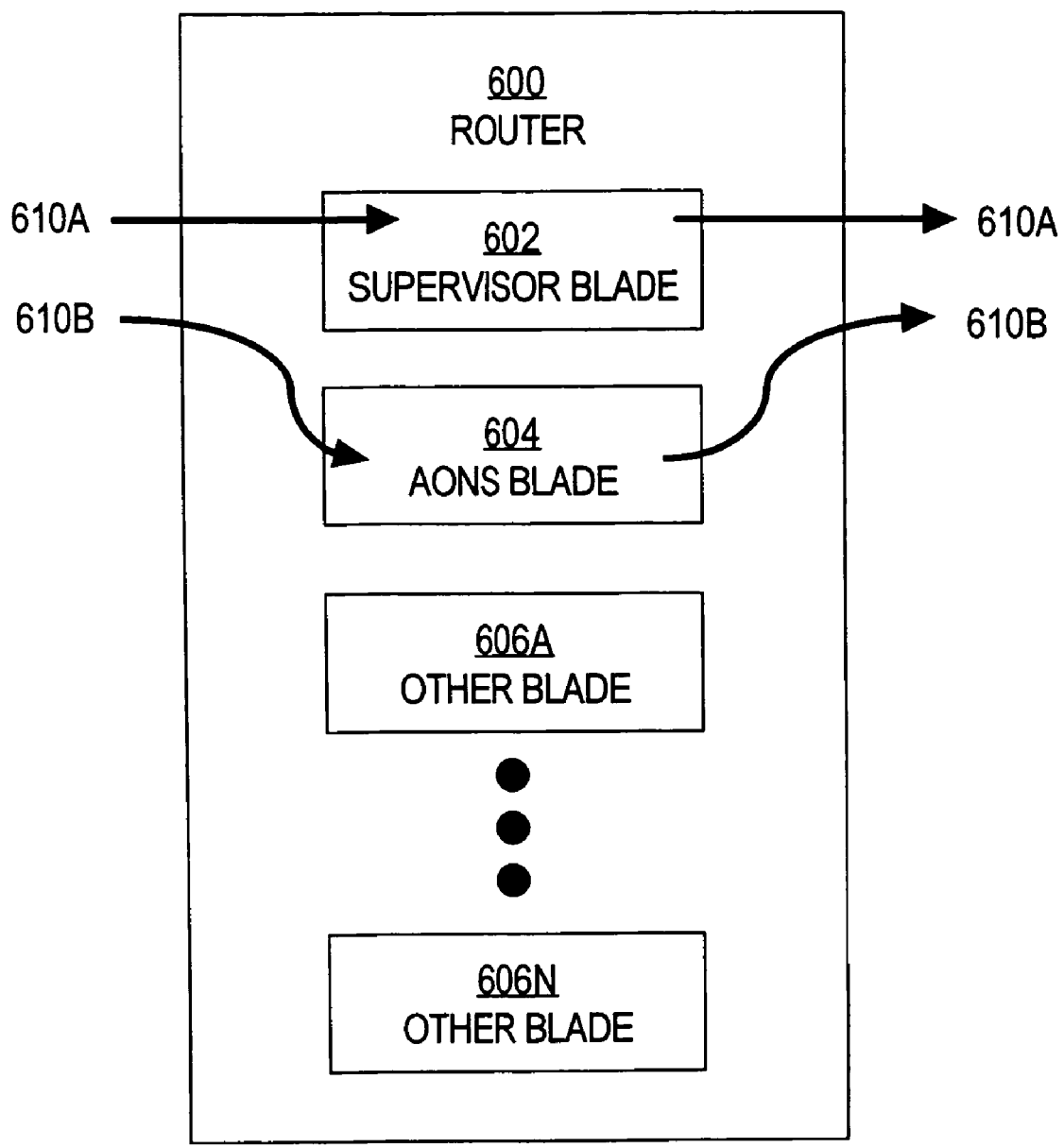
FIG. 6 is a block diagram that illustrates one embodiment of a router in which a supervisor blade directs some packet flows to an AONS blade and/or other blades.

According to one embodiment, an Application-Oriented Network Services (AONS) blade in a router or a switch performs the actions discussed above. FIG. 6 is a block diagram that illustrates one embodiment of a router 600 in which a supervisor blade 602 directs some of packet flows 610A-B to an AONS blade and/or other blades 606N. Router 600 comprises supervisor blade 602, AONS blade 604, and other blades 606A-N. Each of blades 602, 604, and 606A-N is a single circuit board populated with components such as processors, memory, and network connections that are usually found on multiple boards. Blades 602, 604, and 606A-N are designed to be addable to and removable from router 600. The functionality of router 600 is determined by the functionality of the blades therein. Adding blades to router 600 can augment the functionality of router 600, but router 600 can provide a lesser degree of functionality with fewer blades at a lesser cost if desired. One of more of the blades may be optional.

Router 600 receives packet flows such as packet flows 610A-B. More specifically, packet flows 610A-B received by router 600 are received by supervisor blade 602. Supervisor blade 602 may comprise a forwarding engine and/or a route processor such as those commercially available from Cisco Systems, Inc.

In one embodiment, supervisor blade 602 classifies packet flows 610A-B based on one or more parameters contained in the packet headers of those packet flows. If the parameters contained in the packet header of a particular packet match specified parameters, then supervisor blade 602 sends the packets to a specified one of AONS blade 604 and/or other blades 606A-N. Alternatively, if the parameters contained in the packet header do not match any specified parameters, then supervisor blade 602 performs routing functions relative to the particular packet and forwards the particular packet on toward the particular packet's destination.

For example, supervisor blade 602 may determine that packet headers in packet flow 610B match specified parameters. Consequently, supervisor blade 602 may send packets in packet flow 610B to AONS blade 604. Supervisor blade 602 may receive packets back from AONS blade 604 and/or other blades 606A-N and send the packets on to the next hop in a network path that leads to those packets' destination. For another example, supervisor blade 602 may determine that packet headers in packet flow 610A do not match any specified parameters. Consequently, without sending any packets in packet flow 610A to AONS blade 604 or other blades 606A-N, supervisor blade 602 may send packets in packet flow 610A on to the next hop in a network path that leads to those packets' destination.

AONS blade 604 and other blades 606A-N receive packets from supervisor blade 602, perform operations relative to the packets, and return the packets to supervisor blade 602. Supervisor blade 602 may send packets to and receive packets from multiple blades before sending those packets out of router 600. For example, supervisor blade 602 may send a particular group of packets to other blade 606A. Other blade 606A may perform firewall functions relative to the packets and send the packets back to supervisor blade 602. Supervisor blade 602 may receive the packet from other blade 606A and send the packets to AONS blade 604. AONS blade 604 may perform one or more message payload-based operations relative to the packets and send the packets back to supervisor blade 602.

One or more of other blades 606A-N may be firewall blades that allow or deny data packets based on attributes indicated in the layer 2 and layer 3 headers of those data packets. In one embodiment, in response to detecting that a particular class of messages is being used to mount an attack, AONS blade 604 configures one or more of other blades 606A-N to deny data packets that satisfy specified criteria. As a result, other blades 606A-N may prevent bad data packets from reaching AONS blade 604, provided that supervisor blade 602 sends data packets to those other blade(s) before sending those data packet to AONS blade 604. In one embodiment, AONS blade 604 configures supervisor blade 602 to direct a smaller proportion of data packets to AONS blade 604. In response, supervisor blade 602 sends a greater proportion of packets out of router 600 without involving AONS blade 604 in the inspection of those packets.

According to one embodiment, the following events occur at an AONS router such as router 600. First, packets, containing messages from clients to servers, are received. Next, access control list-based filtering is performed on the packets and some of the packets are sent to an AONS blade or module. Next, TCP termination is performed on the packets. Next, Secure Sockets Layer (SSL) termination is performed on the packets if necessary. Next, Universal Resource Locator (URL)-based filtering is performed on the packets. Next, message header-based and message content-based filtering is performed on the packets. Next, the messages contained in the packets are classified into AONS message types. Next, a policy flow that corresponds to the AONS message type is selected. Next, the selected policy flow is executed. Then the packets are either forwarded, redirected, dropped, copied, modified, or fanned-out as specified by the selected policy flow.

Figure 3A:
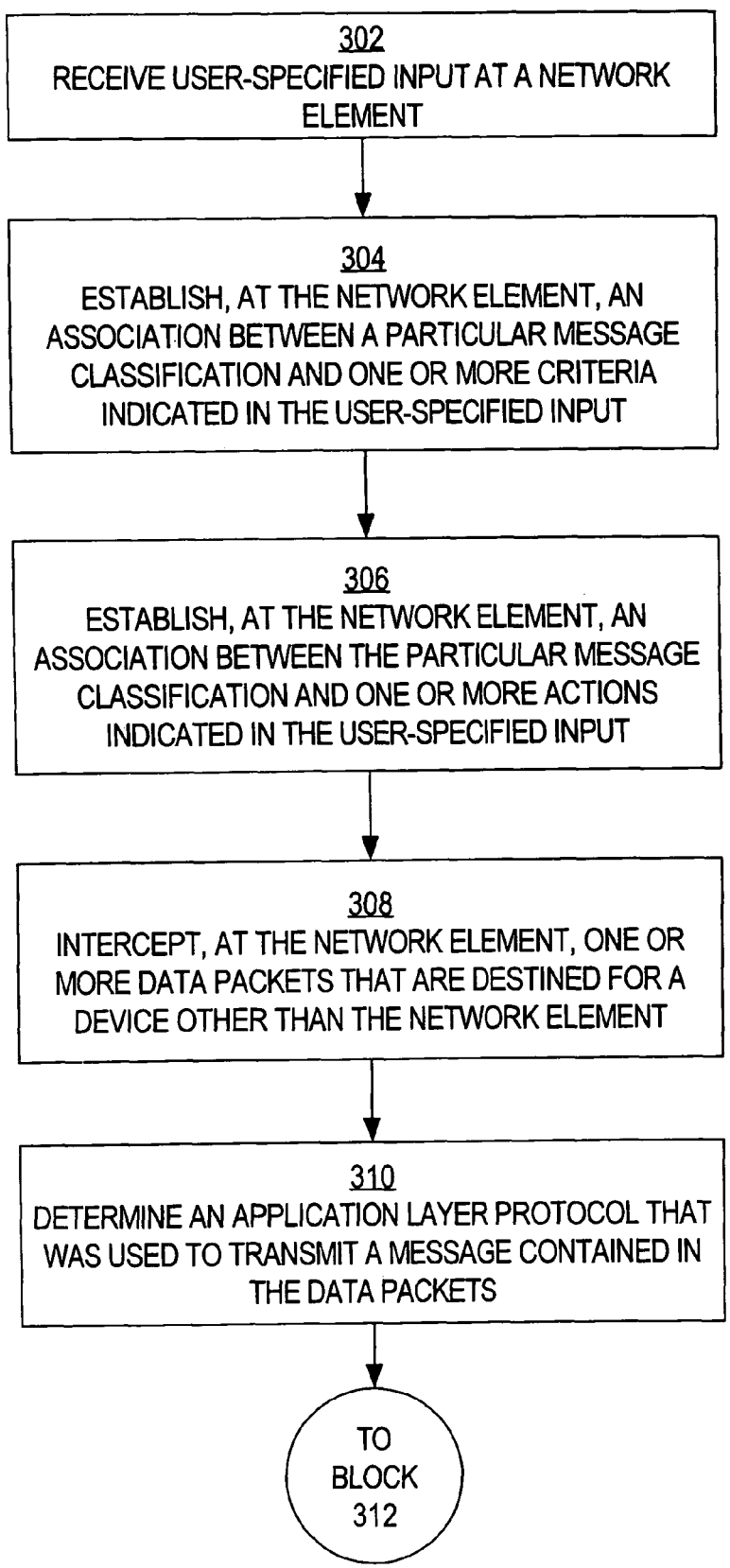
FIGS. 3A-B depict a flow diagram that illustrates one embodiment of a method of inspecting application layer messages at a network element to protect against denial-of-service attacks.
Figure 3B:
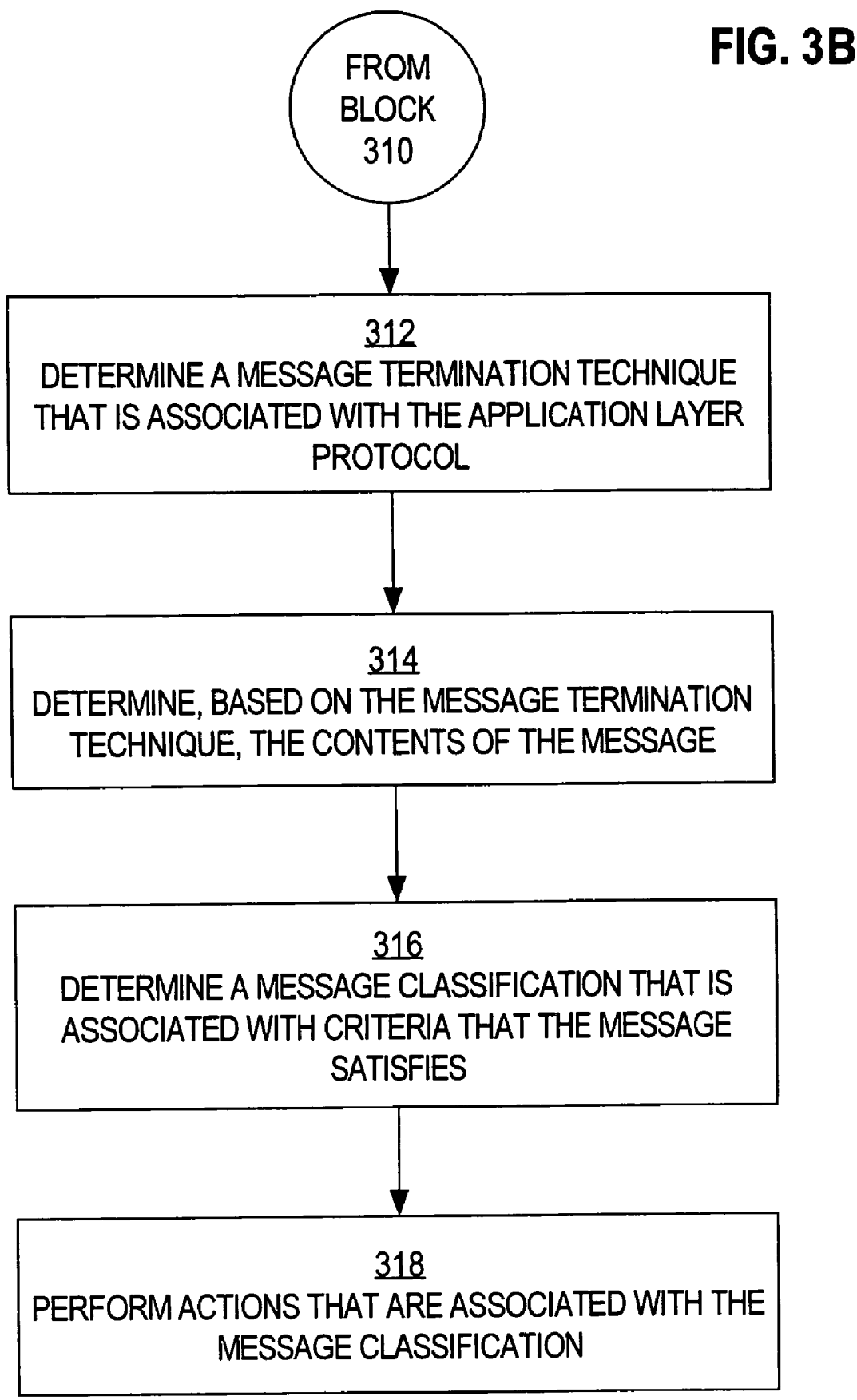

3.2 Protecting a Network Against a Denial-of-Service Attack by Inspecting Application Layer Messages FIGS. 3A-B depict a flow diagram 300 that illustrates one embodiment of a method of inspecting application layer messages at a network element to protect against denial-of-service attacks. For example, one or more of network elements 102, 104A-N, and 106 may perform such a method. More specifically, AONS blade 604 may perform one or more steps of such a method. Other embodiments may omit one or more of the operations depicted in flow diagram 300. Other embodiments may contain operations additional to the operation depicted in flow diagram 300. Other embodiments may perform the operations depicted in flow diagram 300 in an order that differs from the order depicted in flow diagram 300.

Referring first to FIG. 3A, in block 302, user-specified input is received at a network element. The user-specified input indicates the following: one or more criteria that are to be associated with a particular message classification, and one or more actions that are to be associated with the particular message classification. The user-specified input may indicate an order in which the one or more actions are to be performed. The user-specified input may indicate that outputs of actions are to be supplied as inputs to other actions. For example, network element 104, and more specifically AONS blade 604, may receive such user-specified input from a network administrator.

In block 304, an association is established, at the network element, between the particular message classification and the one or more criteria. For example, AONS blade 604 may establish an association between a particular message classification and one or more criteria. For example, the criteria may indicate a particular string of text that a message needs to contain in order for the message to belong to the associated message classification. For another example, the criteria may indicate a particular path that needs to exist in the hierarchical structure of an XML-formatted message in order for the message to belong to the associated message classification. For another example, the criteria may indicate one or more source IP addresses and/or destination IP addresses from or to which a message needs to be addressed in order for the message to belong to the associated message classification.

In block 306, an association is established, at the network element, between the particular message classification and the one or more actions. One or more actions that are associated with a particular message classification comprise a "policy" that is associated with that particular message classification. A policy may comprise a "flow" of one or more actions that are ordered according to a particular order specified in the user-specified input, and/or one or more other actions that are not ordered. For example, AONS blade 604 may establish an association between a particular message classification and one or more actions. Collectively, the operations of blocks 302-306 may comprise "provisioning" the network element.

In block 308, one or more data packets that are destined for a device other than the network element are intercepted by the network element. The data packets may be, for example, data packets that contain IP and TCP headers. The IP addresses indicated in the IP headers of the data packets differ from the network element's IP address; thus, the data packets are destined for a device other than the network element. For example, network element 104, and more specifically, supervisor blade 602, may intercept data packets that client application 110 originally sent. The data packets might be destined for server application 112, for example.

In block 310, based on one or more information items indicated in the headers of the data packets, an application layer protocol that was used to transmit a message contained in the payload portions of the data packets (hereinafter "the message") is determined. The information items may include, for example, a source IP address in an IP header, a destination IP address in an IP header, a TCP source port in a TCP header, and a TCP destination port in a TCP header. For example, network element 104, and more specifically AONS blade 604, may store mapping information that maps FTP (an application layer protocol) to a first combination of IP addresses and/or TCP ports, and that maps HTTP (another application layer protocol) to a second combination of IP addresses and/or TCP ports. Based on this mapping information and the IP addresses and/or TCP ports indicated by the intercepted data packets, AONS blade 604 may determine which application layer protocol (FTP, HTTP, Simple Mail Transfer Protocol (SMTP), etc.) was used to transmit the message.

In block 312, a message termination technique that is associated with the application layer protocol used to transmit the message is determined. For example, AONS blade 604 may store mapping information that maps FTP to a first procedure, that maps HTTP to a second procedure, and that maps SMTP to a third procedure. The first procedure may employ a first message termination technique that can be used to extract, from the data packets, a message that was transmitted using FTP. The second procedure may employ a second message termination technique that can be used to extract, from the data packets, a message that was transmitted using HTTP. The third procedure may employ a third message termination technique that can be used to extract, from the data packets, a message that was transmitted using SMTP. Based on this mapping information and the application layer protocol used to transmit the message, AONS blade 604 may determine which procedure should be called to extract the message from the data packets.

In block 314, the contents of the message are determined based on the termination technique that is associated with the application layer protocol that was used to transmit the message. For example, AONS blade 604 may provide the data packets as input to a procedure that is mapped to the application layer protocol determined in block 312. The procedure may use the appropriate message termination technique to extract the contents of the message from the data packets. The procedure may return the message as output to AONS blade 604. Thus, in one embodiment, the message extracted from the data packets is independent of the application layer protocol that was used to transmit the message.

In block 316, a message classification that is associated with criteria that the message satisfies is determined. For example, AONS blade 604 may store mapping information that maps different criteria to different message classifications. The mapping information indicates, among possibly many different associations, the association established in block 304. AONS blade 604 may determine whether the contents of the message satisfy criteria associated with any of the known message classifications. In one embodiment, if the contents of the message satisfy the criteria associated with a particular message classification, then it is determined that the message belongs to the particular message classification.

Although, in one embodiment, the contents of the message are used to determine a message's classification, in alternative embodiments, information beyond that contained in the message may be used to determine the message's classification. For example, in one embodiment, a combination of the contents of the message and one or more IP addresses and/or TCP ports indicated in the data packets that contain the message is used to determine the message's classification. For another example, in one embodiment, one or more IP addresses and/or TCP ports indicated in the data packets that contain the message are used to determine the message's classification, regardless of the contents of the message.

In block 318, one or more actions that are associated with the message classification determined in block 316 are performed. If two or more of the actions are associated with a specified order of performance, as indicated by the user-specified input, then those actions are performed in the specified order. If the output of any of the actions is supposed to be provided as input to any of the actions, as indicated by the user-specified input, then the output of the specified action is provided as input to the other specified action.

A variety of different actions may be performed relative to the message. For example, an action might be an "attack protection" action that specifies one or more sets of attack detection criteria. When the "attack protection" action is performed, it is determined whether the message satisfies all or any of the attack detection criteria in any of the attack detection criteria sets that are specified for the action. If the message satisfies all or any of the attack detection criteria in any of the attack detection criteria sets that are specified for the action, then one or more additional actions may be performed, such as dropping the packets that contained the message, logging the message, quarantining the message, re-routing the message, repairing the message, etc. A network administrator may specify such additional actions.

As a result of the method illustrated in flow diagram 300, network routers, switches, and other intermediary network elements may be configured "on the fly" to prevent bogus data packets from reaching server applications.

3.3 Action Flows

Figure 4:
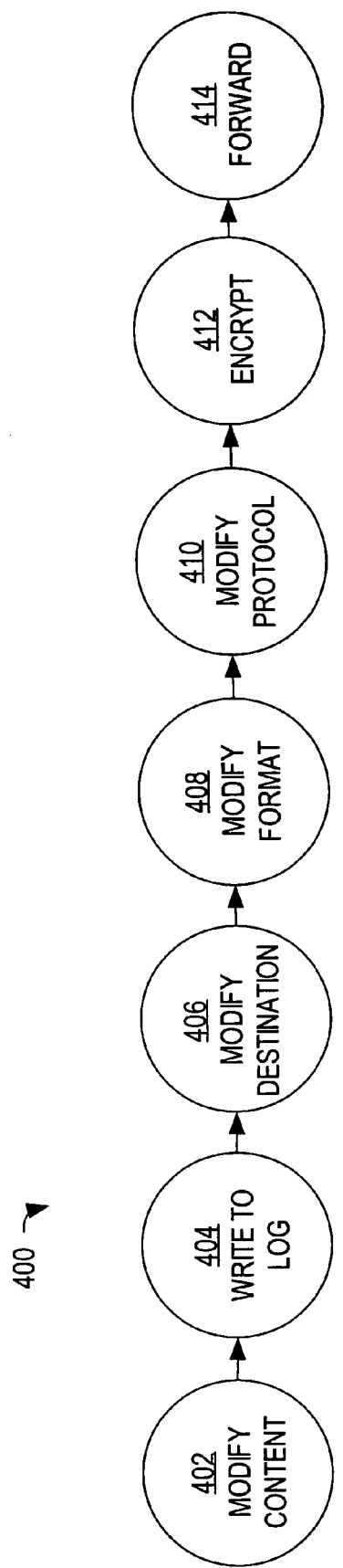
FIG. 4 depicts a sample flow that might be associated with a particular message classification.

FIG. 4 depicts a sample flow 400 that might be associated with a particular message classification. Flow 400 comprises, in order, actions 402-414; other flows may comprise one or more other actions. Action 402 indicates that the content of the message should be modified in a specified manner. Action 404 indicates that a specified event should be written (i.e., logged) to a specified log. Action 406 indicates that the message's destination should be changed (i.e., re-routed) to a specified destination. Action 408 indicates that the message's format should be translated into a specified message format. Action 410 indicates that the application layer protocol used to transmit the message or content should be changed to a specified application layer protocol. Action 412 indicates that the message or content should be encrypted using a particular key. Action 414 indicates that the message should be forwarded towards the message's destination. Other actions may indicate that a message should be dropped, deleted, or quarantined.

Although these actions may be performed relative to messages that are sent between applications (e.g., request/response messages), these actions also may be performed relative to other content, such as content generated by the network element itself and content that is addressed specifically to the network element alone. These actions may be performed relative to exception processing messages.

In other embodiments, any one of actions 402-414 may be performed individually or in combination with any others of actions 402-414.

3.4 AONS Examples

3.4.1 AONS General Overview

Application-Oriented Network Systems (AONS) is a technology foundation for building a class of products that embed intelligence into the network to better meet the needs of application deployment. AONS complements existing networking technologies by providing a greater degree of awareness of what information is flowing within the network and helping customers to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS provides this enhanced support by understanding more about the content and context of information flow. As such, AONS works primarily at the message rather than at the packet level. Typically, AONS processing of information terminates a TCP connection to inspect the full message, including the "payload" as well as all headers. AONS also understands and assists with popular application-level protocols such as HTTP, FTP, SMTP and de facto standard middleware protocols.

AONS differs from middleware products running on general-purpose computing systems in that AONS' behavior is more akin to a network appliance, in its simplicity, total cost of ownership and performance. Furthermore, AONS integrates with network-layer support to provide a more holistic approach to information flow and management, mapping required features at the application layer into low-level networking features implemented by routers, switches, firewalls and other networking systems.

Although some elements of AONS-like functionality are provided in existing product lines from Cisco Systems, Inc., such products typically work off a more limited awareness of information, such as IP/port addresses or HTTP headers, to provide load balancing and failover solutions. AONS provides a framework for broader functional support, a broader class of applications and a greater degree of control and management of application data.

3.4.2 AONS Terminology

An "application" is a software entity that performs a business function either running on servers or desktop systems. The application could be a packaged application, software running on application servers, a legacy application running on a mainframe, or custom or proprietary software developed in house to satisfy a business need or a script that performs some operation. These applications can communicate with other applications in the same department (departmental), across departments within a single enterprise (intra enterprise), across an enterprise and its partners (inter-enterprise or B2B) or an enterprise and its customers (consumers or B2C). AONS provides value added services for any of the above scenarios.

An "application message" is a message that is generated by an application to communicate with another application. The application message could specify the different business level steps that should be performed in handling this message and could be in any of the message formats described in the section below. In the rest of the document, unless otherwise specified explicitly, the term "message" also refers to an application message.

An "AONS node" is the primary AONS component within the AONS system (or network). As described later, the AONS node can take the shape of a client proxy, server proxy or an intermediate device that routes application messages.

Each application message, when received by the first AONS node, gets assigned an AONS message ID and is considered to be an "AONS message" until that message gets delivered to the destination AONS node. The concept of the AONS message exists within the AONS cloud. A single application message may map to more than one AONS message. This may be the case, for example, if the application message requires processing by more than one business function. For example, a "LoanRequest" message that is submitted by a requesting application and that needs to be processed by both a "CreditCheck" application and a "LoanProcessing" application would require processing by more than one business function. In this example, from the perspective of AONS, there are two AONS messages: The "LoanRequest" to the "CreditCheck" AONS message from the requesting application to the CreditCheck application; and the "LoanRequest" to the "LoanProcessing" AONS message from the CreditCheck application to the LoanProcessing Application.

In one embodiment, AONS messages are encapsulated in an AONP (AON Protocol) message that contains AONP headers, and are translated to a "canonical" format. AONP is a mechanism to enable federation between two or more AONS nodes. For example, a first AONS node may know that it is acting in conjunction with a second or other AONS node; thus the AONS nodes are "federated." The first AONS node might have performed one or more actions, such as encryption, signing, authentication, etc., relative to a particular message. The first AONS node may indicate, in one or more AONP headers, the actions that the first AONS node performed. Upon receiving the AONP message, the second AONS node may determine from the AONP headers that the actions have been performed. As a result, the second AONS node may forego performing those actions, or perform other functions in an efficient and optimal way. Reliability, logging and security services are provided from an AONS message perspective.

The set of protocols or methods that applications typically use to communicate with each other are called "application access protocols" (or methods) from an AONS perspective. Applications can communicate to the AONS network (typically end point proxies: a client proxy and a server proxy) using any supported application access methods. Some examples of application access protocols include: IBM MQ Series, Java Message Service (JMS), TIBCO, Simple Object Access Protocol (SOAP) over Hypertext Transfer Protocol (HTTP)/HTTPS, Simple Mail Transfer Protocol (SMTP), File Transfer Protocol (FTP), Java Database Connectivity (JDBC), TCP, etc. Details about various access methods are explained in later sections of this document.

There are a wide variety of "message formats" that are used by applications. These message formats may range from custom or proprietary formats to industry-specific formats to standardized formats. Extensible Markup Language (XML) is gaining popularity as a universal language or message format for applications to communicate with each other. AONS supports a wide variety of these formats.

In addition, in one embodiment, AONS provides content translation services from one format to another based on the needs of applications. A typical deployment might involve a first AONS node that receives an application message (the client proxy) translating the message to a "canonical" format, which is carried as an AONS message through the AONS network. The server proxy might translate the message from the "canonical" format to the format understood by the receiving application before delivering the message. However, proxies are not required. For understanding some of the non-industry standard formats, a message dictionary may be used.

A node that performs the gateway functionality between multiple application access methods or protocols is called a "protocol gateway." An example of this would be a node that receives an application message through File Transfer Protocol (FTP) and sends the same message to another application as a HTTP post. In AONS, the client and server proxies are typically expected to perform the protocol gateway functionality.

If an application generates a message in Electronic Data Interchange (EDI) format and if the receiving application expects the message to be in an XML format, then the message format needs to be translated but the content of the message needs to be kept intact through the translation. In AONS, the end point proxies typically perform this "message format translation" functionality.

In some cases, even though the sending and receiving application use the same message format, the content needs to be translated for the receiving application. For example, if a United States-resident application is communicating with a United Kingdom-resident application, then the date format in the messages between the two applications might need to be translated (from mm/dd/yyyy to dd/mm/yyyy) even if the applications use the same data representation (or message format). This translation is called "content translation." In one embodiment, an AONS node avoids false claims on context validation by appropriately repairing or transforming content's format (such as the date format discussed above). Such repair and transformation may be performed relative to binary code, text, ascii code, etc.

3.4.3 AONS Functional Overview

As defined previously, AONS can be defined as network-based intelligent intermediary systems that efficiently and effectively integrate business and application needs with more flexible and responsive network services.

In particular, AONS can be understood through the following characteristics:

AONS operates at a higher layer (layers 5-6) than traditional network element products (layers 2-4). AONS uses message-level inspection as a complement to packet-level inspection—by understanding application messages, AONS adds value to multiple network element products, such as switches, firewalls, content caching systems and load balancers, on the "message exchange route." AONS provides increased flexibility and granularity of network responsiveness in terms of security, reliability, traffic optimization (compression, caching), visibility (business events and network events) and transformation (e.g., from XML to EDI).

AONS is a comprehensive technology platform, not just a point solution. AONS can be implemented through distributed intelligent intermediary systems that sit between applications, middleware, and databases in a distributed intra- and inter-enterprise environment (routing messages, performing transformations, etc.). AONS provides a flexible framework for end user configuration of business flows and policies and partner-driven extensibility of AONS services.

AONS is especially well suited for network-based deployment. AONS is network-based rather than general-purpose server-based. AONS is hybrid software-based and hardware-based (i.e., application-specific integrated circuit (ASIC)/field programmable gate array (FPGA)-based acceleration). AONS uses out-of-band or in-line processing of traffic, as determined by policy. AONS is deployed in standalone products (network appliances) as well as embedded products (service blades for multiple switching, routing, and storage platforms).

3.4.4 AONS System Overview

Figure 7:
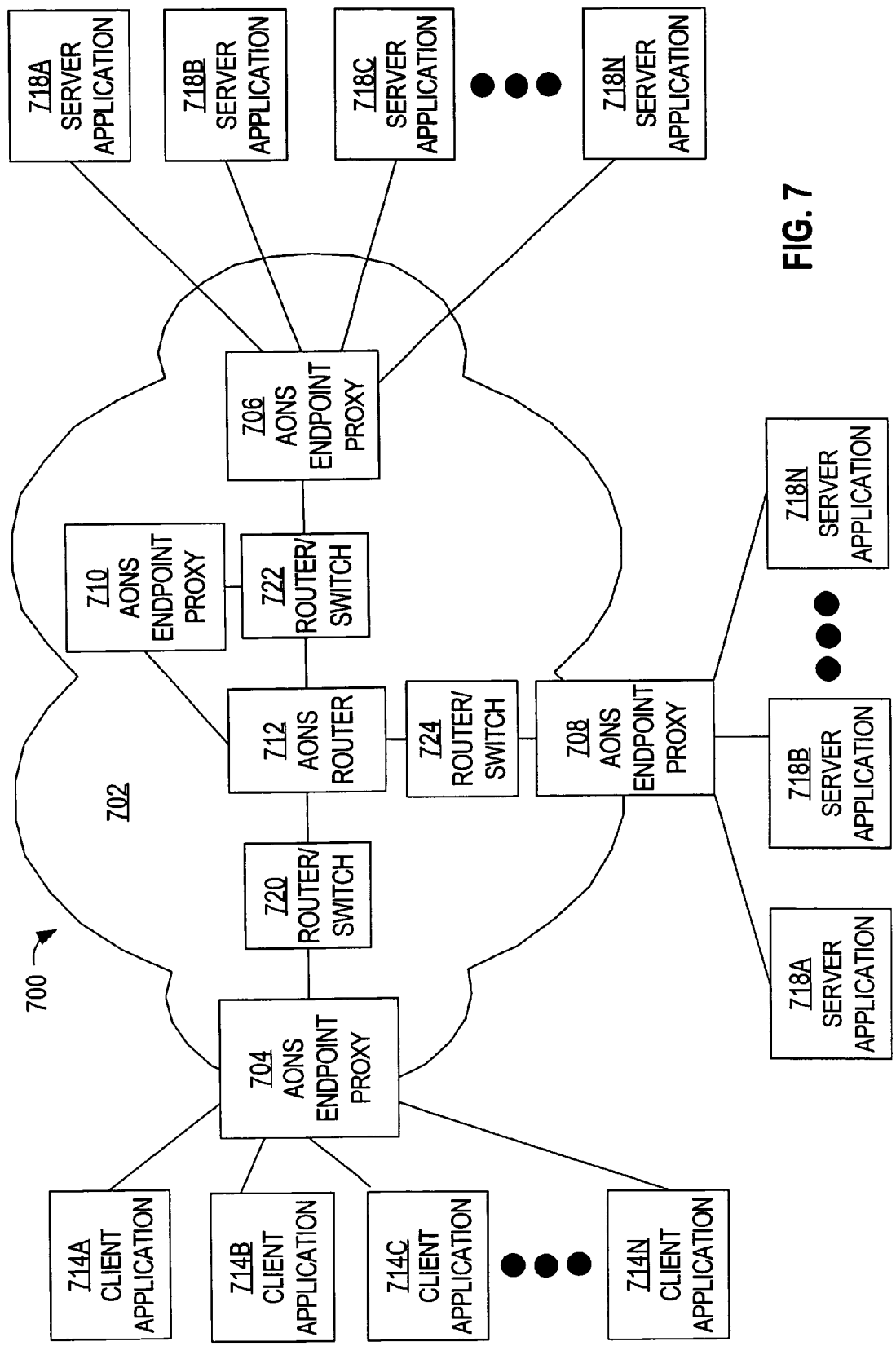
FIG. 7 is a diagram that illustrates the various components involved in an AONS network according to one embodiment.

This section outlines the system overview of an example AONS system. FIG. 7 is a diagram 700 that illustrates the various components involved in an example AONS network 702 according to one embodiment of the invention. The roles performed by each of the nodes are mentioned in detail in subsequent sections.

Within AONS network 702, key building blocks include AONS Endpoint Proxies (AEPs) 704-710, which are located at the edge of the AONS network and serve as the entry and exit points, and an AONS Router (AR), which is located within the AONS network. Visibility into application intent may begin within AEP 704 placed at the edge of a logical AONS "cloud." As a particular client application of client applications 714A-N attempts to send a message across the network to a particular server application destination of server applications 716A-N and 718A-N, the particular client application will first interact with AEP 704.

AEP 704 serves as either a transparent or explicit messaging gateway which aggregates network packets into application messages and infers the message-level intent by examining the header and payload of a given message, relating the message to the appropriate context, optionally applying appropriate policies (e.g. message encryption, transformation, etc.) and then routing the message towards the message's application destination via a network switch.

AONS Router (AR) 712 may intercept the message en route to the message's destination endpoint. Based upon message header contents, AR 712 may determine that a new route would better serve the needs of a given application system. AR 712 may make this determination based upon enterprise-level policy, taking into account current network conditions. As the message nears its destination, the message may encounter AEP 706, which may perform a final set of operations (e.g. message decryption, acknowledgement of delivery) prior to the message's arrival. In one embodiment, each message is only parsed once: when the message first enters the AONS cloud. It is the first AEP that a message traverses that is responsible for preparing a message for optimal handling within the underlying network.

AEPs 704-708 can further be classified into AEP Client Proxies and AEP Server Proxies to explicitly highlight roles and operations performed by the AEP on behalf of the specific end point applications.

A typical message flow involves a particular client application 714A submitting a message to the AEP Client Proxy (CP) 704 through one of the various access protocols supported by AONS. On receiving this message, AEP CP 704 assigns an AONS message id to the message, encapsulates the message with an AONP message that contains AONP headers, and performs any necessary operations related to the AONS network (e.g. security and reliability services). Also, if necessary, the message is converted to a "canonical" format by AEP CP 704. The message is carried over a TCP connection to AR 710 along the path to the destination application 718A. The AONS routers or switches along the path perform the infrastructure services necessary for the message and can change the routing based on the policies configured by the customer. The message is received at the destination AEP Server Proxy (SP) 706. AEP SP 706 performs necessary security and reliability functions and translates the message to the format that is understood by the receiving application, if necessary. AEP SP 706 then sends the message to receiving application 718A using any of the access protocols that application 718A and AONS support. A detailed message flow through AONS network 702 is described in later sections.

The message processing described herein may be performed with respect to the content of different kinds of messages that an AONS node may encounter. AONS nodes may process request messages, response messages, messages that called out from an AONS node or that are brought into an AONS node, or exception messages; AONS nodes may process contents of messages beyond those or the type that are sent between client and server applications. For example, in response to intercepting a message from a client application, an AONS node may generate and send another message to a database server. The AONS node may subsequently receive yet another message from the database server. The AONS node may perform message processing in the manner described herein on any of the messages mentioned above, not just on the messages from the client.

An AONS node may perform specified actions in response to determining that the delivery of a message will cause a failure. For example, an AONS node may determine that a message is larger than the maximum size that can be accepted by a server application for which the message is destined. In response, the AONS node may prevent the message from being forwarded to the server application. Instead, the AONS node may log the message for later inspection by an administrator. For another example, in response to determining that a message contains a virus or other malignant content, an AONS node may "inoculate" the message (e.g., by encrypting and/or compressing the message content), and then store the "inoculated" message in a log for later inspection by an administrator.

3.4.5 AONS System Elements

This section outlines the different concepts that are used from an AONS perspective.

An "AEP Client Proxy" is an AONS node that performs the services necessary for applications on the sending side of a message (a client). In the rest of this document, an endpoint proxy also refers to a client or server proxy. Although AONS nodes may fulfill the roles of proxies, they are typically not designated as such; "AEP proxy" is a term used to define a role. The typical responsibilities of the client proxy in processing a message are: message pre-classification & early rejection, protocol management, message identity management, message encapsulation in an AONP header, end point origination for reliable delivery, security end point service origination (encryption, digital signature, authentication), flow selection & execution/infrastructure services (logging, compression, content transformation, etc.), routing—next hop AONS node or destination, AONS node and route discovery/advertising role and routes, and end point origination for the reliable delivery mechanism (guaranteed delivery router).

Not all functionalities described above need to be performed for each message. The functionalities performed on the message are controlled by the policies configured for the AONS node.

An "AEP Server Proxy" is an AONS node that performs the services necessary for applications on the receiving side of a message (a server). In the rest of the document, a Server Proxy may also be referred as an end point proxy. The typical responsibilities of the Server Proxy in processing a message are: protocol management, end point termination for reliable delivery, security end point service termination (decryption, verification of digital signature, etc.), flow selection & execution/infrastructure services (logging, compression, content translation, etc.), message de-encapsulation in AONP header, acknowledgement to sending AONS node, application routing/request message delivery to destination, response message correlation, and routing to entry AONS node.

Note that not all the functionalities listed above need to be performed for each message. The functionalities performed on the message are controlled by the policies configured for the AONS node and what the message header indicates.

An "AONS Router" is an AONS node that provides message-forwarding functionalities along with additional infrastructure services within an AONS network. An AONS Router communicates with Client Proxies, Server Proxies and other AONS Routers. An AONS Router may provide service without parsing a message; an AONS Router may rely on an AONP message header and the policies configured in the AONS network instead of parsing messages. An AONS Router provides the following functionalities: scalability in the AONS network in terms of the number of TCP connections needed; message routing based on message destination, policies configured in the AONS cloud, a route specified in the message, and/or content of the message; a load at the intended destination—re-routing if needed; availability of the destination—re-routing if needed; cost of transmission (selection among multiple service providers); and infrastructure services such as sending to a logging facility, sending to a storage area network (SAN) for backup purposes, and interfacing to a cache engine for cacheable messages (like catalogs).

AONS Routers do not need to understand any of the application access protocols and, in one embodiment, deal only with messages encapsulated with an AONP header.

Application-Oriented Networking Protocol (AONP) is a protocol used for communication between the nodes in an AONS network. In one embodiment, each AONS message carries an AONP header that conveys the destination of the message and additional information for processing the message in subsequent nodes. AONP also addresses policy exchange (static or dynamic), fail-over among nodes, load balancing among AONS nodes, and exchange of routing information. AONP also enables application-oriented message processing in multiple network elements (like firewalls, cache engines and routers/switches). AONP supports both a fixed header and a variable header (formed using type-length-value (TLV) fields) to support efficient processing in intermediate nodes as well as flexibility for additional services.

Unless explicitly specified otherwise, "router" or "switch" refers herein to a typical Layer 3 or Layer 2 switch or a router that is currently commercially available.

3.4.6 AONS Example Features

In one embodiment, an underlying "AONS foundation platform of subsystem services" (AOS) provides a range of general-purpose services including support for security, compression, caching, reliability, policy management and other services. On top of this platform, AONS then offers a range of discreet functional components that can be wired together to provide the overall processing of incoming data traffic. These "Bladelets™" are targeted at effecting individual services in the context of the specific policy or action demanded by the application or the information technology (IT) manager. A series of access method adaptors ensure support for a range of ingress and egress formats. Finally, a set of user-oriented tools enable managers to appropriately view, configure and set policies for the AONS solution. These four categories of functions combine to provide a range of end-customer capabilities including enhanced security, infrastructure optimization, business continuity, application integration and operational visibility.

The enhanced visibility and enhanced responsiveness enabled by AONS solutions provides a number of intelligent, application-oriented network services. These intelligent services can be summarized in four primary categories:

Enhanced security and reliability: enabling reliable message delivery and providing message-level security in addition to existing network-level security.

Infrastructure optimization: making more efficient use of network resources by taking advantage of caching and compression at the message level as well as by integrating application and network quality-of-service (QoS).

Business and infrastructure activity monitoring and management: by reading information contained in the application layer message, AONS can log, audit, and manage application-level business events, and combine these with network, server, and storage infrastructure events in a common, policy-driven management environment.

Content-based routing and transformation: message-based routing and transformation of protocol, content, data, and message formats (e.g., XML transformation). The individual features belonging to each of these primary categories are described in greater detail below.

3.4.6.1 Enhanced Security and Reliability

Authentication: AONS can verify the identity of the sender of an inbound message based upon various pieces of information contained within a given message (username/password, digital certificate, Security Assertion Markup Language (SAML) assertion, etc.), and, based upon these credentials, determine whether or not the message should be processed further.

Authorization: Once principal credentials are obtained via message inspection, AONS can determine what level of access the originator of the message should have to the services it is attempting to invoke. AONS may also make routing decisions based upon such derived privileges or block or mask certain data elements within a message once it's within an AONS network as appropriate.

Encryption/Decryption: Based upon policy, AONS can perform encryption of message elements (an entire message, the message body or individual elements such as credit card number) to maintain end-to-end confidentiality as a message travels through the AONS network. Conversely, AONS can perform decryption of these elements prior to arrival at a given endpoint.

Digital Signatures: In order to ensure message integrity and allow for non-repudiation of message transactions, AONS can digitally sign entire messages or individual message elements at any given AEP. The decision as to what gets signed will be determined by policy as applied to information derived from the contents and context of each message.

Reliability: AONS can complement existing guaranteed messaging systems by intermediating between unlike proprietary mechanisms. It can also provide reliability for HTTP-based applications (including web services) that currently lack reliable delivery. As an additional feature, AONS can generate confirmations of successful message delivery as well as automatically generate exception responses when delivery cannot be confirmed.

3.4.6.2 Infrastructure Optimization

Compression and stream-based data extraction: AEPs can compress message data prior to sending the message data across the network in order to conserve bandwidth and conversely decompress it prior to endpoint delivery. AEPs can also extract data to perform message classification without waiting for the whole message to be read in.

Caching: AONS can cache the results of previous message inquires based upon the rules defined for a type of request or based upon indicators set in the response. Caching can be performed for entire messages or for certain elements of a message in order to reduce application response time and conserve network bandwidth utilization. Message element caching enables delta processing for subsequent message requests.

TCP Connection Pooling: By serving as an intermediary between message clients and servers AONS can consolidate the total number of persistent connections required between applications. AONS thereby reduces the client and server-processing load otherwise associated with the ongoing initiation and teardown of connections between a mesh of endpoints.

Batching: An AONS intermediary can batch transactional messages destined for multiple destinations to reduce disk I/O overheads on the sending system. Similarly, transactional messages from multiple sources can be batched to reduce disk I/O overheads on the receiving system.

Hardware Acceleration: By efficiently performing compute-intensive functions such as encryption and Extensible Stylesheet Language Transformation (XSLT) transformations in an AONS network device using specialized hardware, AONS can offload the computing resources of endpoint servers, providing potentially lower-cost processing capability.

Quality of Service: AONS can integrate application-level QoS with network-level QoS features based on either explicit message prioritization (e.g., a message tagged as "high priority") or via policy that determines when a higher quality of network service is required for a message as specific message content is detected.

Policy Enforcement: At the heart of optimizing the overall AONS solution is the ability to ensure business-level polices are expressed, implemented and enforced by the infrastructure. The AONS Policy Manager ensures that once messages are inspected, the appropriate actions (encryption, compression, routing, etc.) are taken against that message as appropriate.

3.4.6.3 Activity Monitoring and Management

Auditing/Logging/Metering: AONS can selectively filter messages and send them to a node or console for aggregation and subsequent analysis. Tools enable viewing and analysis of message traffic. AONS can also generate automatic responses to significant real-time events, both business and infrastructure-related. By intelligently gathering statistics and sending them to be logged, AONS can produce metering data for auditing or billing purposes.

Management: AONS can combine both message-level and network infrastructure level events to gain a deeper understanding of overall system health. The AONS management interface itself is available as a web service for those who wish to access it programmatically.

Testing and Validation: AONS' ability to intercept message traffic can be used to validate messages before allowing them to reach destination applications. In addition to protecting from possible application or server failures, this capability can be leveraged to test new web services and other functions by examining actual message flow from clients and servers prior to production deployment. AONS also provides a "debug mode" that can be turned on automatically after a suspected failure or manually after a notification to assist with the overall management of the device.

Workload Balancing and Failover: AONS provides an approach to workload balancing and failover that is both policy- and content-driven. For example, given an AONS node's capability to intermediate between heterogeneous systems, the AONS node can balance between unlike systems that provide access to common information as requested by the contents of a message. AONS can also address the issue of message affinity necessary to ensure failover at the message rather than just the session level as is done by most existing solutions. Balancing can also take into account the response time for getting a message reply, routing to an alternate destination if the preferred target is temporarily slow to respond.

Business Continuity: By providing the ability to replicate inbound messages to a remote destination, AONS enables customers to quickly recover from system outages. AONS can also detect failed message delivery and automatically re-route to alternate endpoints. AONS AEPs and ARs themselves have built-in redundancy and failover at the component level and can be clustered to ensure high availability.

3.4.6.4 Content-Based Routing and Transformation

Content-based Routing: Based upon its ability to inspect and understand the content and context of a message, AONS provides the capability to route messages to an appropriate destination by matching content elements against pre-established policy configurations. This capability allows AONS to provide a common interface (service virtualization) for messages handled by different applications, with AONS examining message type or fields in the content (part number, account type, employee location, customer zip code, etc.) to route the message to the appropriate application. This capability also allows AONS to send a message to multiple destinations (based on either statically defined or dynamic subscriptions to message types or information topics), with optimal fan-out through AONS routers. This capability further allows AONS to redirect all messages previously sent to an application so that it can be processed by a new application. This capability additionally allows AONS to route a message for a pre-processing step that is deemed to be required before receipt of a message (for example, introducing a management pre-approval step for all travel requests). This capability also allows AONS to route a copy of a message that exceeds certain criteria (e.g. value of order) to an auditing system, as well as forwarding the message to the intended destination. This capability further allows AONS to route a message to a particular server for workload or failover reasons. This capability also allows AONS to route a message to a particular server based on previous routing decisions (e.g., routing a query request based on which server handled for the original order). This capability additionally allows AONS to route based on the source of a message. This capability also allows AONS to route a message through a sequence of steps defined by a source or previous intermediary.

Message Protocol Gateway: AONS can act as a gateway between applications using different transport protocols. AONS supports open standard protocols (e.g. HTTP, FTP, SMTP), as well as popular or de facto standard proprietary protocols such as IBM MQ and JMS.

Message Transformations: AONS can transform the contents of a message to make them appropriate for a particular receiving application. This can be done for both XML and non-XML messages, the latter via the assistance of either a message dictionary definition or a well-defined industry standard format.

3.4.7 AONS Functional Modules

Figure 8:
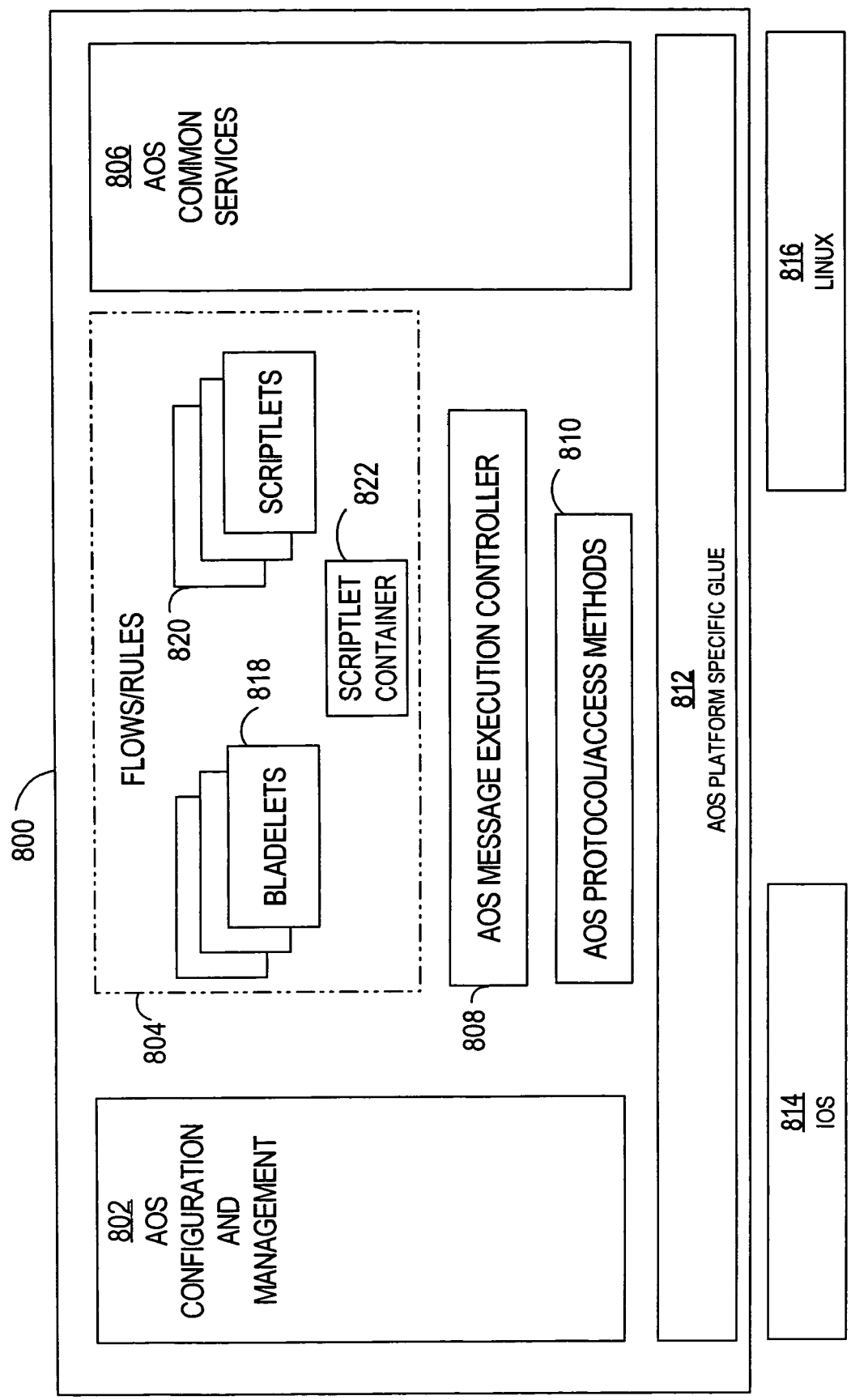
FIG. 8 is a block diagram that depicts functional modules within an example AONS node.

FIG. 8 is a block diagram that depicts functional modules within an example AONS node. AONS node 800 comprises AOS configuration and management module 802, flows/rules 804, AOS common services 806, AOS message execution controller 808, AOS protocol access methods 810, and AOS platform-specific "glue" 812. AONS node 800 interfaces with Internetworking Operating System (IOS) 814 and Linux Operating System 816. Flows/rules 804 comprise Bladelets™ 818, Scriptlets™ 820, and Scriptlet™ container 822.

In one embodiment, AOS common services 806 include: security services, standard compression services, delta compression services, caching service, message logging service, policy management service, reliable messaging service, publish/subscribe service, activity monitoring service, message distribution service, XML parsing service, XSLT transformation service, and QoS management service.

In one embodiment, AOS protocol/access methods 810 include: TCP/SSL, HTTP/HTTPS, SOAP/HTTP, SMTP, FTP, JMS/MQ and JMS/RV, and Java Database Connectivity (JDBC).

In one embodiment, AOS message execution controller 808 includes: an execution controller, a flow subsystem, and a Bladelet™ subsystem.

In one embodiment, AOS Bladelets™ 818 and Scriptlets™ 820 include: message input (read message), message output (send message), logging/audit, decision, external data access, XML parsing, XML transformation, caching, scriptlet container, publish, subscribe, message validation (schema, format, etc.), filtering/masking, signing, authentication, authorization, encryption, decryption, activity monitoring sourcing, activity monitoring marking, activity monitoring processing, activity monitoring notification, message discard, firewall block, firewall unblock, message intercept, and message stop-intercept.

In one embodiment, AOS configuration and management module 802 includes: configuration, monitoring, topology management, capability exchange, failover redundancy, reliability/availability/serviceability (RAS) services (tracing, debugging, etc.), archiving, installation, upgrades, licensing, sample Scriptlets™, sample flows, documentation, online help, and language localization.

In one embodiment, supported platforms include: Cisco Catalyst 6503, Cisco Catalyst 6505, Cisco Catalyst 6509, and Cisco Catalyst 6513. These products are typically deployed in data centers. Other products, such as "branch office routers" (e.g., the Cisco Volant router series) and "edge routers" are also supported. In one embodiment, supported supervisor modules include: Sup2 and Sup720. In one embodiment, specific functional areas relating to the platform include: optimized TCP, SSL, public key infrastructure (PKI), encryption/decryption, interface to Cat6K supervisor, failover/redundancy, image management, and QoS functionality. Although some embodiments of the invention are described herein with reference to PKI keys, embodiments of the invention are not limited to PKI keys. Other keys and/or tokens, such as Kerberos tokens and/or PGP tokens, may be used in conjunction with embodiments of the invention.

In one embodiment, cryptographic key distribution and processing is controlled by user-specified policies that are stored, with the keys, at a central console called an AMC. The policies may state, for example, that different kinds of keys are to be used to encrypt/decrypt/sign different kinds of data traffic. Keys may be associated with policies. The AMC may automatically distribute the key-to-policy associations to user-specified AONS nodes.

3.4.8 AONS Modes of Operation

AONS may be configured to run in multiple modes depending on application integration needs, and deployment scenarios. According to one embodiment, the primary modes of operation include implicit mode, explicit mode, and proxy mode. In implicit mode, an AONS node transparently intercepts relevant traffic with no changes to applications. In explicit mode, applications explicitly address traffic to an intermediary AONS node. In proxy mode, applications are configured to work in conjunction with AONS nodes, but applications do not explicitly address traffic to AONS nodes.

In implicit mode, applications are unaware of AONS presence. Messages are addressed to receiving applications. Messages are redirected to AONS via configuration of application "proxy" or middleware systems to route messages to AONS, and/or via configuration of networks (packet interception). For example, domain name server (DNS)-based redirection could be used to route messages. For another example, a 5-tuple-based access control list (ACL) on a switch or router could be used. Network-based application recognition and content switching modules may be configured for URL/URI redirection. Message-based inspection may be used to determine message types and classifications. In implicit mode, applications communicate with each other using AONS as an intermediary (implicitly), using application-native protocols.

Figure 9:
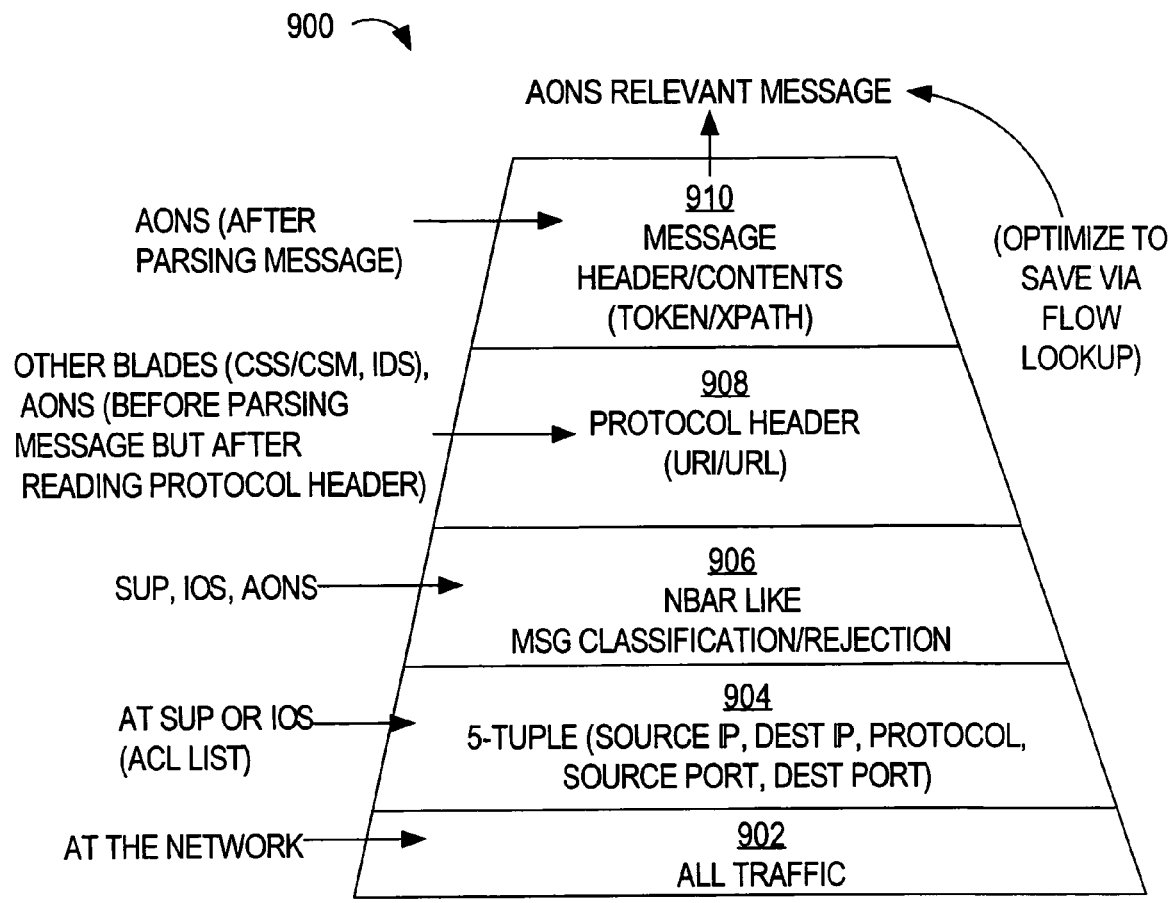
FIG. 9 is a diagram that shows multiple tiers of filtering that may be performed on message traffic in order to produce only a select set of traffic that will be processed at the AONS layer.

Traffic redirection, message classification, and "early rejection" (sending traffic out of AONS layers prior to complete processing within AONS layers) may be accomplished via a variety of mechanisms, such as those depicted in FIG. 9. FIG. 9 shows multiple tiers of filtering that may be performed on message traffic in order to produce only a select set of traffic that will be processed at the AONS layer. Traffic that is not processed at the AONS layer may be treated as any other traffic.

At the lowest layer, layer 902, all traffic passes through. At the next highest layer, layer 904, traffic may be filtered based on 5-tuples. A supervisor blade or a network operating system such as Internetwork Operating System (IOS) may perform such filtering. Traffic that passes the filters at layer 904 passes to layer 906. At layer 906, traffic may be further filtered based on network-based application recognition-like filtering and/or message classification and rejection. Traffic that passes the filters at layer 906 passes to layer 908. At layer 908, traffic may be further filtered based on protocol headers. For example, traffic may be filtered based on URLs/URIs in the traffic. Traffic that passes the filters at layer 908 passes to layer 910. At layer 910, traffic may be processed based on application layer messages, include headers and contents. For example, XPath content identification technology within messages may be used to process traffic at layer 910. An AONS blade may perform processing at layer 910. Thus, a select subset of all network traffic may be provided to an AONS blade.

In explicit mode, applications are aware of AONS presence. Messages are explicitly addressed to AONS nodes. Applications may communicate with AONS using AONP. AONS may perform service virtualization and destination selection.

In proxy mode, applications are explicitly unaware of AONS presence. Messages are addressed to their ultimate destinations (i.e., applications). However, client applications are configured to direct traffic via a proxy mode.

3.4.9 AONS Message Routing

Components of message management in AONS may be viewed from two perspectives: a node view and a cloud view.

Figure 10:
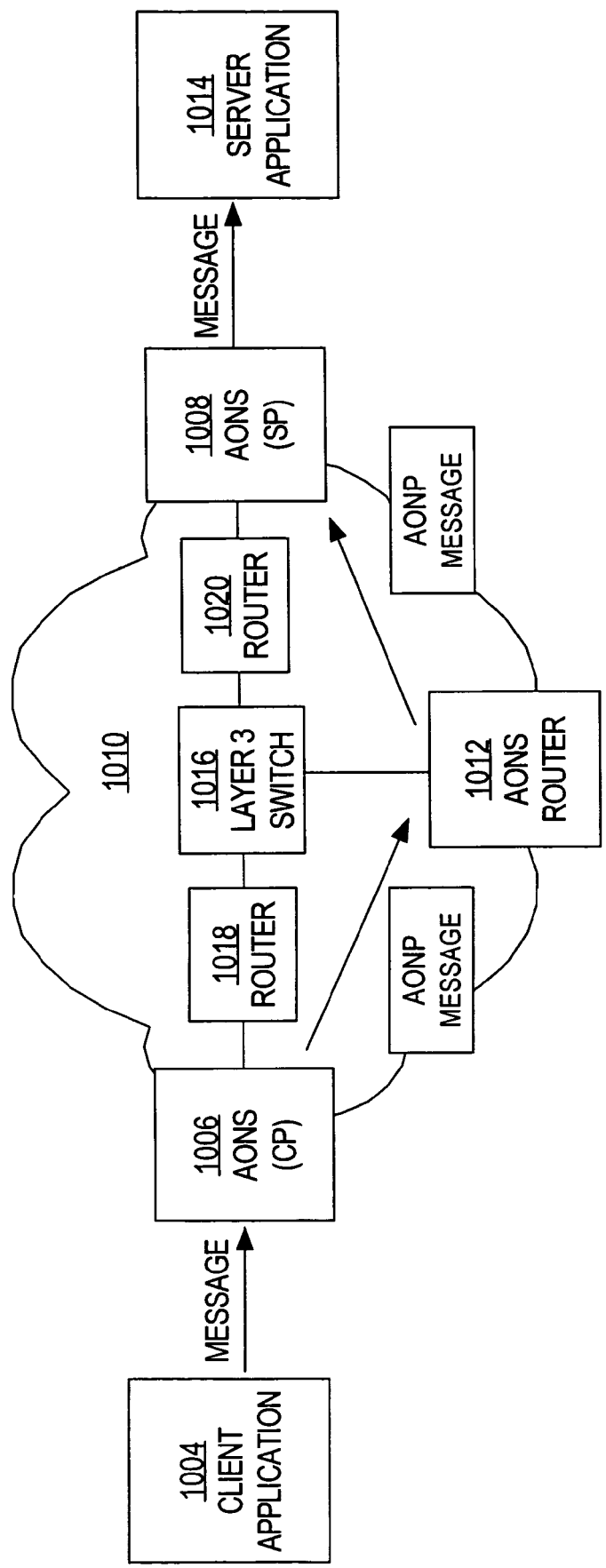
FIG. 10 is a diagram that illustrates the path of a message within an AONS cloud according to a cloud view.

FIG. 10 is a diagram that illustrates the path of a message within an AONS cloud 1010 according to a cloud view. A client application 1004 sends a message to an AONS Client Proxy (CP) 1006. If AONS CP 1006 is not present, then client application 1004 may send the message to an AONS Server Proxy (SP) 1008. The message is processed at AONS CP 1006. AONS CP 1006 transforms the message into AONP format if the message is entering AONS cloud 1010.

Within AONS cloud 1010, the message is routed using AONP. Thus, using AONP, the message may be routed from AONS CP 1006 to an AONS router 1012, or from AONS CP 1006 to AONS SP 1008, or from AONS router 1012 to another AONS router, or from AONS router 1012 to AONS SP 1008. Messages processed at AONS nodes are processed in AONP format.

When the message reaches AONS SP 1008, AONS SP 1008 transforms the message into the message format used by server application 1014. AONS SP 1008 routes the message to server application 1014 using the message protocol of server application 1014. Alternatively, if AONS SP 1008 is not present, AONS CP 1006 may route the message to server application 1014.

The details of the message processing within AONS cloud 1010 can be understood via the following perspectives: Request/Response Message Flow, One-Way Message Flow, Message Flow with Reliable Delivery, Node-to-Node Communication, and multicast publish-subscribe.

Figure 11A:
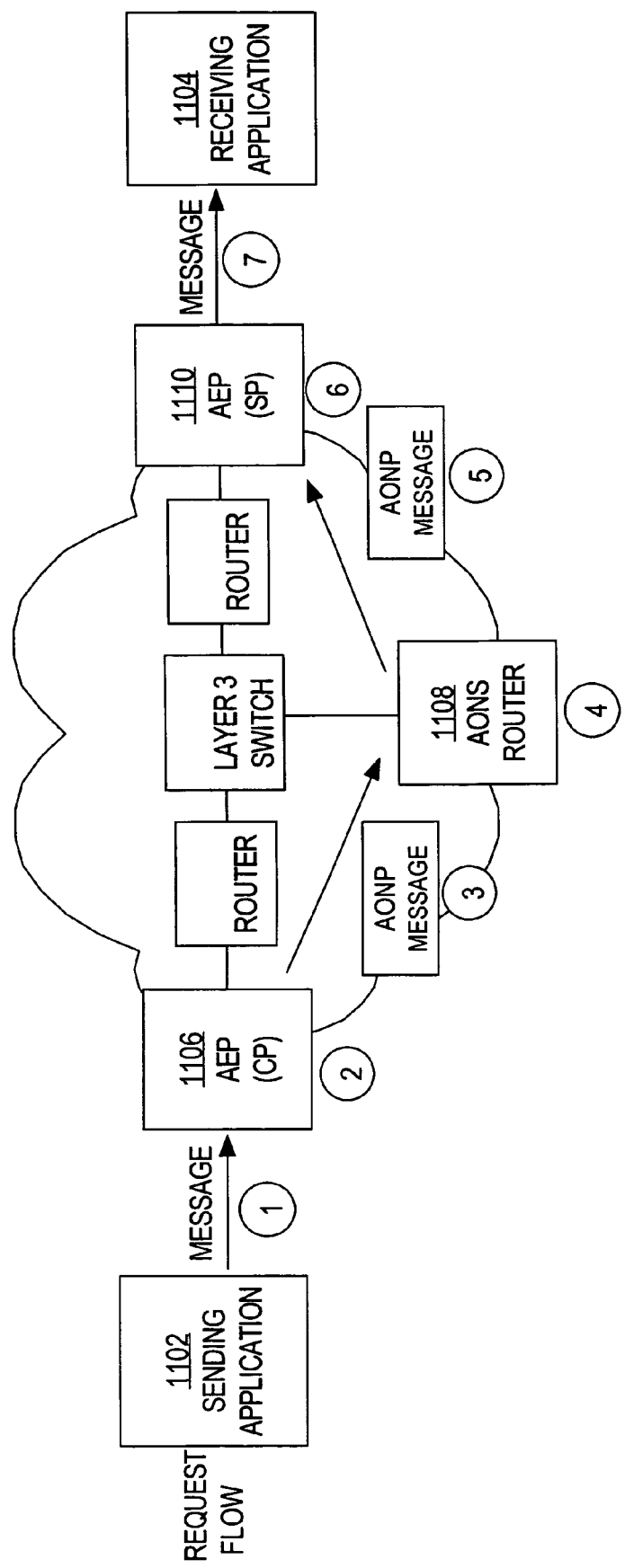
FIG. 11A and FIG. 11B are diagrams that illustrate a request/response message flow.
Figure 11B:
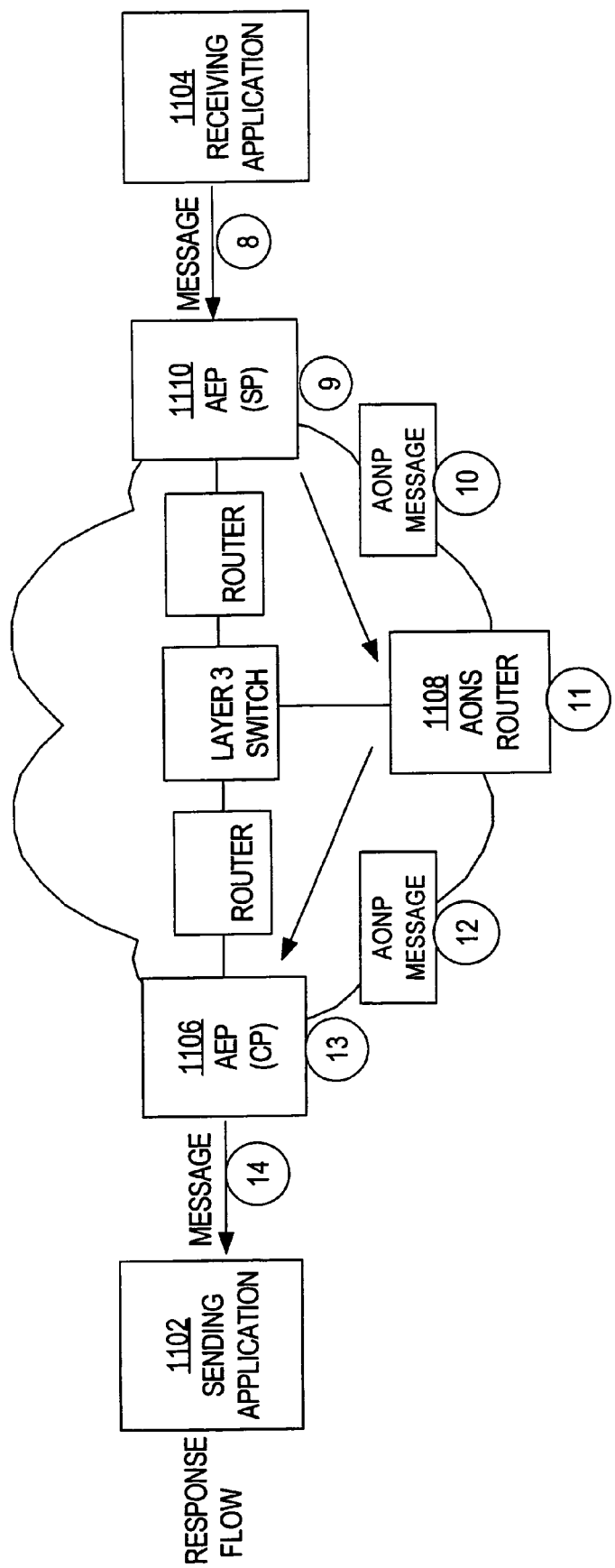

FIG. 11A and FIG. 11B are diagrams that illustrate a request/response message flow. Referring to FIG. 11A, at circumscribed numeral 1, a sending application 1102 sends a message towards a receiving application 1104. At circumscribed numeral 2, an AEP CP 1106 intercepts the message and adds an AONP header to the message, forming an AONP message. At circumscribed numeral 3, AEP CP 1106 sends the AONP message to an AONS router 1108. At circumscribed numeral 4, AONS router 1108 receives the AONP message. At circumscribed numeral 5, AONS router 1108 sends the AONP message to an AEP SP 1110. At circumscribed numeral 6, AEP SP 1110 receives the AONP message and removes the AONP header from the message, thus decapsulating the message. At circumscribed numeral 7, AEP SP 1110 sends the message to receiving application 1104.

Referring to FIG. 11B, at circumscribed numeral 8, receiving application 1104 sends a response message toward sending application 1102. At circumscribed numeral 9, AEP SP 1110 intercepts the message and adds an AONP header to the message, forming an AONP message. At circumscribed numeral 10, AEP SP 1110 sends the AONP message to AONS router 1108. At circumscribed numeral 11, AONS router 1108 receives the AONP message. At circumscribed numeral 12, AONS router 1108 sends the AONP message to AEP CP 1106. At circumscribed numeral 13, AEP CP 1106 receives the AONP message and removes the AONP header from the message, thus decapsulating the message. At circumscribed numeral 14, AEP CP 1106 sends the message to sending application 1102. Thus, a request is routed from sending application 1102 to receiving application 1104, and a response is routed from receiving application 1104 to sending application 1102.

Figure 12A:
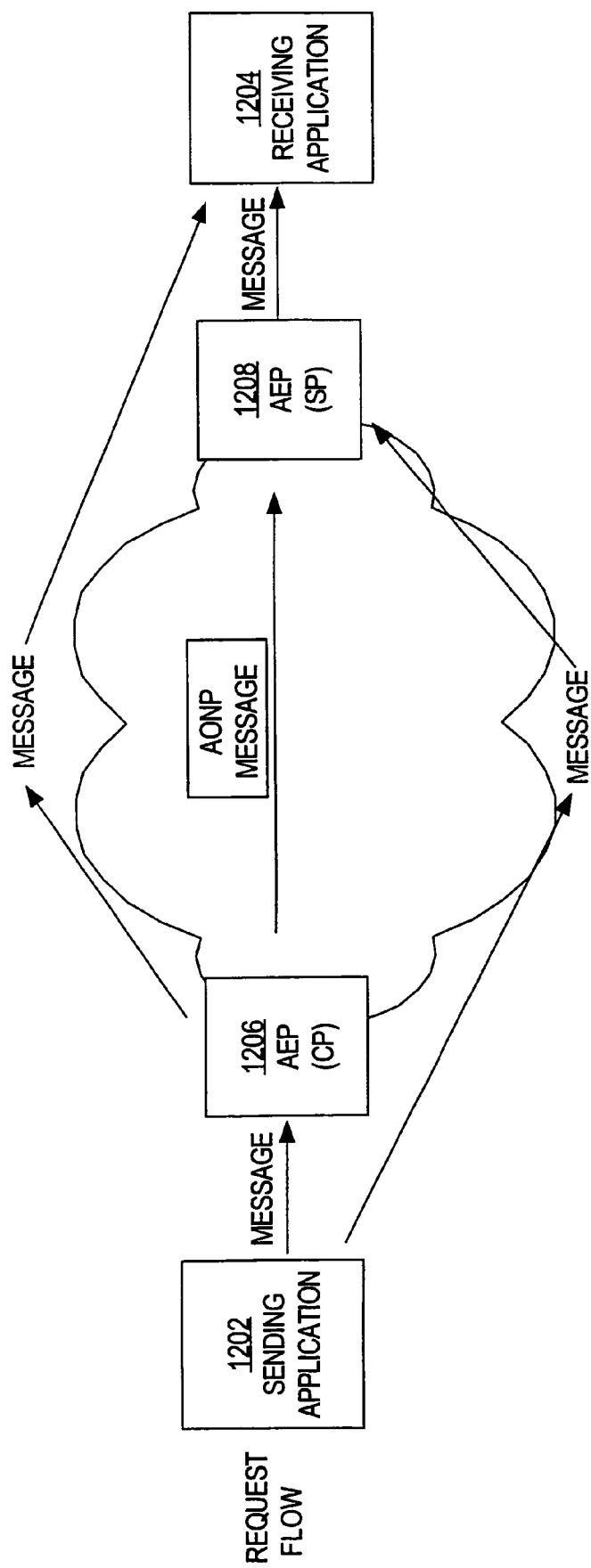
FIG. 12A and FIG. 12B are diagrams that illustrate alternative request/response message flows.
Figure 12B:
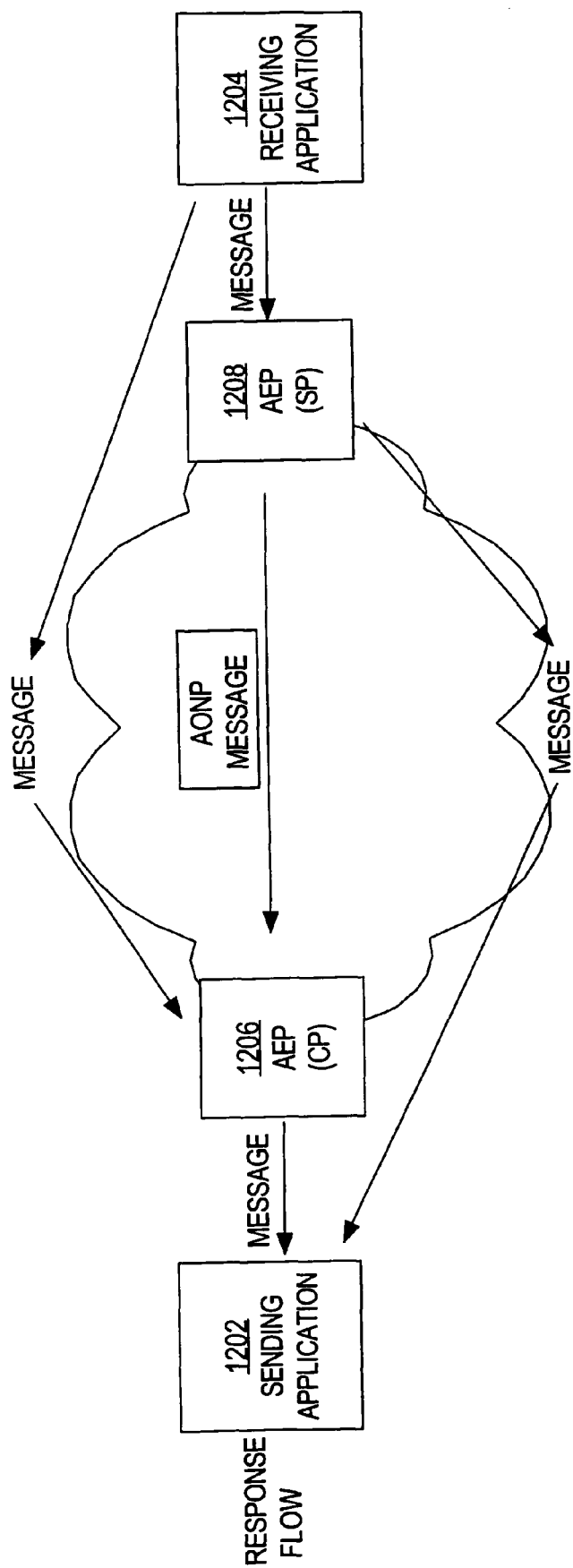

FIG. 12A and FIG. 12B are diagrams that illustrate alternative request/response message flows. FIG. 12A shows three possible routes that a message might take from a sending application 1202 to a receiving application 1204. According to a first route, sending application 1202 sends the message toward receiving application 1204, but an AEP CP 1206 intercepts the message and sends the message to receiving application 1204. According to a second route, sending application 1202 sends the message toward receiving application 1204, but AEP CP 1206 intercepts the message, encapsulates the message within an AONP message, and sends the AONP message to an AEP SP 1208, which decapsulates the message from the AONP message and sends the message to receiving application 1204. According to a third route, sending application 1202 sends the message toward receiving application 1204, but AEP SP 1208 intercepts the message and sends the message to receiving application 1204.

FIG. 12B shows three possible routes that a response message might take from receiving application 1204 to sending application 1202. According to a first route, receiving application 1204 sends the message toward sending application 1202, but AEP CP 1206 intercepts the message and sends the message to sending application 1204. According to a second route, receiving application 1204 sends the message toward sending application 1202, but AEP SP 1208 intercepts the message, encapsulates the message within an AONP message, and sends the AONP message to AEP CP 1206, which decapsulates the message from the AONP message and sends the message to sending application 1202. According to a third route, receiving application 1204 sends the message toward sending application 1202, but AEP SP 1208 intercepts the message and sends the message to sending application 1202.

Figure 13:
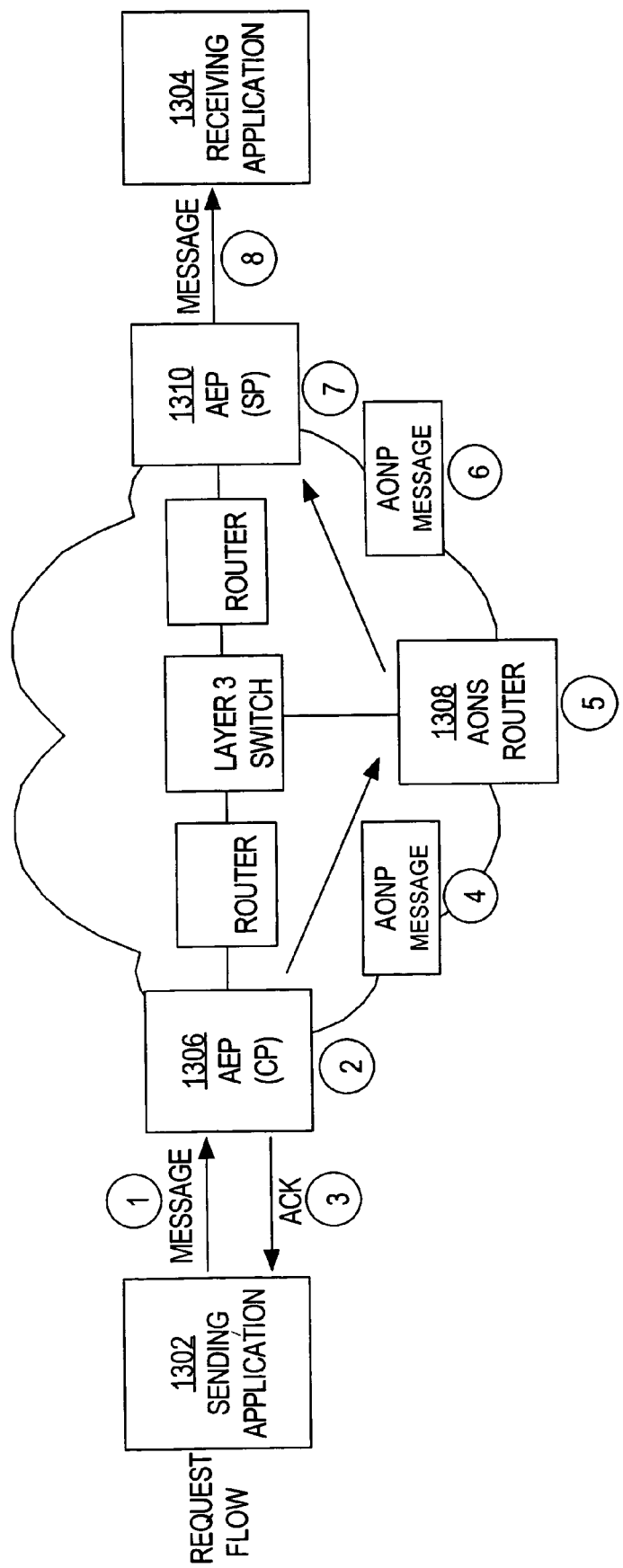
FIG. 13 is a diagram that illustrates a one-way message flow.

FIG. 13 is a diagram that illustrates a one-way message flow. At circumscribed numeral 1, a sending application 1302 sends a message towards a receiving application 1304. At circumscribed numeral 2, an AEP CP 1306 intercepts the message and adds an AONP header to the message, forming an AONP message. At circumscribed numeral 3, AEP CP 1306 sends an ACK (acknowledgement) back to sending application 1302. At circumscribed numeral 4, AEP CP 1306 sends the AONP message to an AONS router 1308. At circumscribed numeral 5, AONS router 1308 receives the AONP message. At circumscribed numeral 6, AONS router 1308 sends the AONP message to an AEP SP 1310. At circumscribed numeral 7, AEP SP 1310 receives the AONP message and removes the AONP header from the message, thus decapsulating the message. At circumscribed numeral 8, AEP SP 1310 sends the message to receiving application 1304.

Figure 14:
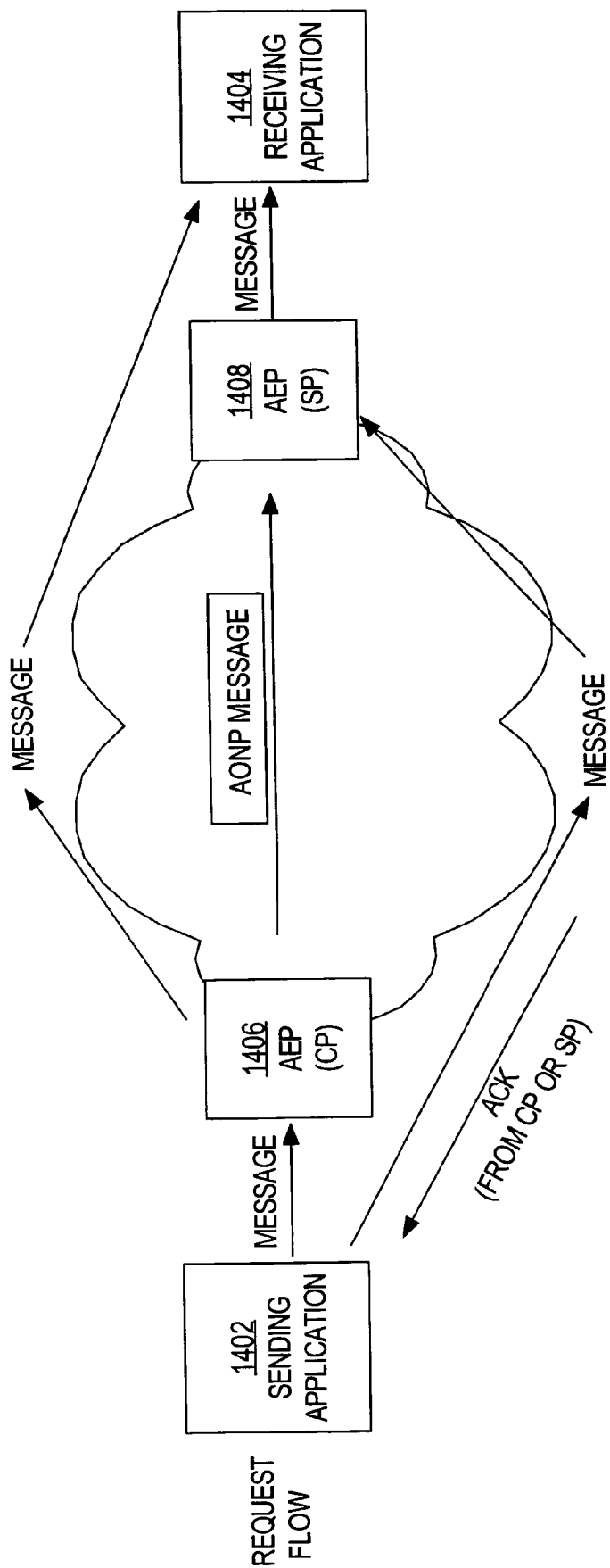
FIG. 14 is a diagram that illustrates alternative one-way message flows.

FIG. 14 is a diagram that illustrates alternative one-way message flows. FIG. 14 shows three possible routes that a message might take from a sending application 1402 to a receiving application 1404. According to a first route, sending application 1402 sends the message toward receiving application 1404, but an AEP CP 1406 intercepts the message and sends the message to receiving application 1404. AEP CP 1406 sends an ACK (acknowledgement) to sending application 1402. According to a second route, sending application 1402 sends the message toward receiving application 1404, but AEP CP 1406 intercepts the message, encapsulates the message within an AONP message, and sends the AONP message to an AEP SP 1408, which decapsulates the message from the AONP message and sends the message to receiving application 1404. Again, AEP CP 1406 sends an ACK to sending application 1402. According to a third route, sending application 1402 sends the message toward receiving application 1404, but AEP SP 1408 intercepts the message and sends the message to receiving application 1404. In this case, AEP SP 1408 sends an ACK to sending application 1402. Thus, when an AEP intercepts a message, the intercepting AEP sends an ACK to the sending application.

According to one embodiment, AONP is used in node-to-node communication with the next hop. In one embodiment, AONP uses HTTP. AONP headers may include HTTP or TCP headers. AONP may indicate RM ACK, QoS level, message priority, and message context (connection, message sequence numbers, message context identifier, entry node information, etc.). The actual message payload is in the message body. Asynchronous messaging may be used between AONS nodes. AONS may conduct route and node discovery via static configuration (next hop) and/or via dynamic discovery and route advertising ("lazy" discovery).

Figure 15A:
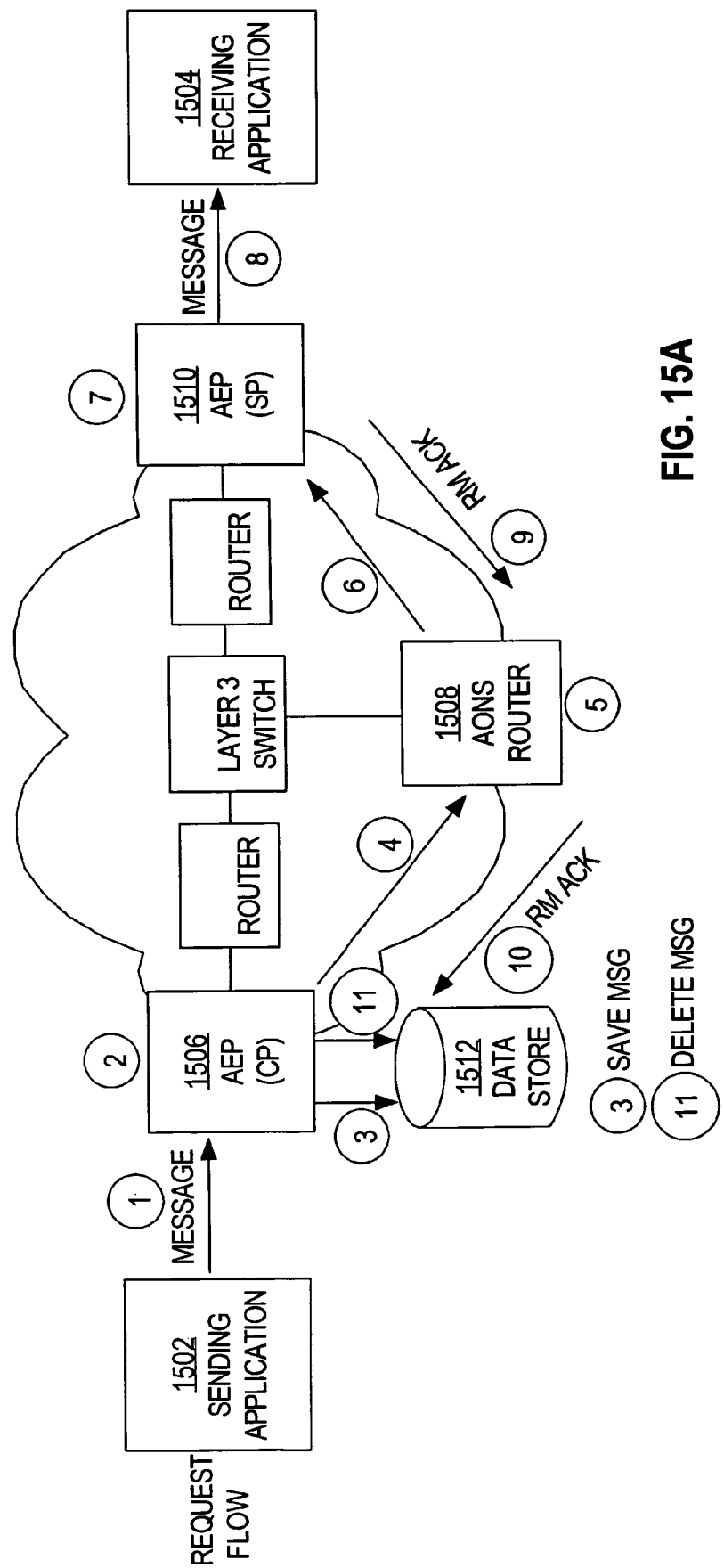
FIG. 15A and FIG. 15B are diagrams that illustrate a request/response message flow with reliable message delivery.
Figure 15B:
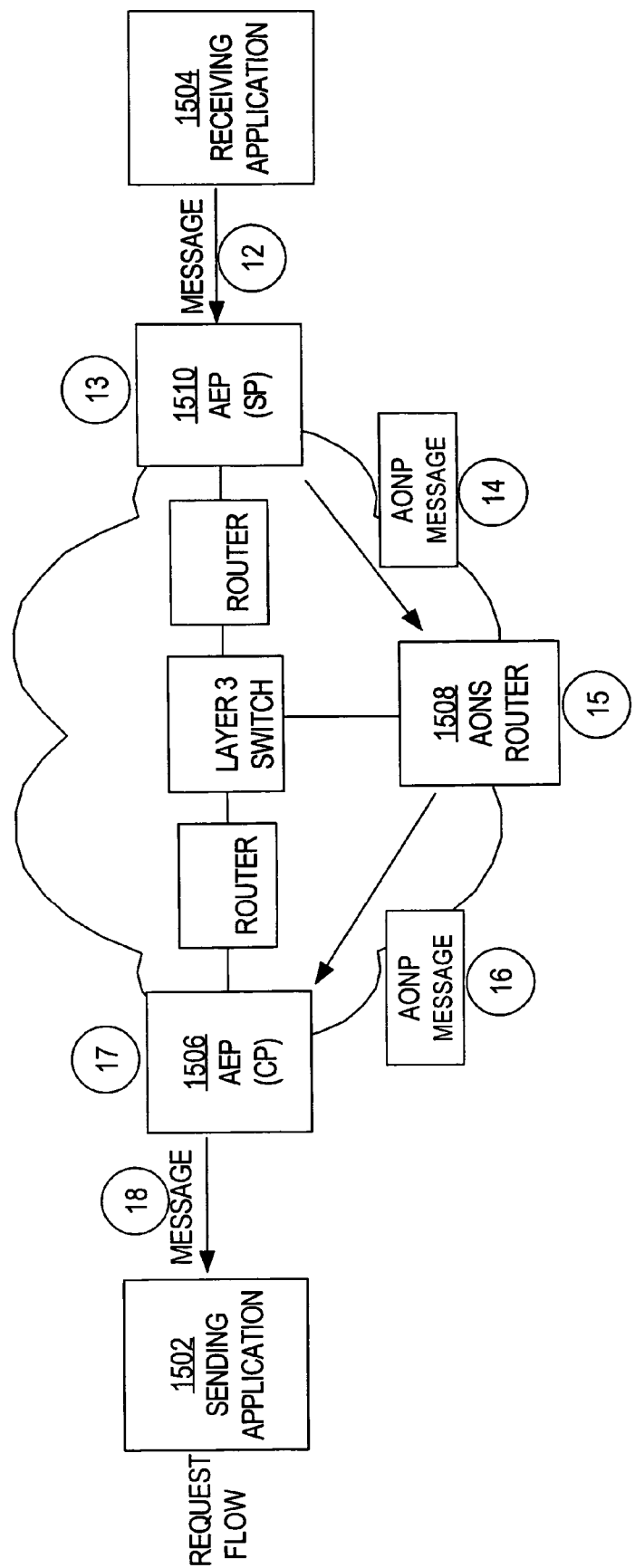

FIG. 15A and FIG. 15B are diagrams that illustrate a request/response message flow with reliable message delivery. Referring to FIG. 15A, at circumscribed numeral 1, a sending application 1502 sends a message towards a receiving application 1504. At circumscribed numeral 2, an AEP CP 1506 intercepts the message and adds an AONP header to the message, forming an AONP message. At circumscribed numeral 3, AEP CP 1506 saves the message to a data store 1512. Thus, if there are any problems with sending the message, AEP CP 1506 can resend the copy of the message that is stored in data store 1512.

At circumscribed numeral 4, AEP CP 1506 sends the AONP message to an AONS router 1508. At circumscribed numeral 5, AONS router 1508 receives the AONP message. At circumscribed numeral 6, AONS router 1508 sends the AONP message to an AEP SP 1510. At circumscribed numeral 7, AEP SP 1510 receives the AONP message and removes the AONP header from the message, thus decapsulating the message. At circumscribed numeral 8, AEP SP 1510 sends the message to receiving application 1504.

At circumscribed numeral 9, AEP SP 1510 sends a reliable messaging (RM) acknowledgement (ACK) to AONS router 1508. At circumscribed numeral 10, AONS router 1508 receives the RM ACK and sends the RM ACK to AEP CP 1506. At circumscribed numeral 11, AEP CP 1506 receives the RM ACK and, in response, deletes the copy of the message that is stored in data store 1512. Because the delivery of the message has been acknowledged, there is no further need to store a copy of the message in data store 1512. Alternatively, if AEP CP 1506 does not receive the RM ACK within a specified period of time, then AEP CP 1506 resends the message.

Referring to FIG. 15B, at circumscribed numeral 12, receiving application 1504 sends a response message toward sending application 1502. At circumscribed numeral 13, AEP SP 1510 intercepts the message and adds an AONP header to the message, forming an AONP message. At circumscribed numeral 14, AEP SP 1510 sends the AONP message to AONS router 1508. At circumscribed numeral 15, AONS router 1508 receives the AONP message. At circumscribed numeral 16, AONS router 1508 sends the AONP message to AEP CP 1506. At circumscribed numeral 17, AEP CP 1506 receives the AONP message and removes the AONP header from the message, thus decapsulating the message. At circumscribed numeral 18, AEP CP 1506 sends the message to sending application 1502.

Figure 16:
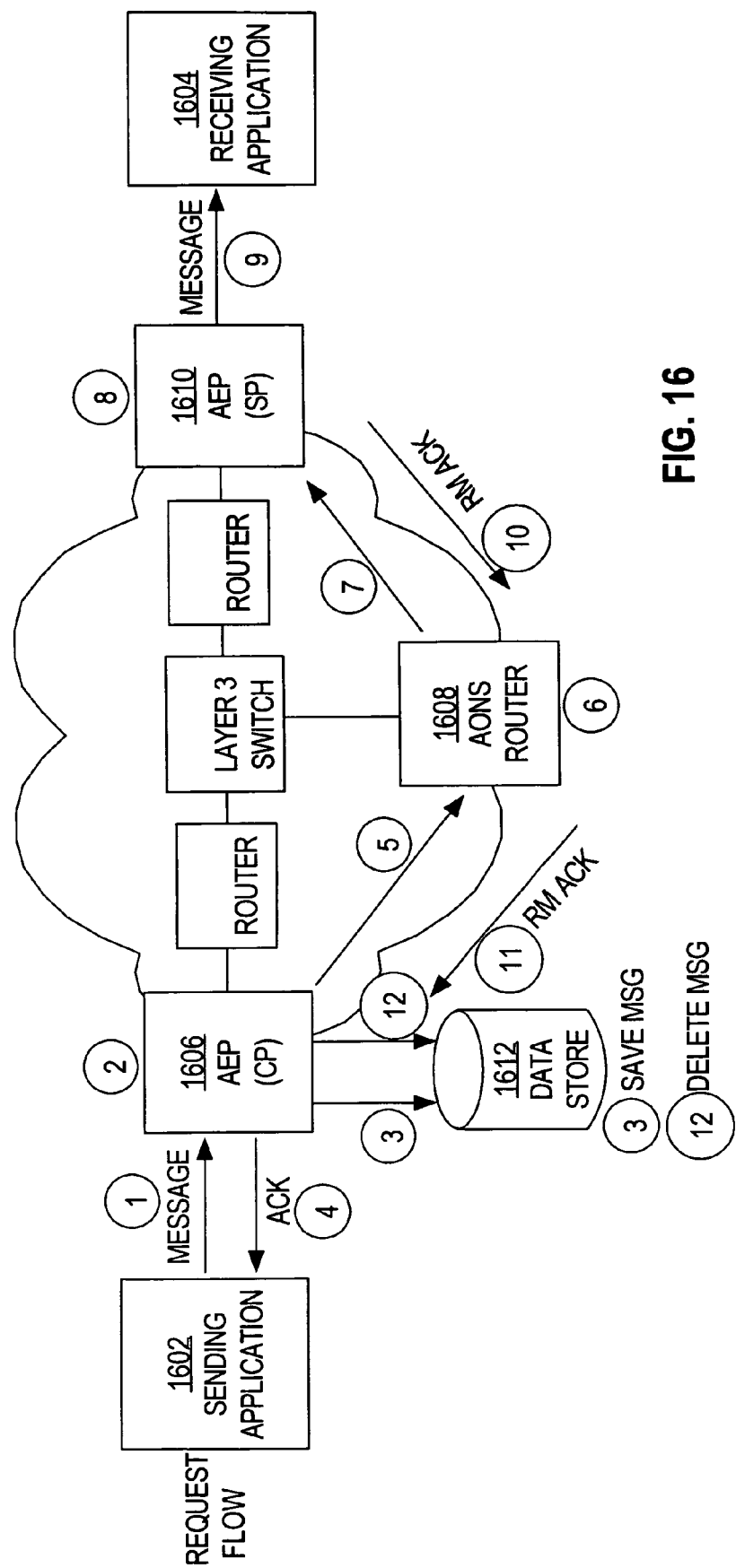
FIG. 16 is a diagram that illustrates a one-way message flow with reliable message delivery.

FIG. 16 is a diagram that illustrates a one-way message flow with reliable message delivery. At circumscribed numeral 1, a sending application 1602 sends a message towards a receiving application 1604. At circumscribed numeral 2, an AEP CP 1606 intercepts the message and adds an AONP header to the message, forming an AONP message. At circumscribed numeral 3, AEP CP 1606 saves the message to a data store 1612. Thus, if there are any problems with sending the message, AEP CP 1606 can resend the copy of the message that is stored in data store 1612. At circumscribed numeral 4, AEP CP 1606 sends an ACK (acknowledgement) back to sending application 1602. At circumscribed numeral 5, AEP CP 1606 sends the AONP message to an AONS router 1608. At circumscribed numeral 6, AONS router 1608 receives the AONP message. At circumscribed numeral 7, AONS router 1608 sends the AONP message to an AEP SP 1610. At circumscribed numeral 8, AEP SP 1610 receives the AONP message and removes the AONP header from the message, thus decapsulating the message. At circumscribed numeral 9, AEP SP 1610 sends the message to receiving application 1604.

At circumscribed numeral 10, AEP SP 1610 sends a reliable messaging (RM) acknowledgement (ACK) to AONS router 1608. At circumscribed numeral 11, AONS router 1608 receives the RM ACK and sends the RM ACK to AEP CP 1606. At circumscribed numeral 12, AEP CP 1606 receives the RM ACK and, in response, deletes the copy of the message that is stored in data store 1612. Because the delivery of the message has been acknowledged, there is no further need to store a copy of the message in data store 1612. Alternatively, if AEP CP 1606 does not receive the RM ACK within a specified period of time, then AEP CP 1606 resends the message. If the resend is not successful within a timeout period, a "delivery-failure" notification message will be send to the original sending application.

Figure 17:
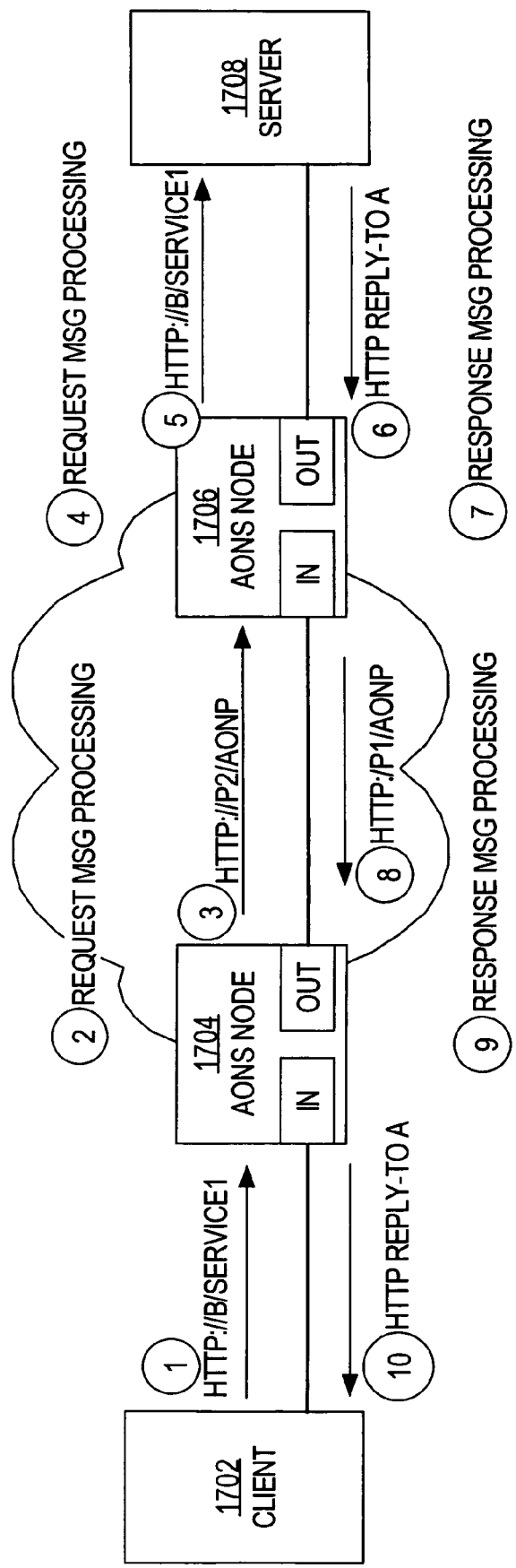
FIG. 17 is a diagram that illustrates synchronous request and response messages.

FIG. 17 is a diagram that illustrates synchronous request and response messages. At circumscribed numeral 1, an AONS node 1704 receives, from a client 1702, a request message, in either implicit or explicit mode. At circumscribed numeral 2, AONS node 1704 reads the message, selects and executes a flow, and adds an AONP header to the message. At circumscribed numeral 3, AONS node 1704 sends the message to a next hop node, AONS node 1706. At circumscribed numeral 4, AONS node 1706 reads the message, selects and executes a flow, and removes the AONP header from the message, formatting the message according to the message format expected by a server 1708. At circumscribed numeral 5, AONS node 1706 sends the message to the message's destination, server 1708.

At circumscribed numeral 6, AONS node 1706 receives a response message from server 1708 on the same connection on which AONS node 1706 sent the request message. At circumscribed numeral 7, AONS node 1706 reads the message, correlates the message with the request message, executes a flow, and adds an AONP header to the message. At circumscribed numeral 8, AONS node 1706 sends the message to AONS node 1704. At circumscribed numeral 9, AONS node 1704 reads the message, correlates the message with the request message, executes a flow, and removes the AONP header from the message, formatting the message according to the message format expected by client 1702. At circumscribed numeral 10, AONS node 1704 sends the message to client 1702 on the same connection on which client 1702 sent the request message to AONS node 1704.

Figure 18:
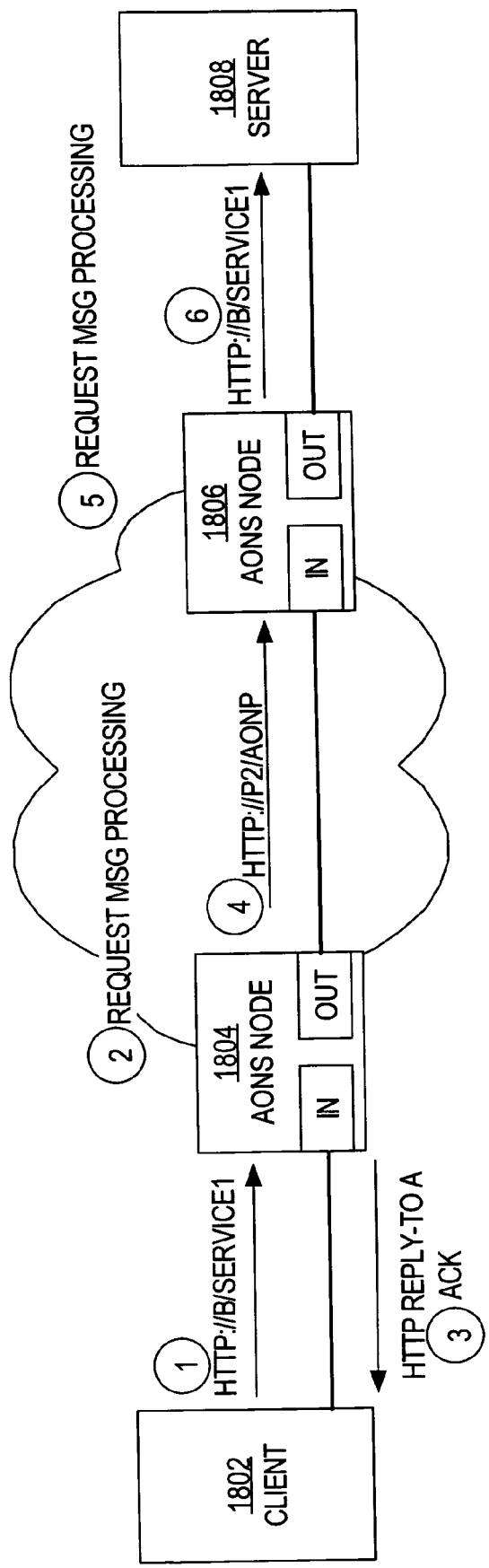
FIG. 18 is a diagram that illustrates a sample one-way end-to-end message flow.

FIG. 18 is a diagram that illustrates a sample one-way end-to-end message flow. At circumscribed numeral 1, an AONS node 1804 receives, from a client 1802, a request message, in either implicit or explicit mode. At circumscribed numeral 2, AONS node 1804 reads the message, selects and executes a flow, and adds an AONP header to the message. At circumscribed numeral 3, AONS node 1804 sends an acknowledgement to client 1802. At circumscribed numeral 4, AONS node 1804 sends the message to a next hop node, AONS node 1806. At circumscribed numeral 5, AONS node 1806 reads the message, selects and executes a flow, and removes the AONP header from the message, formatting the message according to the message format expected by a server 1808. At circumscribed numeral 6, AONS node 1806 sends the message to the message's destination, server 1808.

According to the node view, the message lifecycle within an AONS node, involves ingress/egress processing, message processing, message execution control, and flow execution.

Figure 19:
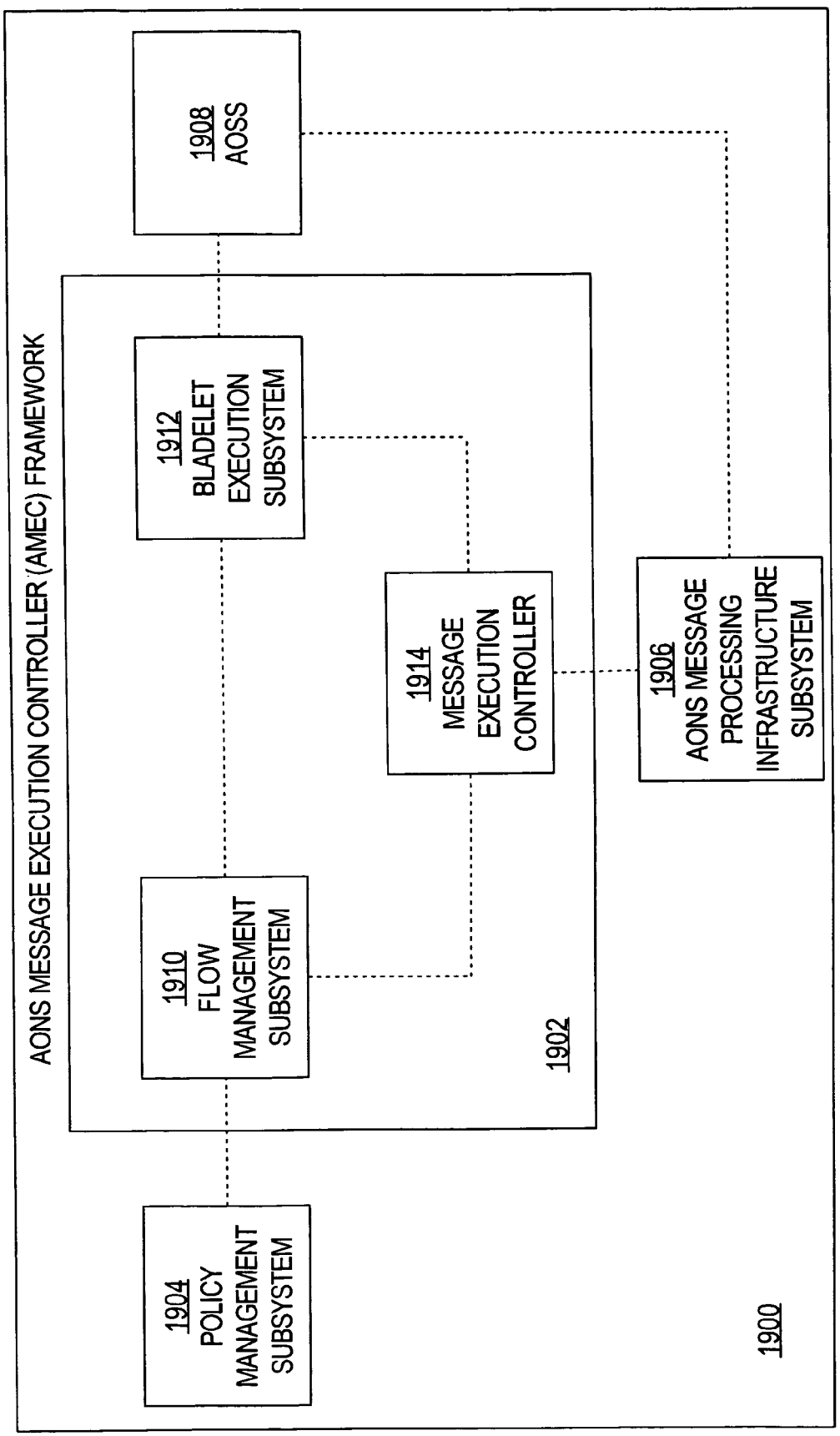
FIG. 19 is a diagram that illustrates message-processing modules within an AONS node.

FIG. 19 is a diagram that illustrates message-processing modules within an AONS node 1900. AONS node 1900 comprises an AONS message execution controller (AMEC) framework 1902, a policy management subsystem 1904, an AONS message processing infrastructure subsystem 1906, and an AOSS 1908. AMEC framework 1902 comprises a flow management subsystem 1910, a Bladelet™ execution subsystem 1912, and a message execution controller 1914. Policy management subsystem 1904 communicates with flow management subsystem 1910. AOSS 1908 communicates with Bladelet™ execution subsystem 1912 and AONS message processing infrastructure subsystem 1906. AONS message processing infrastructure subsystem 1906 communicates with message execution controller 1914. Flow management subsystem 1910, Bladelet™ execution subsystem, and message execution controller 1914 all communicate with each other.

Figure 20:
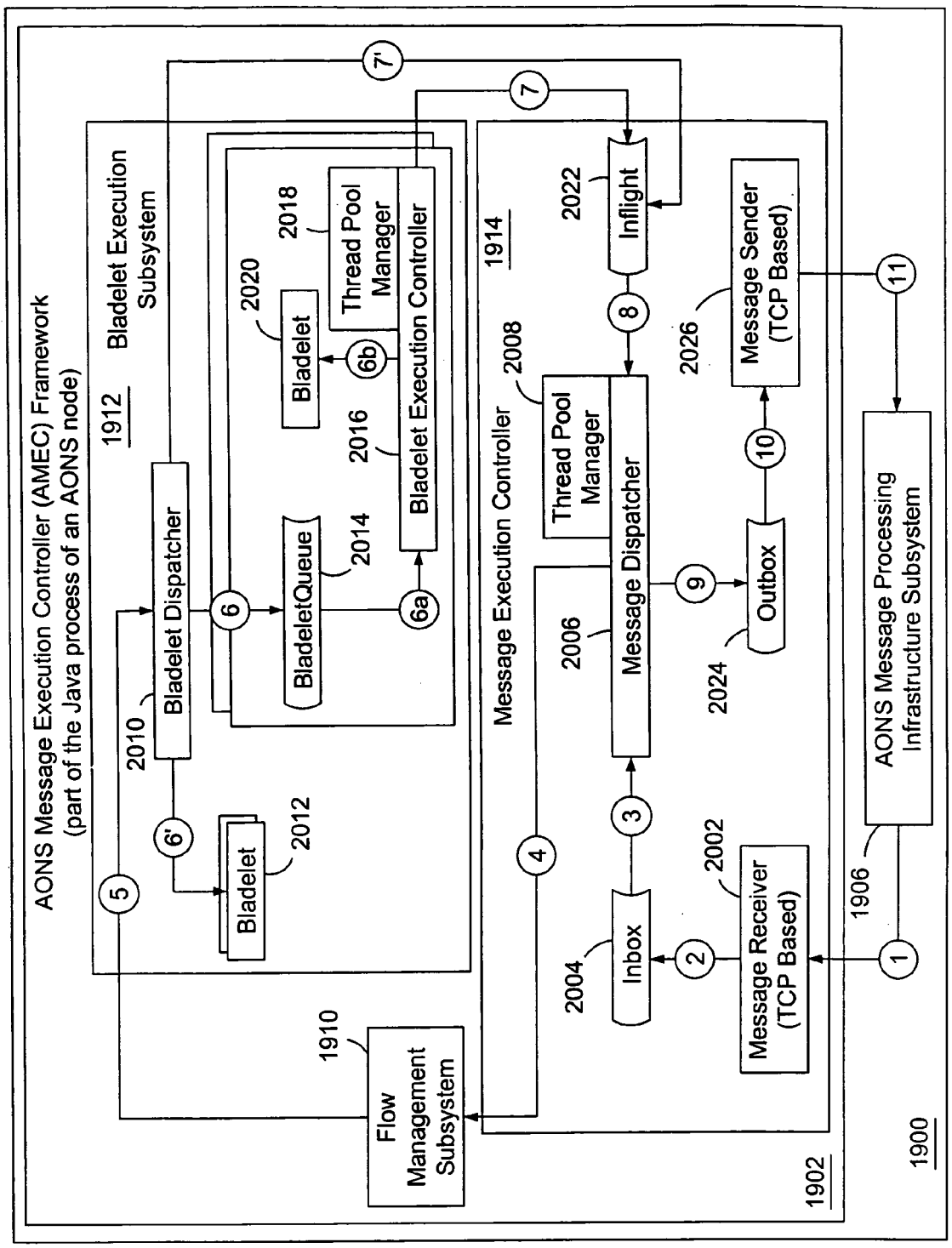
FIG. 20 is a diagram that illustrates message processing within AONS node.

FIG. 20 is a diagram that illustrates message processing within AONS node 1900. AMEC framework 1902 is an event-based multi-threaded mechanism to maximize throughput while minimizing latency for messages in the AONS node. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 1902.

In one embodiment, executing the flow comprises executing each step (i.e., Bladelet™/action) of the flow. If a Bladelet™ is to be run within a separate context, then AMEC framework 1902 may enqueue into Bladelet™-specific queues, and, based on thread availability, dequeue appropriate Bladelet™ states from each Bladelet™ queue.

3.4.10 Flows, Bladelets™, and Scriptlets™

According to one embodiment, flows string together Bladelets™ (i.e., actions) to customize message processing logic. Scriptlets™ provide a mechanism for customers and partners to customize or extend native AONS functionality. Some Bladelets™ and services may be provided with an AONS node.

3.4.11 AONS Services

As mentioned in the previous section, a set of core services may be provided by AONS to form the underlying foundation of value-added functionality that can be delivered via an AONS node. In one embodiment, these include: Security Services, Standard Compression Services, Delta Compression Services, Caching Service, Message Logging Service, Policy Management Service (Policy Manager), Reliable Messaging Service, Publish/Subscribe Service, Activity Monitoring Service, Message Distribution Service, XML Parsing Service, XSLT Transformation Service, and QoS Management Service. In one embodiment, each AONS core service is implemented within the context of a service framework.

3.4.12 AONS Configuration and Management

In one embodiment, an AONS node is provisioned and configured for a class of application messages, where it enforces the policies that are declaratively defined on behalf-of the application end-points, business-domains, security-domains, administrative domains, and network-domains. Furthermore, the AONS node promotes flexible composition and customization of different product functional features by means of configurability and extensibility of different software and hardware sub-systems for a given deployment scenario. Due to the application and network embodiments of the AONS functionality, the AONS architecture framework should effectively and uniformly address different aspects of configurability, manageability, and monitorability of the various system components and their environments.

The AONS Configuration and Management framework is based upon five functional areas ("FCAPS") for network management as recommended by the ISO network management forum. The functional areas include fault management, configuration management, accounting management, performance management, and security management. Fault management is the process of discovering, isolating, and fixing the problems or faults in the AONS nodes. Configuration management is the process of finding and setting up the AONS nodes. Accounting management involves tracking usage and utilization of AONS resources to facilitate their proper usage. Performance management is the process of measuring the performance of the AONS system components and the overall system. Security management controls access to information on the AONS system. Much of the above functionality is handled via proper instrumentation, programming interfaces, and tools as part of the overall AONS solution.

Figure 21:
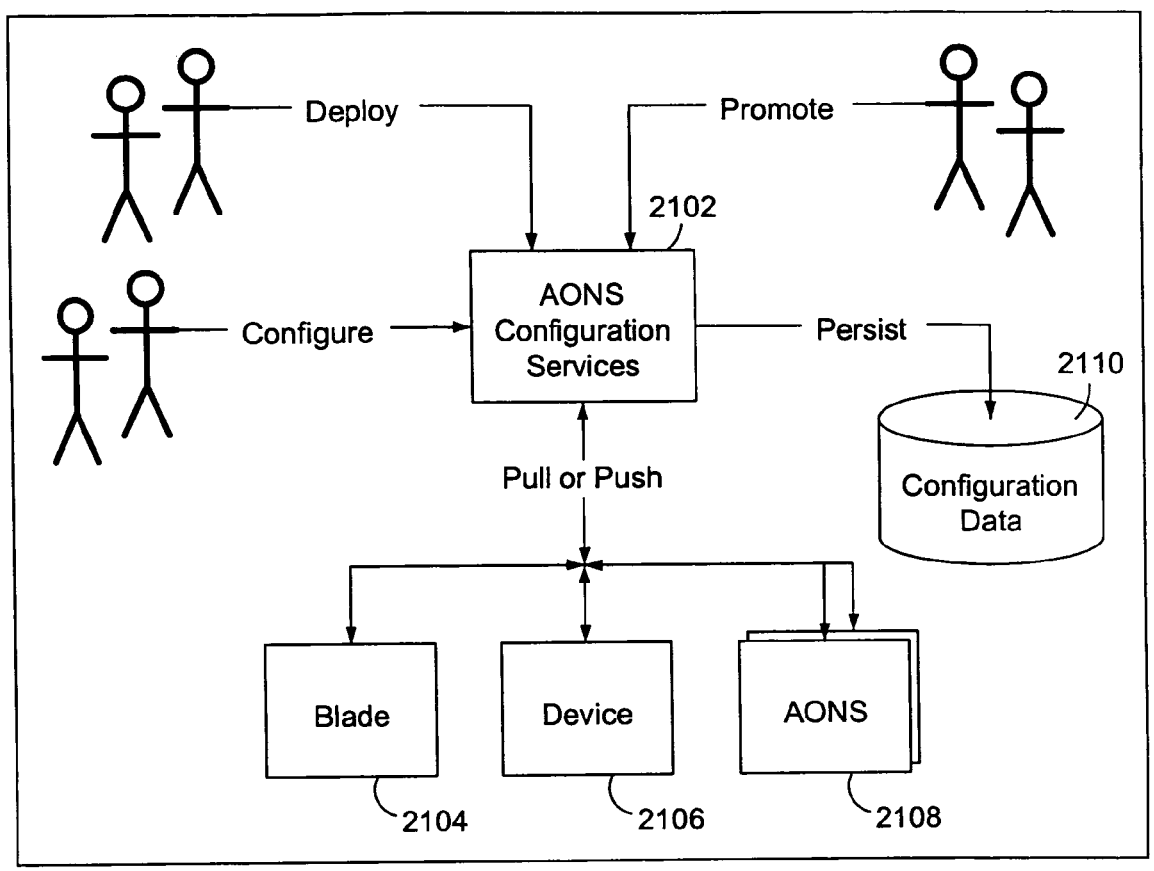
FIG. 21, FIG. 22, and FIG. 23 are diagrams that illustrate entities within an AONS configuration and management framework.
Figure 22:
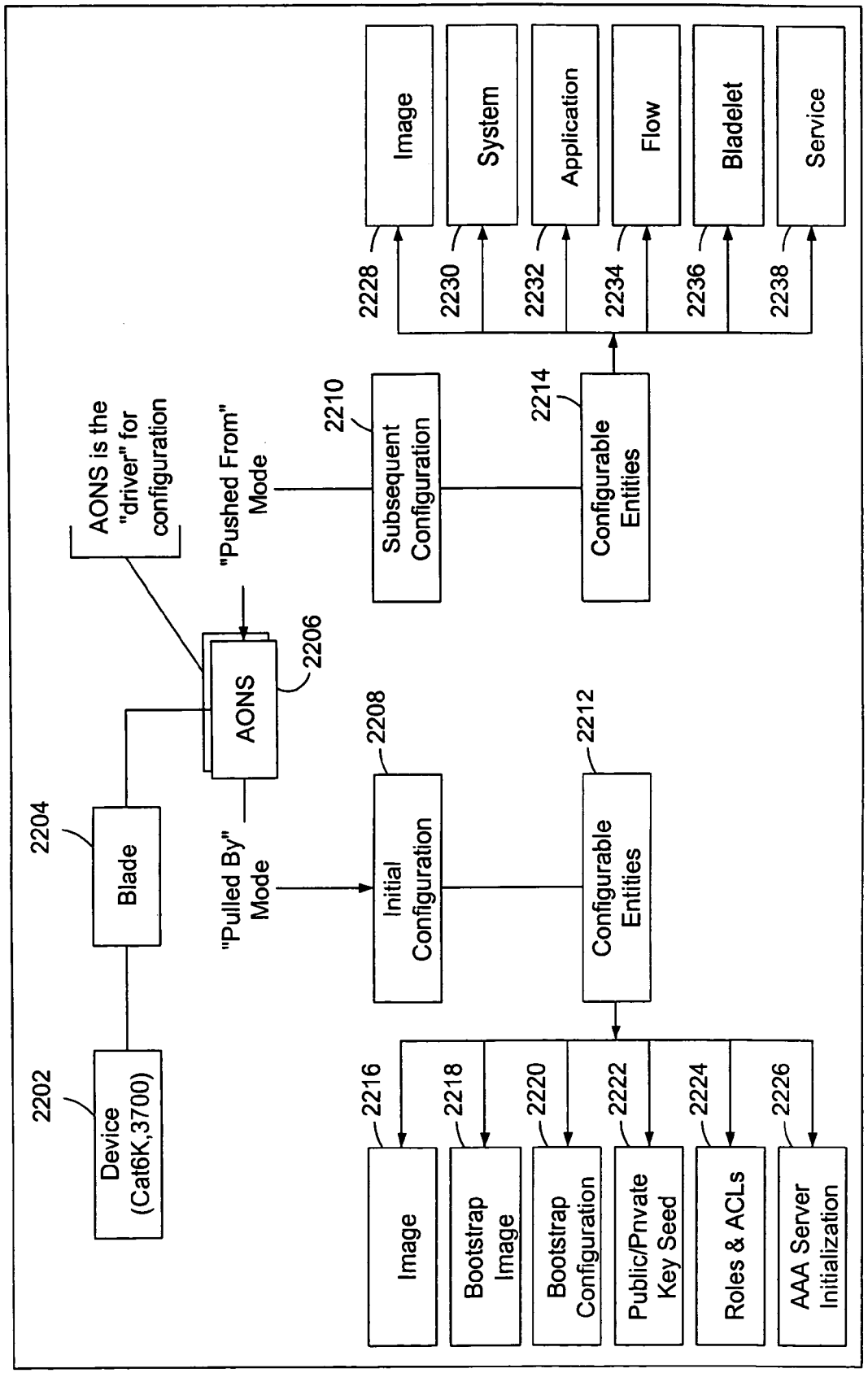
Figure 23:
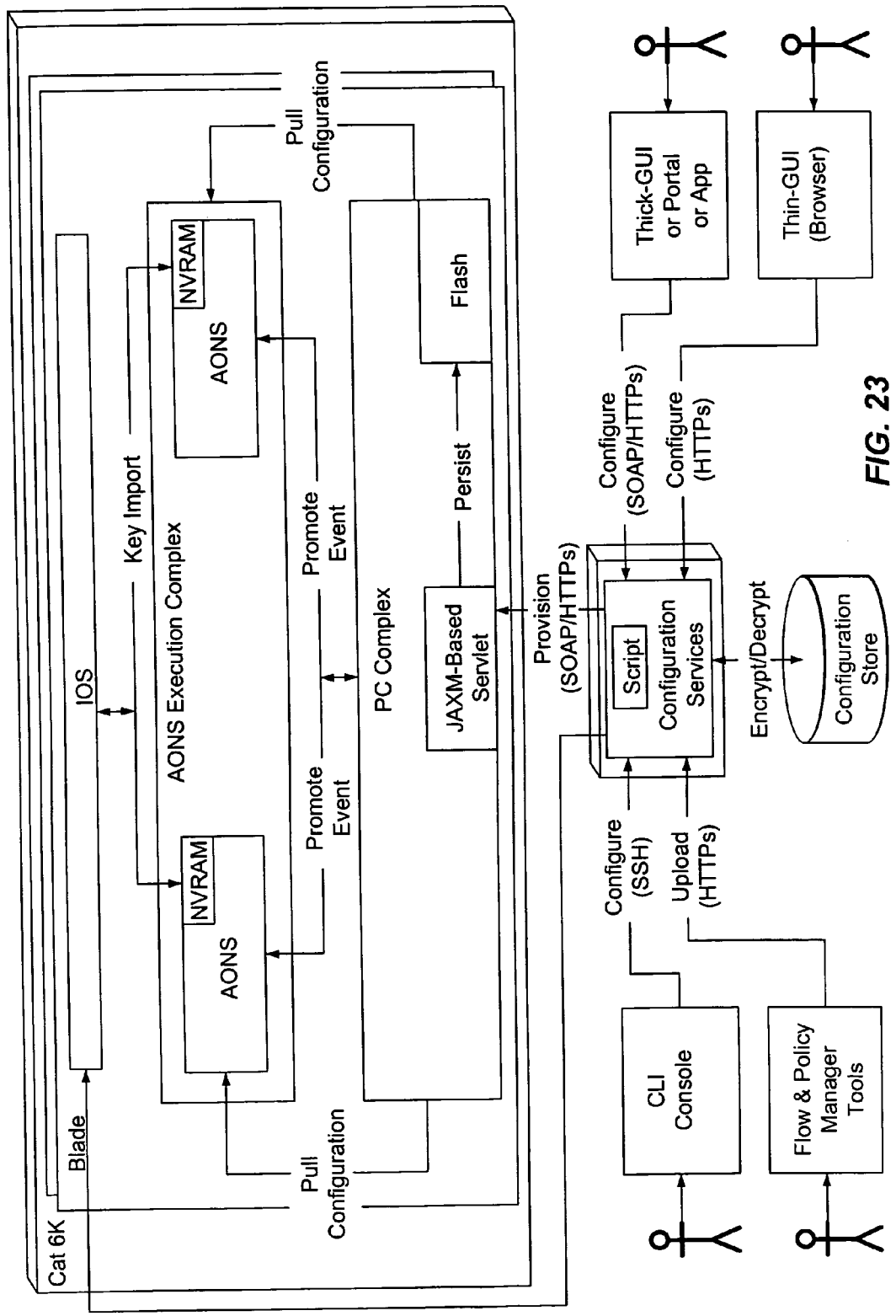

FIG. 21, FIG. 22, and FIG. 23 are diagrams that illustrate entities within an AONS configuration and management framework. An AONS management console (AMC) is the centralized hub for configuration and management of AONS policies, flows, Scriptlets™ and other manageable entities. Configurable data is pushed to the AMC from an AONS design studio (flow tool) and the AONS admin may then provision this data to the production deployment. A promotion process is also provided to test and validate changes via a development to staging/certification to production rollout process. An AONS management agent (AMA) resides on individual AONS blades and provides the local control and dispatch capabilities for AONS. The AMA interacts with the AMC to get updates. The AMA takes appropriate actions to implement changes. The AMA is also used for collecting monitoring data to report to third party consoles.

3.4.13 AONS Monitoring

Figure 24:
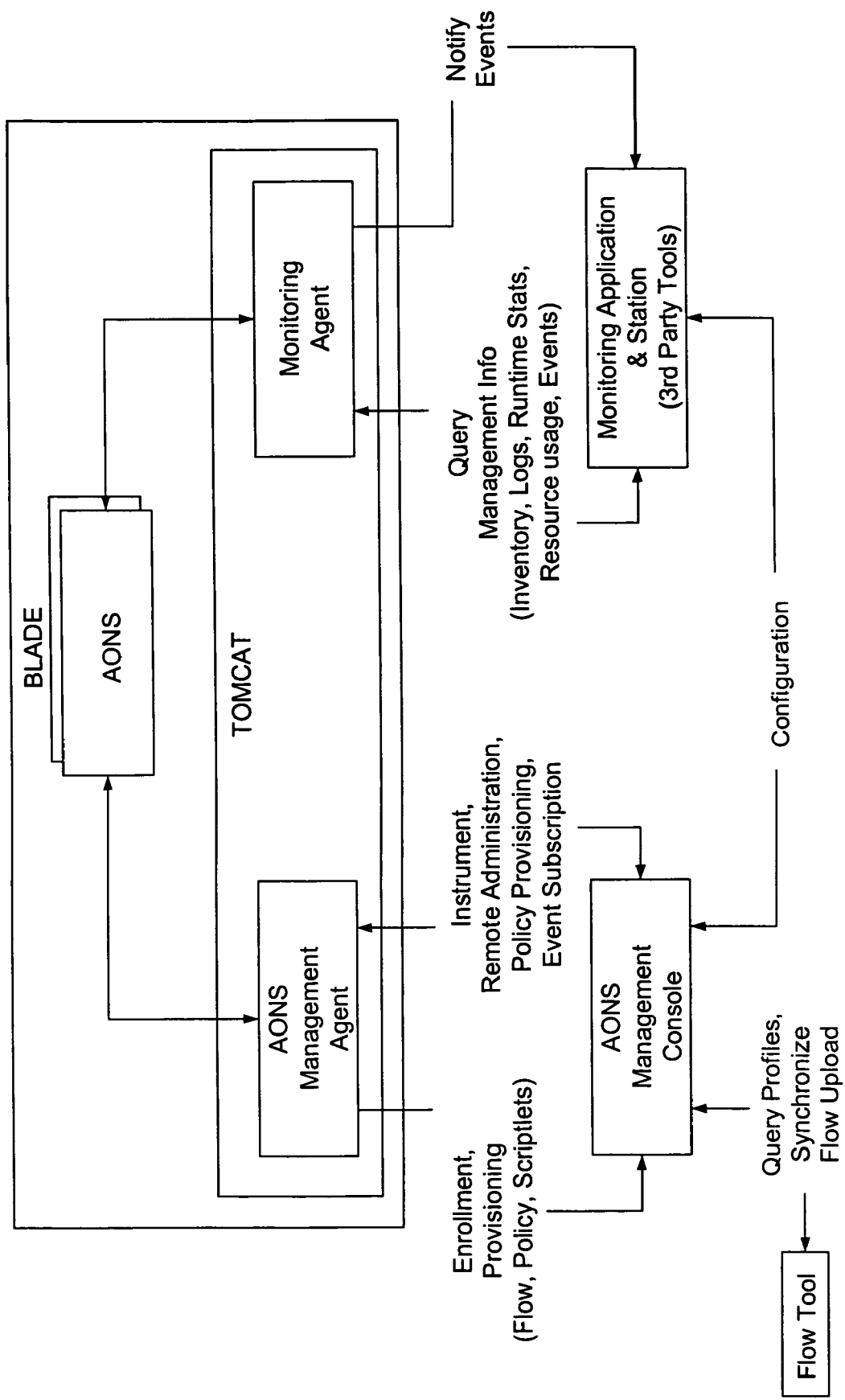
FIG. 24 is a diagram that illustrates an AONS monitoring architecture.

In one embodiment, AONS is instrumented to support well-defined events for appropriate monitoring and visibility into internal processing activities. The monitoring of AONS nodes may be accomplished via a pre-defined JMX MBean agent that is running on each AONS node. This agent communicates with a remote JMX MBean server on the PC complex. An AONS MIB is leveraged for SNMP integration to third party consoles. FIG. 24 is a diagram that illustrates an AONS monitoring architecture.

3.4.14 AONS Tools

In one embodiment, the following tool sets are provided for various functional needs of AONS: a design studio, an admin studio, and a message log viewer. The design studio is a visual tool for designing flows and applying message classification and mapping policies. The admin studio is a web-based interface to perform all administration and configuration functions. The message log viewer is a visual interface to analyze message traffic, patterns, and trace information.

4.0 Implementation Mechanisms—Hardware Overview

Figure 5:
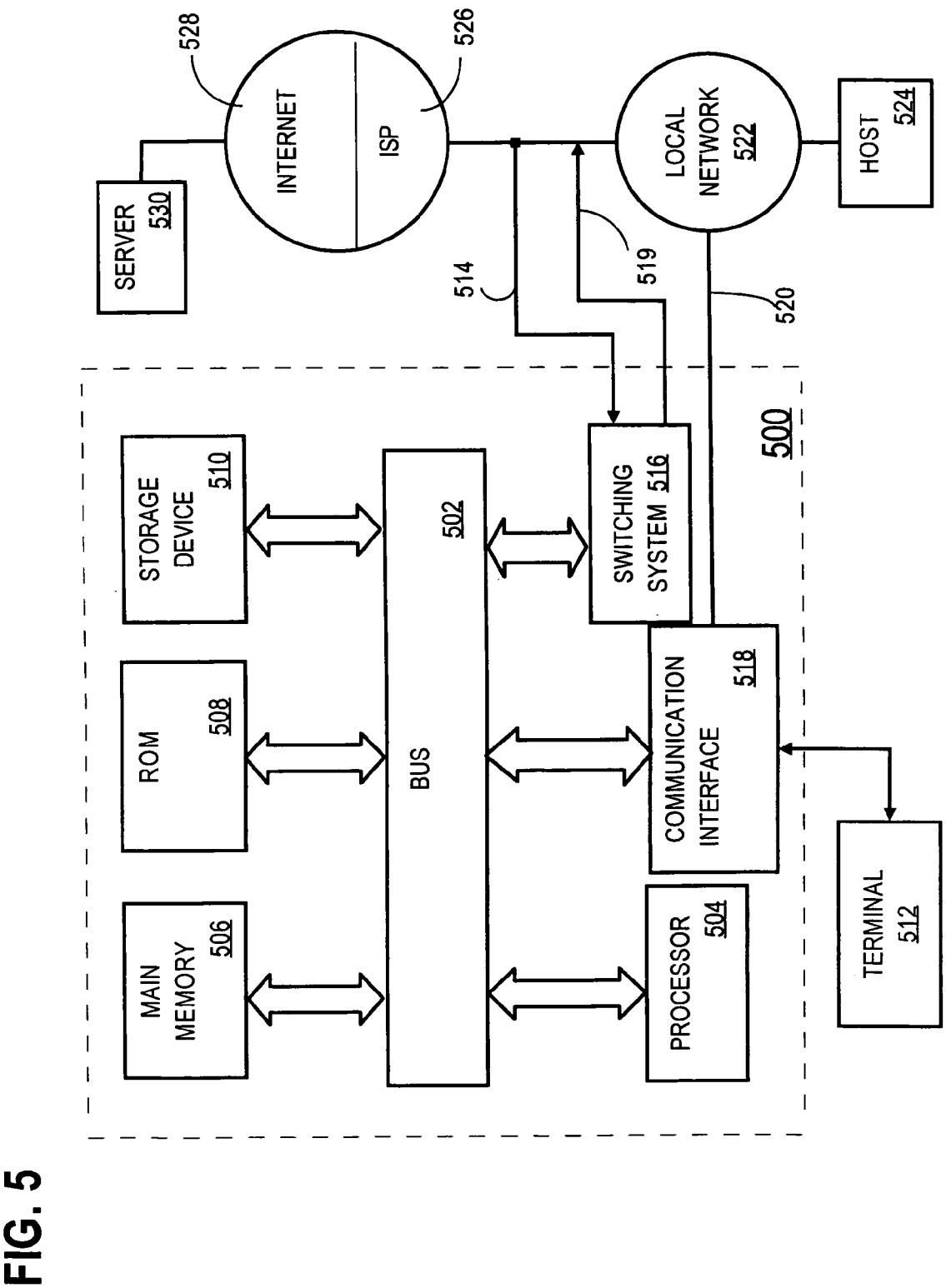
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a proxy device. Thus, in this embodiment, the computer system 500 is a proxy device such as a load balancer.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for avoiding the storage of client state on computer system 500. According to one embodiment of the invention, computer system 500 provides for such updating in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for avoiding the storage of client state on a server as described herein.

Processor 504 may execute the received code as it is received and/or stored in storage device 510 or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Following are some of the functions that network elements may perform to help protect a network against attacks, according to one embodiment:

A network element may determine whether a received message contains a username or X.509 certificate that attests to the identity of the source of the message. This verification can happen locally or against a managed key infrastructure provider or a store. If the document is received with a revoked, expired, or improperly routed certificate, or if the user and/or certificate owner identity cannot be determined, then exception handling may be invoked.

Additionally, a network element may determine whether X.509 certificate for the digital signature differs from SSL X.509 certificate credentials embedded in or referenced in the message. If there is a difference, then the network element may perform specified actions.

A network element may contain private keys, and the network element may have the ability to validate keys and certificates against external key stores. The network element may provide mechanisms for encrypted transmission of keys and encrypted non-persistent storage of keys local to the network element. The network element may implement access control mechanisms that prevent access to such keys via external mechanisms.

To ensure that messages remain confidential, a network element may encrypt messages, such as XML messages, and encrypt data transmissions using transport-level schemes such as SSL or Transport Layer Security (TLS) protocol. A network element may terminate a secure session and decrypt encrypted messages, such as encrypted XML messages.

A network element may insert a timestamp and message identifier along with a valid digital signature into a message to provide a level of confidence that the message has not been intercepted and altered at an intermediary device. The signature may be a one-way hash, such as MD-5 or SHA-1, which mathematically describes the contents of the message. If a network element receives a message that contains a hash value that does not match the original hash value, then the network element may conclude that the message might have been compromised. In response, the network element may perform one or more policy-driven actions, such as, for example, logging the message, noting the sending address, raising an alert, and informing the source. If a message is unsigned, then the message may be hashed, signed, and logged at an ingress to the network. This helps prevent subversive messages from being introduced into a receiving organization. This also guards against message replay attacks.

If the signature of a received message matches that of the message when processed using the same hash locally, then the message is proven to be unchanged between the source and receiver.

After a message has been authenticated, authorized, and checked for data integrity, then the network element may make the message available in a decrypted format. At this stage, the network element may parse the message in a manner so that legitimate messages are properly processed and forwarded according to an application policy definition. The network element can also detect anomalous fields and conditions, and reject malformed messages. Once decrypted, the content can be validated against a schema or similar constraints.

According to one embodiment, a network element may repair damaged messages based on policy rules. For example, if a date or an address is in an incorrect format, then the date may be changed to reflect the date that the document was received.

After a message has been received and authenticated, a network element may authorized the source to access services identified within the message. Network elements on the perimeter of a network may authorize access to a subset of applications at a coarse grain, with fine-grain control of authorization being provided closer to application servers.

Thus, decision points, exception handling, and branches may occur at various points within a process flow. This allows the management of how messages are processed at the ingress to a network. The same or similar processing may be applied to messages that are leaving such a network.

Following are some of the potential attacks and exploits that might be launched against a network using XML documents:

Parameter Tampering: Embedded within an XML document is information such that two remote applications can interact and communicate. These instructions and service interfaces are published within the WSDL document on UDDI servers to facilitate anonymous communications between web services enabled organizations. These parameters can be exploited if the attacker is able to manipulate the parameter options, for example, by sending an oversized field value to cause a buffer to overrun, and may either compromise the service or enable unauthorized access to information.

Recursive Payloads: XML documents use the concept of nesting to describe the relationships of different elements within a document. Some schemas and DTDs describe entities, and their expansion at run-time can result in recursive resource-consuming parsing. For example, a document may contain multiple purchase orders that have individual nested purchase orders that have customer address, billing address, items ordered, etc., embedded in the document. However, some XML parsers are known to exhibit problems if documents contain large numbers of nested elements, and an attacker may use this as an exploit.

Oversize Payloads: XML documents are verbose and, as a result, messages in the megabyte and gigabyte range can be transmitted. Although various techniques can be used to limit the size of a file, these are not always practical or under the control of the receiver. However, a large file, which may also contain nested elements, may be used by an attacker to try and overwhelm an XML parser.

Coercive Parsing: Coercive parsing attacks are used to exploit application adapters that link legacy applications to XML-enabled applications. The legacy applications may not have infrastructure to handle a large number of messages. These attacks generally try to overwhelm the adapter, or are used to install malevolent software.

Schema Poisoning: XML schemas describe the content, structure, and grammar of a particular message and are used by XML parsers to correctly interpret the contents of a message. Because a schema contains information regarding remote procedure calls (RPCs) that may be accessed, the security of the XML schema definition should be considered. An attacker who is able to access the schema may change the schema definition. As a result, messages may be misinterpreted, causing buffer overruns, etc.

WSDL Scanning: WSDL describes how services may be accessed by external sources, and also describes the parameters that may be used to access the service, which is typically an RPC. An attacker may use this information to link commands and strings such that unintentional backdoors and application interfaces may be exposed.

Routing Path Manipulation: XML Intermediaries that process XML messages can insert routing instructions into a document. An attacker who is able to compromise such an intermediary may be able to intercept documents based upon keyword or destination and redirect the documents to another server. The attacker can then strip the routing headers from the file and forward a copy of the message to the message's intended destination; alternatively, the attacker may simply drop the message.

External Entity Attack: XML documents can reference external data sources using Xlink, which causes an XML parser to query the referenced URI for the required information. The use of external Xlinks may enable malevolent software to be downloaded.

Processing Instruction Injection: SQL and XQuery can be used to execute multiple commands within a message field, which may allow access to processes or commands that provide access to internal information, or which may disable the service. CDATA sessions in XML documents may contain processing instructions that may go undetected and damage endpoints.

Replay Attacks: Replay attacks simply retransmit a known good XML document in an attempt to overwhelm the receiving system or XML parser.

XML Morphing: XML messages can be transformed into various different legitimate messages because XML messages are processed within an integrated application. However, if an attacker is able to compromise an intermediary, then the XML document may be morphed into a format that may not follow the source's intended behavior, and that may be used to cause unexpected or inappropriate application behavior.

The above exploits can be tackled using a combination of authentication, XML schema and general content validation, signature and hash validation, XPath and regular expression matching, use of custom rules processing, and other techniques that are available within AONS.

What is claimed is:

1. A method of preventing a network and application denial-of-service attack, the method comprising the computer-implemented steps of:

accepting one or more specified criteria at a network element after receiving and routing one or more previous data packets at the network element, wherein the one or more specified criteria comprise a set of denial-of-service attack detection criteria;

receiving, at the network element, one or more data packets that collectively contain an application layer message;

determining the application layer message, at the network element, from one or more payload portions of the one or more data packets;

determining whether the application layer message satisfies one or more specified criteria; and if the application layer message satisfies the one or more specified criteria, then preventing the one or more data packets from being received by an application for which the application layer message was intended, wherein the application is at a different network element from the network element;

wherein determining whether the application layer message satisfies the one or more specified criteria comprises:

determining an application layer protocol according to which the application layer message was communicated;

selecting, from among a plurality of firewall mechanisms, a particular firewall mechanism that is mapped to the application layer protocol;

applying the particular firewall mechanism to the application layer message;

determining whether a particular class of messages is being used to mount an attack;

in response to detecting that a particular class of messages is being used to mount an attack, configuring another firewall mechanism, in another network element external to the network element, that allows or denies messages based on header attributes of layer 4 or below;

wherein the method is performed by one or more computing processors.

2. A method as recited in claim 1, wherein receiving the one or more data packets at the network element comprises intercepting the one or more data packets at the network element, and wherein a destination address of the one or more data packets identifies an application that is hosted on a device that is separate from the network element.

3. A method as recited in claim 1, wherein the network element is a network router or switch.

4. A method as recited in claim 1, wherein determining the application layer message from the one or more payload portions of the one or more data packets comprises assembling, at the network element, contents of two or more of the payload portions to determine the application layer message.

5. A method as recited in claim 1, wherein the application layer message is an Extensible Markup Language (XML) document or a non-XML document.

6. A method as recited in claim 1, further comprising the step of:
if the application layer message does not satisfy the one or more specified criteria, then sending the one or more data packets to the application.

7. A method as recited in claim 1, wherein determining the application layer message from the one or more payload portions of the one or more data packets comprises decrypting encrypted contents of the one or more payload portions at the network element.

8. A method as recited in claim 1, wherein determining whether the application layer message satisfies the one or more specified criteria comprises determining whether at least a part of the application layer message is larger than a specified size.

9. A method as recited in claim 1, wherein determining whether the application layer message satisfies the one or more specified criteria comprises determining whether the application layer message fails to conform syntactically and semantically to a specified schema as expected by an application.

10. A method as recited in claim 9, wherein the specified schema is stored at the network element, and wherein the specified schema was obtained from a trusted source.

11. A method as recited in claim 1, wherein determining whether the application layer message satisfies the one or more specified criteria comprises:
determining one or more particular criteria that are associated with an Internet Protocol (IP) address that is indicated in one or more IP headers of the one or more data packets; and
determining whether the application layer message satisfies the one or more particular criteria.

12. A method as recited in claim 11, further comprising the steps of:
receiving user specified content-matching constraints or criteria at the network element after receiving one or more data packets at the network element, wherein the specified content-matching constraints or criteria specify the IP address and the one or more particular criteria; and
in response to receiving the specified content-matching constraints or criteria, establishing, at the network element, an association between the IP address and the one or more particular criteria.

13. A method as recited in claim 1, wherein determining whether the application layer message satisfies the one or more specified criteria comprises:

determining a message format to which the application layer message conforms;
selecting, from among a plurality of firewall mechanisms, a particular firewall mechanism that is mapped to the message format; and
applying the particular firewall mechanism to the application layer message.

14. A method as recited in claim 1, wherein the application layer message conforms to an application layer protocol in the one or more payload portions of the one or more data packets.

15. A method as recited in claim 1, wherein determining whether the application layer message satisfies one or more specified criteria comprises determining whether the application layer message contains one or more specified keywords.

16. A method as recited in claim 1, wherein the application layer message comprises a multi-part MIME message, and further comprising handling each part of the multi-part MIME message separately and independently from each other part of the multi-part MIME message.

17. A method as recited in claim 16, further comprising:
determining a type of a first part of the multi-part MIME message;
determining a type of a second part of the multi-part MIME message;
inspecting the first part using a first inspection mechanism that is associated with the type of the first part; and
inspecting the second part using a second inspection mechanism that is associated with the type of the second part;
wherein the first inspection mechanism differs from the second inspection mechanism.

18. A method as recited in claim 16, further comprising:
decrypting the first part using a first key; and
decrypting the second part using a second key that differs from the first key.

19. A method as recited in claim 16, further comprising allowing the first part to be forwarded out of the network element, and preventing the second part from being forwarded out of the network element.

20. A method as recited in claim 16, wherein the specified criteria are more restrictive than criteria specified at another network element.

21. A method as recited in claim 16, further comprising:
configuring a firewall mechanism to prevent data packets that satisfy specified criteria from reaching a mechanism of the network element that configured the firewall mechanism.

22. A method as recited in claim 1, further comprising:
re-routing one or more data packets to a different network element if data packets are being received at greater than a specified threshold rate.

23. A method as recited in claim 1, further comprising:
performing, at the network element, an operation on a message that is a request message, a response message, an exception processing message, or a message that was not sent between a client application and a server application.

24. A method as recited in claim 1, wherein determining whether the application layer message satisfies the one or more specified criteria comprises determining whether the application layer message is smaller than a specified size.

25. A method as recited in claim 1, further comprising:
if the application layer message satisfies the one or more specified criteria, then modifying the format of the content of the application layer message and then sending the application layer message.

26. A method as recited in claim 1, further comprising:
if the application layer message satisfies the one or more specified criteria, then performing one or more actions from a set of actions comprising quarantining the application layer message, discarding the application layer message, repairing the application layer message, alerting an entity about the application layer message, and logging the application layer message or one or more parts thereof.

27. A method as recited in claim 1, further comprising:
determining whether the application layer message contains embedded processing instructions; and
in response to a determination that the application layer message contains embedded processing instructions, removing the embedded processing instructions from the application layer message prior to sending the application layer message.

28. A method as recited in claim 1, further comprising:
determining whether a Universal Resource Identifier (URI) contained in the application layer message is contained in a list of allowed URIs; and
in response to a determination that the URI is not contained in the list of allowed URIs, performing one or more specified actions.

29. A method as recited in claim 1, further comprising:
determining whether the application layer message has been tampered with; and
in response to a determination that the application layer message has been tampered with, performing one or more specified actions.

30. A method as recited in claim 1, further comprising the steps of:
receiving an IP address in addition to the one or more specified criteria; and
in response to receiving the IP address, establishing, at the network element, an association between the IP address and the one or more specified criteria.

31. A volatile or non-volatile computer-readable medium carrying one or more sequences of instructions for preventing a network or application denial-of-service attack, which instructions, when executed by one or more processors, cause the one or more processors to carry out the steps of:
accepting one or more specified criteria at a network element after receiving and routing one or more previous data packets at the network element, wherein the one or more specified criteria comprise a set of denial-of-service attack detection criteria;
receiving, at the network element, one or more data packets that collectively contain an application layer message;
determining the application layer message, at the network element, from one or more payload portions of the one or more data packets;
determining whether the application layer message satisfies one or more specified criteria; and
if the application layer message satisfies the one or more specified criteria, then preventing the one or more data packets from being received by an application for which the application layer message was intended, wherein the application is at a different network element from the network element;
determining an application layer protocol according to which the application layer message was communicated;
selecting, from among a plurality of firewall mechanisms, a particular firewall mechanism that is mapped to the application layer protocol;
applying the particular firewall mechanism to the application layer message; determining whether a particular class of messages is being used to mount an attack;
in response to detecting that a particular class of messages is being used to mount an attack, configuring another firewall mechanism, in another network element external to the network element, that allows or denies messages based on header attributes of layer 4 or below.

32. An apparatus for preventing a denial-of-service attack at a network element, the apparatus comprising:
a processor;
means for accepting one or more specified criteria at a network element after receiving and routing one or more previous data packets at the network element, wherein the one or more specified criteria comprise a set of denial-of-service attack detection criteria;
means for receiving, at the network element, one or more data packets that collectively contain an application layer message;
means for determining the application layer message, at the network element, from one or more payload portions of the one or more data packets;
means for determining whether the application layer message satisfies one or more specified criteria; and
means for preventing the one or more data packets from being received by an application for which the application layer message was intended if the application layer message satisfies the one or more specified criteria, wherein the application is at a different network element from the network element;
wherein the means for determining whether the application layer message satisfies the one or more specified criteria comprises:
means for determining an application layer protocol according to which the application layer message was communicated;
means for selecting, from among a plurality of firewall mechanisms, a particular firewall mechanism that is mapped to the application layer protocol;
means for applying the particular firewall mechanism to the application layer message;
means for determining whether a particular class of messages is being used to mount an attack;
means for configuring another firewall mechanism, in another network element external to the network element, that allows or denies messages based on header attributes of layer 4 or below in response to detecting that a particular class of messages is being used to mount an attack.

33. An apparatus for preventing a denial-of-service attack at a network element, comprising:
a network interface that is coupled to a data network for receiving one or more packet flows therefrom;
a processor;
one or more stored sequences of instructions which, when executed by the processor, cause the processor to carry out the steps of:
accepting one or more specified criteria at a network element after receiving and routing one or more previous data packets at the network element, wherein the one or more specified criteria comprise a set of denial-of-service attack detection criteria;
receiving, at the network element, one or more data packets that collectively contain an application layer message;

determining the application layer message, at the network element, from one or more payload portions of the one or more data packets;

determining whether the application layer message satisfies one or more specified criteria; and if the application layer message satisfies the one or more specified criteria, then preventing the one or more data packets from being received by an application for which the application layer message was intended, wherein the application is at a different network element from the network element;

determining an application layer protocol according to which the application layer message was communicated;

selecting, from among a plurality of firewall mechanisms, a particular firewall mechanism that is mapped to the application layer protocol;

applying the particular firewall mechanism to the application layer message;

determining whether a particular class of messages is being used to mount an attack;

in response to detecting that a particular class of messages is being used to mount an attack, configuring another firewall mechanism, in another network element external to the network element, that allows or denies messages based on header attributes of layer 4 or below.

34. A volatile or non-volatile computer-readable medium as recited in claim 31, wherein the instructions for receiving the one or more data packets at the network element comprise-instructions for intercepting the one or more data packets at the network element, and wherein a destination address of the one or more data packets identifies an application that is hosted on a device that is separate from the network element.

35. A volatile or non-volatile computer-readable medium as recited in claim 31, wherein the network element is a network router or switch.

36. A volatile or non-volatile computer-readable medium as recited in claim 31, wherein instructions for determining the application layer message from the one or more payload portions of the one or more data packets comprise instructions for assembling, at the network element, contents of two or more of the payload portions to determine the application layer message.

37. A volatile or non-volatile computer-readable medium as recited in claim 31, wherein the one or more sequences of instructions further comprise instructions for sending, in response to determining that the application layer message does not satisfy the one or more specified criteria, the one or more data packets to the application.

38. An apparatus as recited in claim 24, wherein the means for receiving the one or more data packets at the network element further comprises means for intercepting the one or more data packets at the network element, and wherein a destination address of the one or more data packets identifies an application that is hosted on a device that is separate from the network element.

39. An apparatus as recited in claim 24, wherein the network element is a network router or switch.

40. An apparatus as recited in claim 24, wherein the means for determining the application layer message from the one or more payload portions of the one or more data packets comprises means for assembling, at the network element, contents of two or more of the payload portions to determine the application layer message.

41. An apparatus as recited in claim 24, further comprising means for sending, in response to determining that the application layer message does not satisfy the one or more specified criteria, the one or more data packets to the application.

42. An apparatus as recited in claim 33, wherein the instructions for receiving the one or more data packets at the network element comprise instructions for intercepting the one or more data packets at the network element, and wherein a destination address of the one or more data packets identifies an application that is hosted on a device that is separate from the network element.

43. An apparatus as recited in claim 33, wherein the network element is a network router or switch.

44. An apparatus as recited in claim 33, wherein instructions for determining the application layer message from the one or more payload portions of the one or more data packets comprise instructions for assembling, at the network element, contents of two or more of the payload portions to determine the application layer message.

45. An apparatus as recited in claim 33, wherein the one or more sequences of instructions further comprise instructions for sending, in response to determining that the application layer message does not satisfy the one or more specified criteria, the one or more data packets to the application.

46. An apparatus as recited in claim 33, wherein the network element is a network router or switch.

* * * * *

UNITED STATES PATENT AND TRADEMARK OFFICE
CERTIFICATE OF CORRECTION

PATENT NO. : 7,725,934 B2  Page 1 of 1
APPLICATION NO. : 11/007152
DATED : May 25, 2010
INVENTOR(S) : Sandeep Kumar et al.

It is certified that error appears in the above-identified patent and that said Letters Patent is hereby corrected as shown below:

Claim 38

Column 44, Line 5, delete "claim 24", insert -- claim 32 --.

Claim 39

Column 44, Line 12, delete "claim 24", insert -- claim 32 --.

Claim 40

Column 44, Line 14, delete "claim 24", insert -- claim 32 --.

Claim 41

Column 44, Line 20, delete "claim 24", insert -- claim 32 --.

Signed and Sealed this

Thirty-first Day of August, 2010

David J. Kappos
*Director of the United States Patent and Trademark Office*